United States Patent
Kim et al.

(10) Patent No.: US 9,516,254 B2
(45) Date of Patent: Dec. 6, 2016

(54) DISPLAY APPARATUS CONNECTED TO PLURAL SOURCE DEVICES AND METHOD OF CONTROLLING THE SAME

(71) Applicant: LG ELECTRONICS INC., Seoul (KR)

(72) Inventors: Ryoung Kim, Pyeongtaek-si (KR); Jihe Suk, Pyeongtaek-si (KR); Gowoon Choi, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 14/548,058

(22) Filed: Nov. 19, 2014

(65) Prior Publication Data

US 2015/0150050 A1 May 28, 2015

Related U.S. Application Data

(63) Continuation of application No. 13/288,662, filed on Nov. 3, 2011, now abandoned.

(30) Foreign Application Priority Data

May 20, 2011 (KR) ........................ 10-2011-0047776

(51) Int. Cl.
*H04N 5/445* (2011.01)
*G06F 3/00* (2006.01)
(Continued)

(52) U.S. Cl.
CPC .......... *H04N 5/44582* (2013.01); *G08C 17/02* (2013.01); *G08C 23/04* (2013.01);
(Continued)

(58) Field of Classification Search
CPC ............ H04N 5/44543; H04N 21/4532; H04N 21/482; H04N 21/84; H04N 7/163
(Continued)

(56) References Cited

U.S. PATENT DOCUMENTS 6,157,377 A 12/2000 Shah-Nazaroff et al.
7,174,512 B2 2/2007 Martin et al.
(Continued)

FOREIGN PATENT DOCUMENTS

CN 1497959 A 5/2004
CN 1502205 A 6/2004
(Continued)

*Primary Examiner* — Jason Salce
(74) *Attorney, Agent, or Firm* — Birch, Stewart, Kolasch & Birch, LLP

(57) ABSTRACT

A television controlled by a remote controller and including includes an infrared (IR) module to receive an IR signal from the remote controller; a radio frequency (RF) module to receive an RF signal from the remote controller; a network interface to receive metadata corresponding to a content to be displayed on a screen, the metadata including thumbnail image information, title information, actor information, genre information and synopsis information corresponding to the content; and a controller configured to change a power-off state of the television into a power-on state of the television based on the received IR signal and control a display to display a thumbnail image corresponding to the content based on the received metadata on the screen. Further, the controller is further configured to control the display to move a pointer on the screen based on the received RF signal containing information regarding movement of the remote controller, control the RF module to receive an RF signal corresponding to a designated key of the remote controller for selecting a thumbnail image corresponding to a specific content when the pointer is on the thumbnail image corresponding to the specific content, from the remote controller, control the display to display title information, actor information, genre information and synopsis information corresponding to the specific content according to the received RF signal corresponding to the designated key of the remote controller, and control the
(Continued)

display to display related content information, the related content information relates to another content corresponding to the specific content based on the received metadata. In addition, when the related content information is selected by the pointer, the controller further controls the display to display a thumbnail image corresponding to the another content, a first item to identify a first source providing the another content and the second item to identify a second source providing the another content, the second source is different from the first source.

14 Claims, 38 Drawing Sheets

(51) Int. Cl.
| | |
|---|---|
| G06F 13/00 | (2006.01) |
| H04N 21/84 | (2011.01) |
| H04N 21/431 | (2011.01) |
| H04N 21/434 | (2011.01) |
| H04N 21/462 | (2011.01) |
| H04N 21/472 | (2011.01) |
| H04N 21/4722 | (2011.01) |
| H04N 21/4782 | (2011.01) |
| H04N 21/4788 | (2011.01) |
| H04N 21/482 | (2011.01) |
| H04N 21/488 | (2011.01) |
| H04N 21/643 | (2011.01) |
| H04N 21/81 | (2011.01) |
| G08C 17/02 | (2006.01) |
| G08C 23/04 | (2006.01) |
| H04N 21/235 | (2011.01) |
| H04N 21/41 | (2011.01) |
| H04N 21/422 | (2011.01) |
| H04N 21/44 | (2011.01) |
| H04N 21/4402 | (2011.01) |
| H04N 21/45 | (2011.01) |
| H04N 21/466 | (2011.01) |

(52) U.S. Cl.
CPC ......... *H04N 5/445* (2013.01); *H04N 21/2353* (2013.01); *H04N 21/4126* (2013.01); *H04N 21/42221* (2013.01); *H04N 21/4312* (2013.01); *H04N 21/4345* (2013.01); *H04N 21/44008* (2013.01); *H04N 21/4622* (2013.01); *H04N 21/4722* (2013.01); *H04N 21/4782* (2013.01); *H04N 21/4788* (2013.01); *H04N 21/47202* (2013.01); *H04N 21/482* (2013.01); *H04N 21/4882* (2013.01); *H04N 21/64322* (2013.01); *H04N 21/812* (2013.01); *H04N 21/8133* (2013.01); *H04N 21/8153* (2013.01); *H04N 21/84* (2013.01); *H04N 21/440263* (2013.01); *H04N 21/4532* (2013.01); *H04N 21/4667* (2013.01)

(58) Field of Classification Search
USPC ................ 725/41, 43, 45–50, 52–53, 59, 61
See application file for complete search history.

(56) References Cited

U.S. PATENT DOCUMENTS

| | | | |
|---|---|---|---|
| 7,363,649 B2 * | 4/2008 | Marsh ................. | G11B 27/322 |
| | | | 707/999.1 |
| 7,690,019 B2 | 3/2010 | Yamamoto et al. | |
| 7,757,252 B1 | 7/2010 | Agasse | |
| 8,358,377 B2 * | 1/2013 | Ahn ................... | H04N 5/44591 |
| | | | 348/564 |
| 2002/0120932 A1 | 8/2002 | Schwalb | |
| 2005/0138656 A1 | 6/2005 | Moore et al. | |
| 2005/0149622 A1 | 7/2005 | Kirkland et al. | |
| 2006/0048184 A1 | 3/2006 | Poslinski et al. | |
| 2006/0093998 A1 * | 5/2006 | Vertegaal ............... | G06F 3/011 |
| | | | 434/236 |
| 2007/0101368 A1 | 5/2007 | Jacoby et al. | |
| 2007/0169165 A1 | 7/2007 | Crull et al. | |
| 2007/0204299 A1 | 8/2007 | Vosseller | |
| 2007/0220555 A1 | 9/2007 | Espelien | |
| 2008/0086747 A1 | 4/2008 | Rasanen et al. | |
| 2008/0148332 A1 * | 6/2008 | Kassam ............ | H04N 7/17318 |
| | | | 725/115 |
| 2008/0222687 A1 | 9/2008 | Edry | |
| 2009/0100469 A1 | 4/2009 | Conradt et al. | |
| 2009/0150947 A1 | 6/2009 | Soderstrom | |
| 2009/0158326 A1 | 6/2009 | Hunt et al. | |
| 2009/0193464 A1 | 7/2009 | Friedlander et al. | |
| 2009/0292526 A1 | 11/2009 | Harari et al. | |
| 2010/0122294 A1 | 5/2010 | Craner | |
| 2010/0275233 A1 | 10/2010 | Soohoo et al. | |
| 2010/0293579 A1 | 11/2010 | Kulick et al. | |
| 2011/0179453 A1 | 7/2011 | Poniatowski | |

FOREIGN PATENT DOCUMENTS

| | | |
|---|---|---|
| CN | 101523390 A | 9/2009 |
| EP | 2 262 244 A1 | 12/2010 |
| WO | WO 2008/045305 A2 | 4/2008 |

* cited by examiner

FIG. 3

| Syntax | No. of Bits | Format |
|---|---|---|
| event_information_table_section () { | | |
|     table_id | 8 | 0XCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     number_events_in_section | 8 | uimsbf |
|     for (j = 0; j<num_events_in_section;j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i = 0; i<N;i++) { | | |
|             descriptor() | | |
|         } | | |
|     } | | |
|     CRC_32 | 32 | rpchof |
| } | | |

FIG. 8
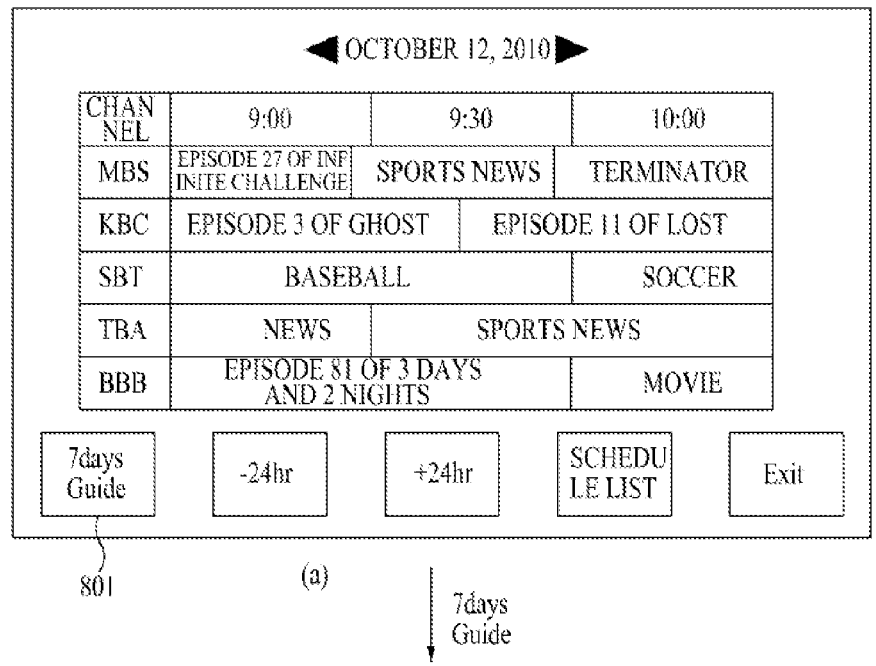
(a)
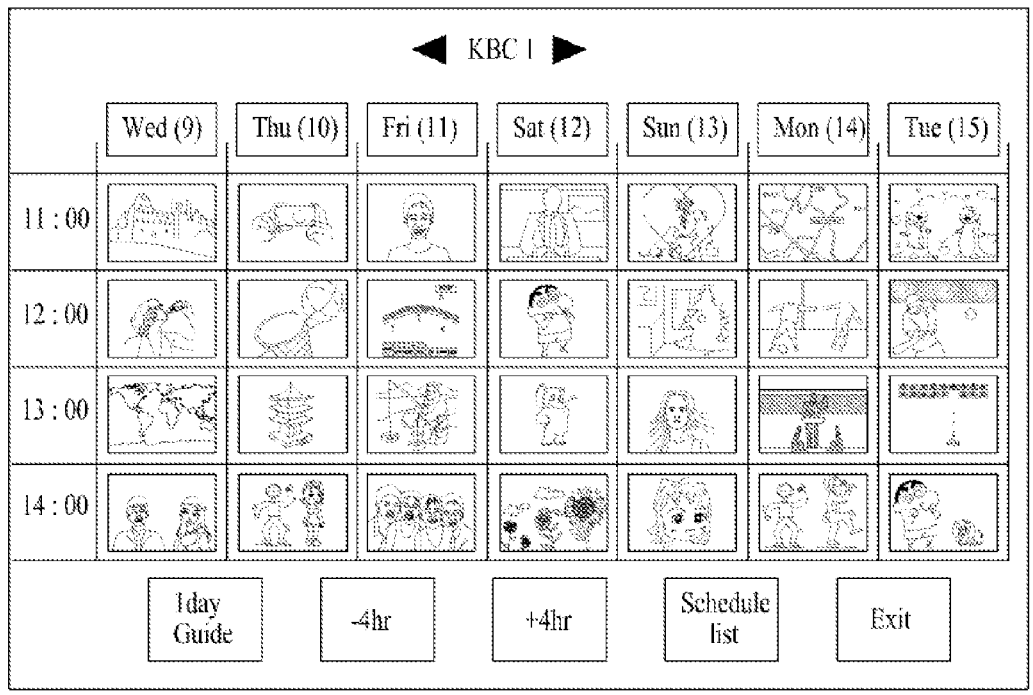
(b)

FIG. 11
| ACTUAL TIME TABLE | |
|---|---|
| 9:00 ~ 9:40 | 9 O'CLOCK NEWS |
| 9:50 ~ 10:45 | DRAMA |
| 10:50 ~ 10:58 | SPORTS NEWS |
| 11:00 ~ 11:10 | LEANING ENGLISH |
| 11:20 ~ 1:40 | MOVIE |
→
| TIME ZONE | REPRESENTATIVE THUMBNAIL IMAGE | |
|---|---|---|
| 9:00 ~ 10:00 |  | 9 O'CLOCK NEWS |
| 10:00 ~ 11:00 |  | DRAMA |
| 11:00 ~ 12:00 |  | MOVIE |
| 12:00 ~ 1:00 |  | MOVIE |
| 1:00 ~ 2:00 |  | MOVIE |

FIG. 26

|  | Episode #1 | Episode #2 | Episode #3 |
|---|---|---|---|
| ON TV | 2011.3.11 (17:00 - 18:00)<br>CH 7<br>2011.3.14 (22:00 - 23:00)<br>CH 11 | 2011.3.9 (13:00 - 14:00)<br>CH 8<br>2011.3.18 (14:00 - 15:00)<br>CH 7 | 2011.3.20 (22:00 - 23:00)<br>CH 5 |
| VOD Server | 3 $ | 5 $ | × |
| My Media | ○ | × | × |

FIG. 29

| PRIORITY \ Episode | Episode #1 | Episode #2 | Episode #3 |
|---|---|---|---|
| 1 | VOD | My Media | ON TV Channel 7 |
| 2 | ON TV Channel 11 | ON TV Channel 13 | |
| 3 | | VOD | |
| 4 | | | |

FIG. 37
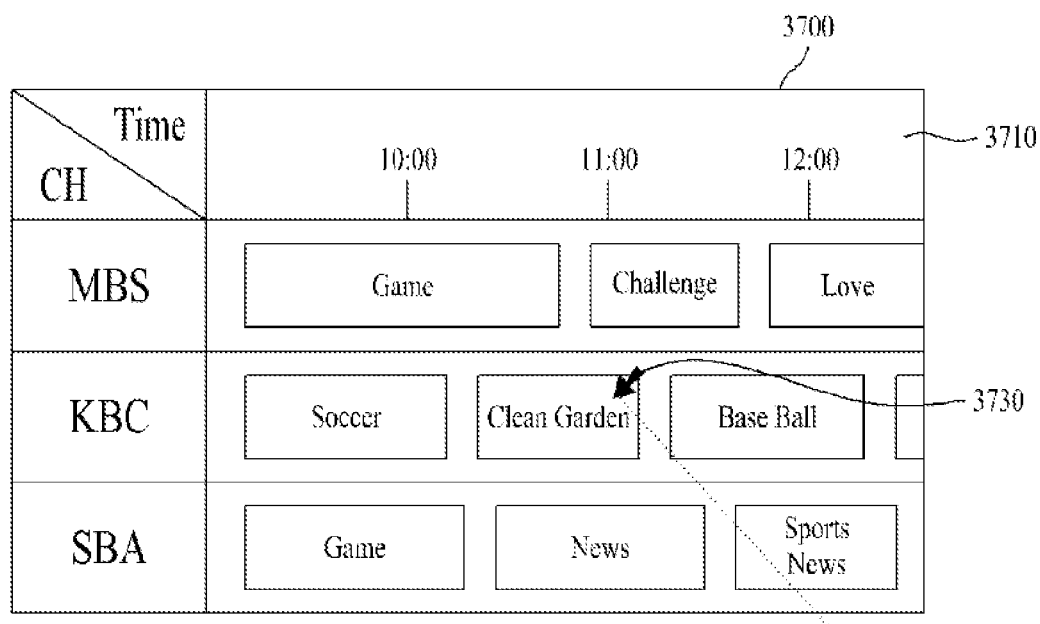
(a)
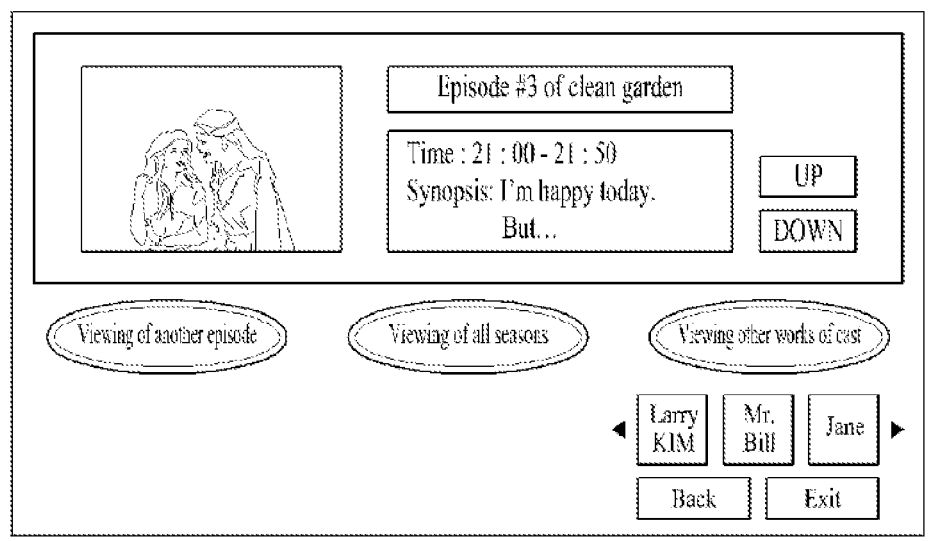
(b)

FIG. 38
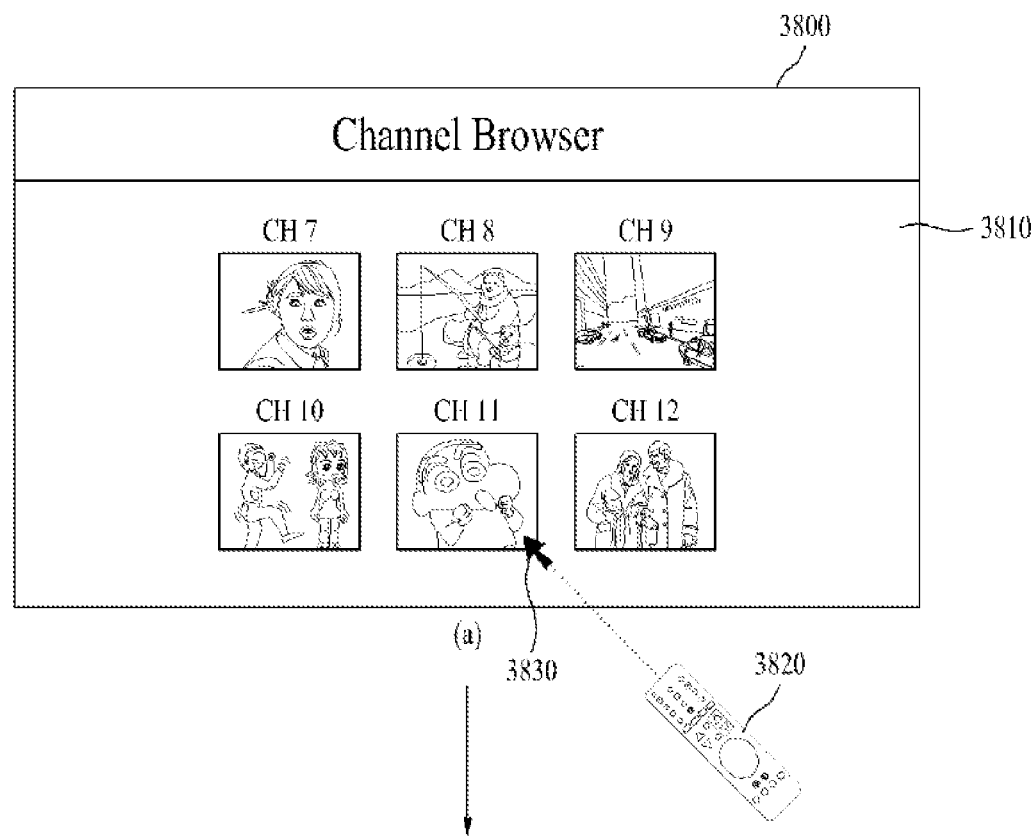
(a)
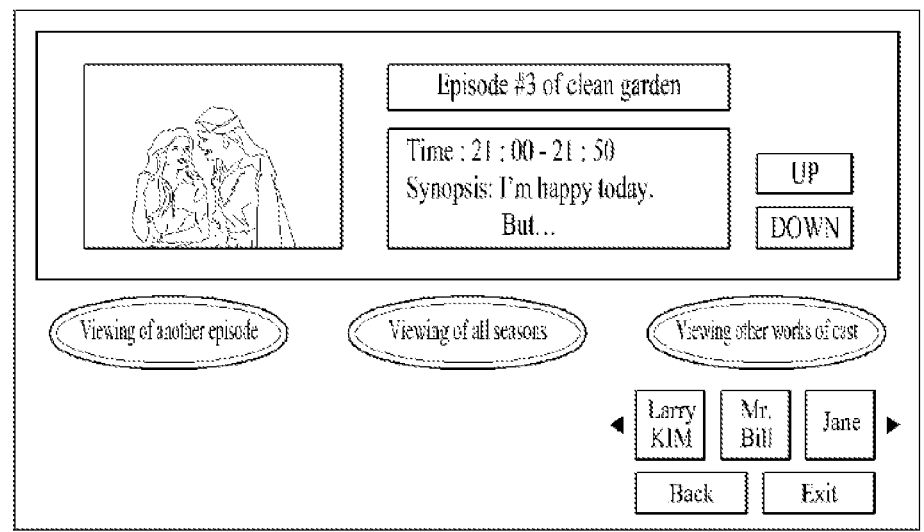
(b)

DISPLAY APPARATUS CONNECTED TO PLURAL SOURCE DEVICES AND METHOD OF CONTROLLING THE SAME

This application is a Continuation of co-pending U.S. patent application Ser. No. 13/288,662 filed Nov. 3, 2011, which claims the benefit of Korean Patent Application No. 10-2011-0047776 filed on May 20, 2011, the entire contents of all of the above applications are hereby incorporated by reference.

BACKGROUND OF THE INVENTION

Field of the Invention

The present invention relates to a display apparatus for providing an enhanced electronic program guide (EPG) and a method of controlling the same.

Discussion of the Related Art

A display apparatus receives, processes and displays a broadcast image which a user can view. Digital broadcasting is becoming more popular and transmits digital video and audio signals. Digital broadcasting is highly resistant to external noise and thus exhibits little data loss, is advantageous in terms of error correction, and provides a clear image at a high resolution, compared to analog broadcasting. Further, digital broadcasting provides bi-directional services.

In addition, a smart TV includes the functions an image display apparatus and also includes additional multimedia functions. The digital broadcast also includes hundreds of TV channels that may be selected by a user, and the number of channels is increasing exponentially worldwide. However, the related art Electronic Program Guide (EPG) provides only fixed text such as the title and time of a program. This inconveniences the user.

SUMMARY OF THE INVENTION

Accordingly, one object of the present invention is to address the above-noted and other problems of the related art.

Another object of the present invention is to provide a display apparatus connected to plural source devices and a method of controlling the same.

Still another object of the present invention is to define a data transmission protocol to generate an enhanced EPG.

Another object of the present invention is to automatically classify episodes according to plural source devices.

A further object of the present invention is to provide a user interface enabling a user to easily select a specific episode of specific content.

To achieve this object and other advantages and in accordance with the purpose of the invention, as embodied and broadly described herein, the present invention provides in one aspect a method of controlling a display apparatus connected to plural source devices, the method including receiving first metadata corresponding to contents to be displayed on the display apparatus from a first source externally connected to the display apparatus; receiving second metadata corresponding to contents to be displayed on the display apparatus from a second source externally connected to the display apparatus that is different than the first source; processing the first metadata and the second metadata received from both of the first and second sources; generating a program guide comprising graphic data indicating the contents corresponding to at least one of the first and second metadata; and displaying the generated program guide, wherein a position of the graphic data is arranged in a predetermined order.

In another aspect, the present invention provides a network device connected to plural source devices, the network device including a receiver configured to receive first metadata corresponding to contents to be displayed on the network device from a first source externally connected to the network device, and to receive second metadata corresponding to the contents to be displayed on the network device from a second source externally connected to the network device that is different than the first source; and a controller configured to process the first and second metadata from both of the first and second sources, to generate a program guide comprising graphic data indicating the contents corresponding to at least one of the first and second metadata, and to control the network device to display the generated program guide, wherein a position of the graphic data is arranged in a predetermined order.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure, In the drawings:

FIG. 3 is a view illustrating a data structure which may be used in a process of executing the enhanced EPG in accordance with an embodiment of the present invention;

FIG. 8 is a view illustrating a process of switching from a first mode to a second mode while executing the enhanced EPG in accordance with an embodiment of the present invention;

FIG. 11 is a view illustrating one process of extracting a representative event used in the enhanced EPG in accordance with an embodiment of the present invention;

FIG. 26 is a view illustrating a stored table including data to implement the enhanced EPG in accordance with an embodiment of the present invention;

FIG. 29 is a view illustrating another stored table to store including data used to implement the enhanced EPG in accordance with an embodiment of the present invention;

FIG. 37 is a view illustrating a second mode to enter the enhanced EPG in accordance with an embodiment of the present invention;

FIG. 38 is a view illustrating a third mode to enter the enhanced EPG in accordance with an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A display apparatus stated in the following description is, for example, an intelligent network TV in which a computer support function is added to a broadcast reception function. That is, the display apparatus has an Internet function added to the broadcast reception function, and thus may be provided with an interface which is more convenient to use than an input unit in a handwriting manner, a touch screen or a remote controller.

Further, the display apparatus may be connected to the Internet or a computer by a wire or wireless Internet function, thus executing e-mail, Web browsing, banking or game functions, etc. In order to achieve these various functions, a standardized OS may be used. The display apparatus stated in the following description may also freely add or delete various applications to or from, for example, a general OS kernel, thus executing various user friendly functions.

Figure 1:
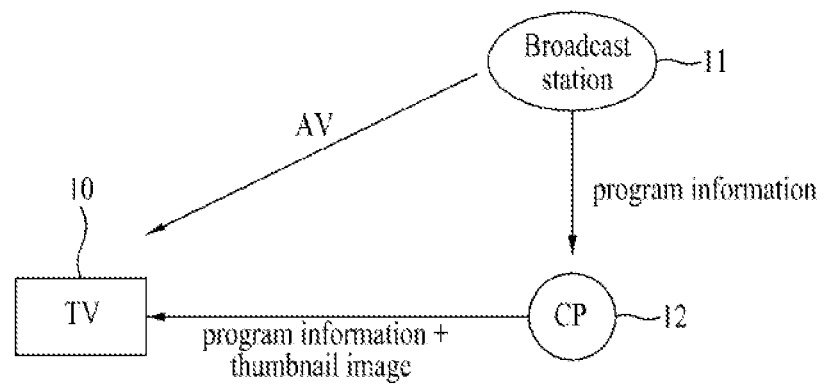
FIG. 1 is a view illustrating a system for implementing an enhanced EPG in accordance with one embodiment of the present invention.

FIG. 1 is a view illustrating one example of a system for implementing an enhanced EPG in accordance with one embodiment of the present invention. As shown in FIG. 1, a TV 10 includes at least one tuner and receives AV data of a general broadcast program from a broadcast station 11.

A Content Provider (CP) 12 provides thumbnail images of respective events for the enhanced EPG by first collecting program information from the broadcast station 11. The program information corresponds to, for example, a table format in an event information table (EIT) type, and will be described in more detail later with reference to FIG. 3. Further, although the embodiment illustrates the EIT as the program information, the program information is not limited to the EIT.

The events stated herein correspond to, for example, broadcast program units. Further, the CP 12 does not depend only on the EIT information received from the broadcast station 11, but secondarily provides thumbnail image data corresponding to at least one event belonging to a random channel. Of course, the CP 12 may use the received EIT information, as it is, or define and use more compact data including only information used to execute the enhanced EPG (for example, start time, overall run time, or title information of each event).

The CP 12 also transmits the EIT information and the thumbnail image data corresponding to the respective events to the TV 10. Therefore, the TV 10 provides an EPG screen in which user recognition is more reinforced as compared to the related art fixed type text EPG. This will be described in more detail later with reference to FIG. 8.

Figure 2:
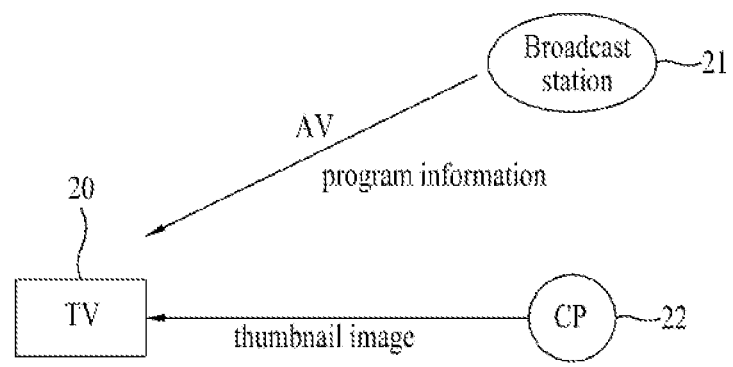
FIG. 2 is a view illustrating another system for implementing the enhanced EPG in accordance with an embodiment of the present invention.

Next, FIG. 2 is a view illustrating another example of the system for implementing the enhanced EPG in accordance with an embodiment of the present invention. Differing from FIG. 1, a TV 20 shown in FIG. 2 receives information through two paths. That is, the program information which is basic information to implement the enhanced EPG is transmitted from a broadcast station 21, and thumbnail image data to implement the enhanced EPG is transmitted from a CP 22. The program information corresponds to, for example, an EIT. Further, the program information is not limited to the EIT.

In addition, the TV 20 processes data received through the two different paths, and forms an enhanced EPG screen regarding events in a designated time zone by processing the combined data. The above enhanced EPG will be described in more detail later with reference to FIG. 8.

Next, FIG. 3 is a view illustrating one example of a data structure which may be used in a process of executing the enhanced EPG in accordance with an embodiment of the present invention. In the EIT shown in FIG. 3, a table_id field represents a unique identifier (ID) assigned to identify the EIT. That is, the table_id field represents a value indicating that a table to which a received section belongs is the EIT.

A section_syntax_indicator field may be set to '1' to indicate that a general MPEG-2 section syntax follows a section_length field '1' may be assigned to a private_indicator field. The section_length field represents a length from the section_length field to the end of the section, i.e., the remaining length of the section, by byte.

A source_id field represents a source ID of a virtual channel transmitting events stated in the section. A version_number field represents a version value of EIT-i. The version_number field may be represented by a remainder value obtained by adding 1 to the value of the EIT-i and then dividing the obtained sum by 32, when the content of EIT-i is changed.

A current_next_indicator field represents that the transmitted table is applicable at all times, and may be set to '1'. A section_number field represents the number of the corresponding section. A last_section_number represents the number of the last section of the complete EIT. A protocol_version field is initially set to '0', and is set to another value other than '0' when the protocol is changed. A num_events_in_section field represents the number of events present in the corresponding EIT section. If the num_events_in_section field is '0', this indicates that there is no event defined in the corresponding section.

After the num_events_in_section field, an event loop which is repeated by the number of the events in the section is present. Such an event loop may include an event_id field, a start_time field, an ETM_location field, a length_in_seconds field, a title_length field and a title_text( ) field.

Further, the event loop may further include a descriptor_length field and a descriptor( ) field which are individually applied to the respective events. The event_id field represents an ID number to identify a corresponding event in the event loop. Such an ID number may be used as a part of the ETM-id.

The start_time field represents a start time of the event. The ETM_location field represents presence and position of an extended text message (ETM). The length_in_seconds field represents a duration time of the event in seconds. In addition, the title_length field represents a length of the following title_text( ) field by byte. The title_length field value being '0' means that a title of the corresponding event is not present.

Further, the title_text( ) field represent an event title of a multiple character string structure, and the descriptor_length field represents the total length of a following event descriptor by byte.

Further, in accordance with another embodiment of the present invention, the CP or TV does not have to use all of the EIT data shown in. FIG. 3, but the minimum data necessary to execute the enhanced EPG (for example, the start_time field, the length_in_seconds field and the title_text( )field) may be extracted to firstly generate a more compact data structure than the related art EIT. Then thumbnail images corresponding to the respective events can be added to the generated data structure and the added data transmitted to the TV.

Figure 4:
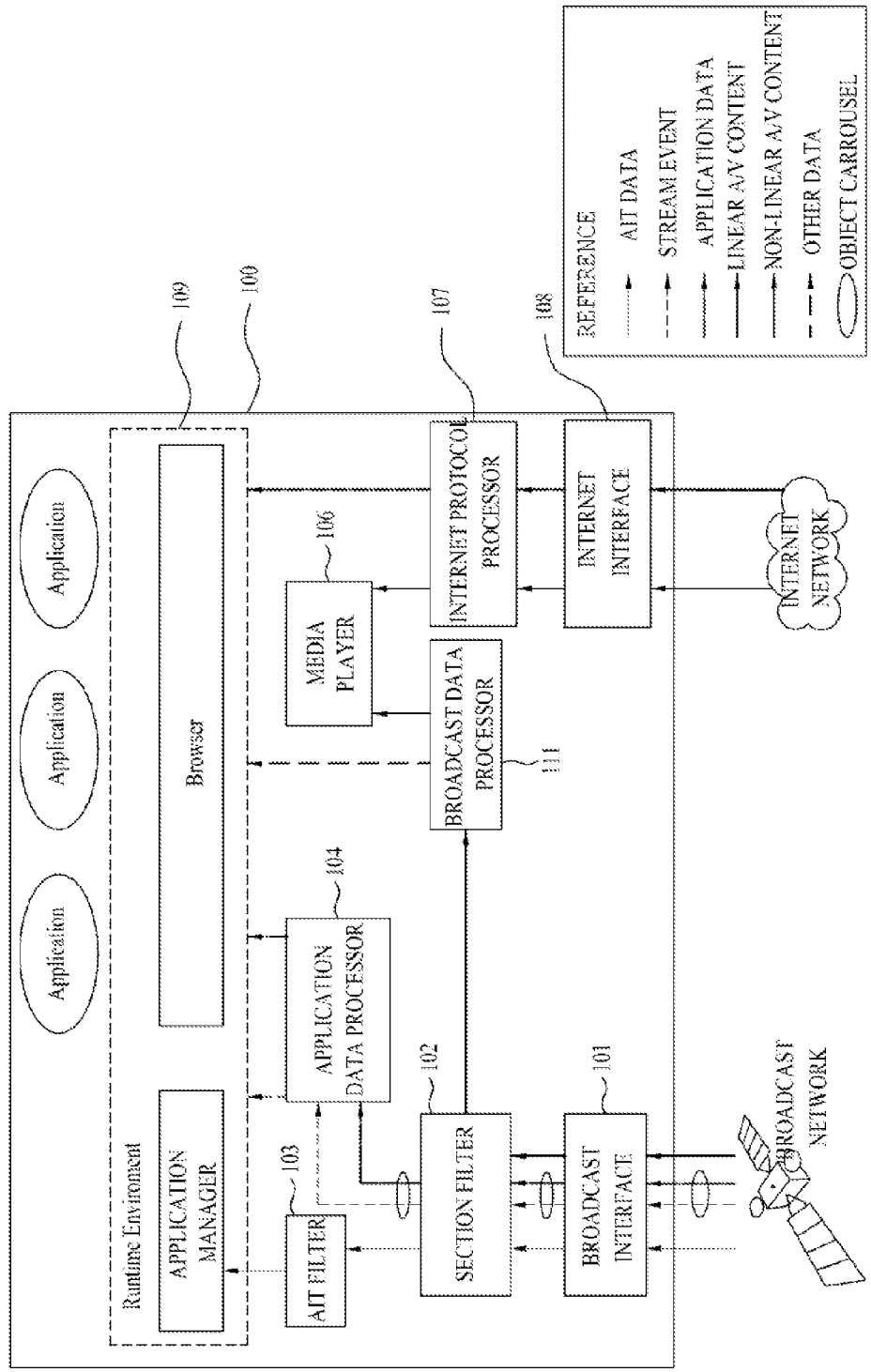
FIG. 4 is a block diagram illustrating elements of an HBBTV for executing the enhanced EPG in accordance with an embodiment of the present invention.

Next, FIG. 4 is a block diagram illustrating elements of an Hybrid Broadcast Broadband TV (HBBTV) 100 for executing the enhanced EPG in accordance with, an embodiment of the present invention. As shown in FIG. 4, the HBBTV 100 includes, for example, a broadcast interface 101, a section filter 102, an AIT filter 130, an application data processor 104, a broadcast data processor 11, a media player 106, an Internet protocol processor 107, an Internet interface 108, and a run time module 109. Here, the present invention is not limited by the elements shown in FIG. 4, and modules may be added or deleted as needed.

Further, application information table (AIT) data, a real-time broadcast content, application data and stream events are received through the broadcast interface 101. Here, the real-time broadcast content may be referred to as linear A/V content.

In addition, the section filter 102 executes section-filtering of the four data received through the broadcast interface 101, transmits the AIT data to the AIT filter 103, transmits the linear A/V content to the broadcast data processor 111, and transmits the stream events and the application data to the application data processor 104.

A non-linear A/V content and application data are also received through the Internet interface 108. Here, the non-linear A/V content, for example, may be content on demand (COD) applications. In addition, the non-linear A/V content is transmitted to the media player 106 and the application data is transmitted to the run time module 109.

Further, the run time module 109 includes, for example, an application manager and a browser, as shown in FIG. 4. The application manager, for example, controls life cycles of interactive applications using AIT data. The browser, for example, displays and processes the interactive applications.

For example, if the TV of the system shown in FIG. 2 is implemented as the HBBTV shown in FIG. 4, the HBBTV 100 is designed such that the broadcast interface 101 receives the EIT data and the Internet interface 108 receives the thumbnail image data corresponding to the events.

Figure 5:
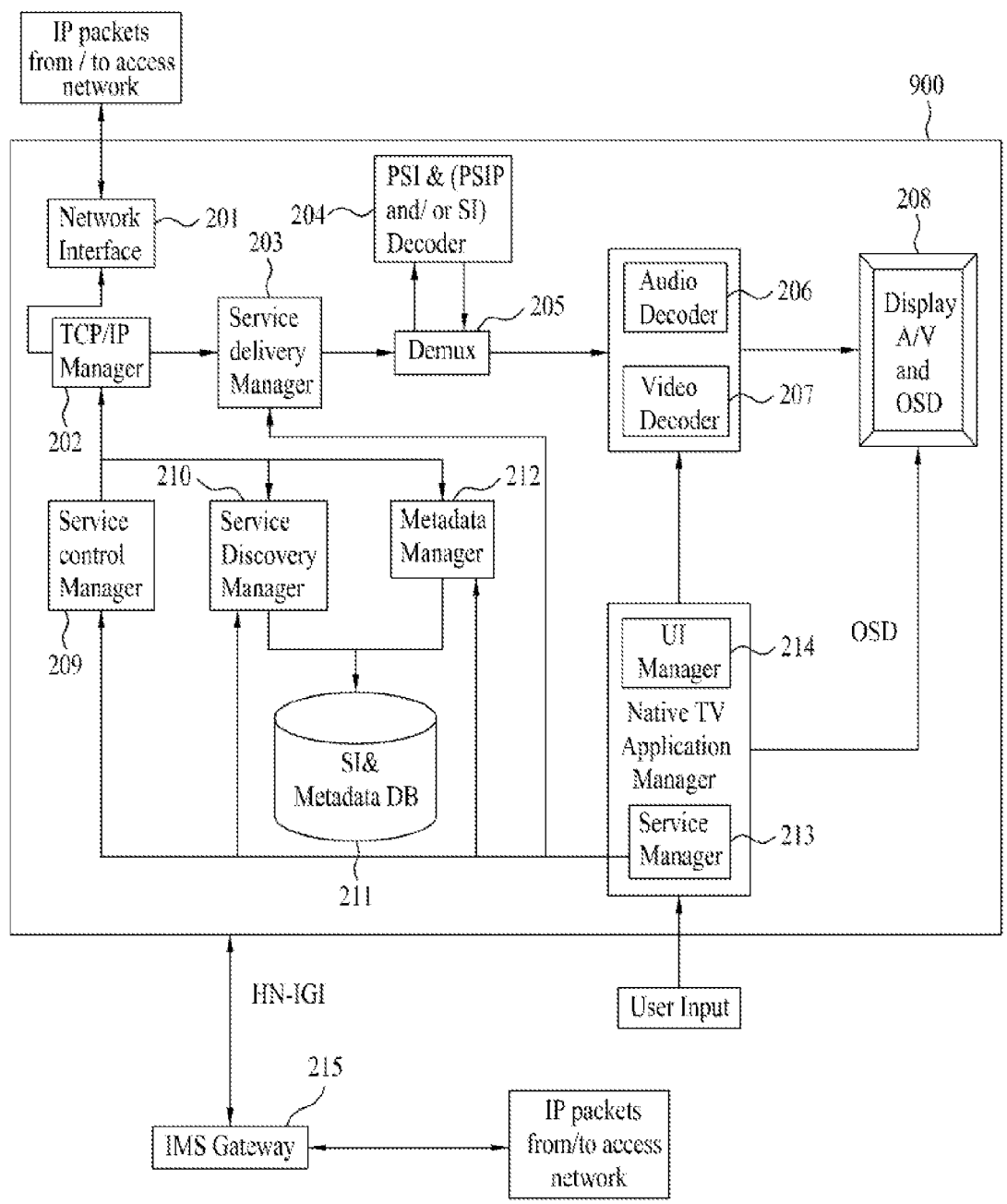
FIG. 5 is a block diagram illustrating elements of an IPTV for executing the enhanced EPG in accordance with the embodiment of the present invention.

Next, FIG. 5 is a block diagram illustrating elements of an IPTV for executing the enhanced EPG in accordance with an embodiment of the present invention. As shown in FIG. 5, an IPTV 900 includes, for example, a network interface 201, a TCP/IP manager 202, a service delivery manager 203, a demultiplexer 205, a PSI & (PSIP and/or SI) decoder 204, an audio decoder 206, a video decoder 207, display A/V and OSD module 208, a service control manager 209, a service discovery manager 210, a metadata manager 212, SI &metadata DB 211, a UI manager 214, and a service manager 213. Here, the present invention is not limited by the elements shown in FIG. 5, and modules may be added or deleted as needed.

The network interface 201 receives packets received from a network and transmits the packets to the network. That is, the network interface 201 receives services and contents from a service provider through the network. The TCP-IP manager 202 is involved in packets received by the IPTV 900 and packets transmitted from the IPTV 900, i.e., receipt and transmission of packets from a source to a destination.

Further, the TCP-IP manager 202 classifies the received packets so as to correspond to proper protocols, and outputs the classified packets to the service delivery manager 203, the service discovery manager 210, the service control manager 209 and the metadata manager 212. In addition, the service delivery manager 203 is in charge of control of received service data. For example, if the service delivery manager 203 is in charge of control real-time streaming data, the service delivery manager 203 may use RTP/RTCP.

If the service delivery manager 203 transmits the real-time streaming data using the RTP, the service delivery manager 203 executes parsing of the received data packets according to the RTP and then transmits the received data packets to the demultiplexer 205 or stores the received data packets in the SI & metadata DB 211 under the control of the service manager 213. Further, the service delivery manager 203 executes feedback of data received through the network to a server providing services using the RTCP.

The demultiplexer 205 demultiplexes the received packets to audio, video and program specific information (PSI) data, and transmits the data to the audio and video decoders 206 and 207 and the PSI & (PSIP and/or SI) decoder 204. The PSI & (PSIP and/or SI) decoder 204 decodes service data, for example, the program specific information (PSI). That is, the PSI & (PSIP and/or SI) decoder 204 receives and decodes a PSI section, a program and service information protocol (PSIP) section or a service information (SI) section demultiplexed by the demultiplexer 205.

Further, the PSI & (PSIP and/or SI) decoder 204 forms a database including service information by decoding the received section, and the database including the service information is stored in the SI & metadata DB 211. The audio and video decoders 206 and 207 decode the audio data and video data received from the demultiplexer 205. The audio data decoded by the audio decoder 206 and the video data decoded by the video decoder 207 are provided to a user through the display A/V and OSD module 208.

The UI manager 214 and the service manager 213 manage the overall state of the image display apparatus 900, provide a user interface, and manage other managers. Further, the UI manager 214 provides a graphic user interface using an on screen display (OSD), and executes receiver operation according to key input received from the user. For example, when the key input regarding channel selection is received from the user, the UI manager 214 transmits the key input signal to the service manager 213.

The service manager 213 controls managers relating to services, such as the service delivery manager 203, the service discovery manager 210, the service control manager 209 and the metadata manager 212. Further, the service manager 213 builds a channel map and selects a channel using the channel map according to a key input received from the UI manger 214. The service manager 213 receives service information of the channel from the PSI & (PSIP and/or SI) decoder 204 and transmits an audio/video packet identifier (PID) of the selected channel to the demultiplexer 205.

The service discovery manager 210 provides information used to select the service provider providing a service. When a signal regarding channel selection is received from the service manager 213, the service discovery manager 210 searches a service using the information.

The service control manager 209 is in charge of service selection and control. For example, the service control manager 209 executes service selection and control using IGMP or RTSP, if a user selects a live broadcast service in the same manner as the conventional broadcasting method, and executes service selection and control using the RTSP, if a user selects a service such as video on demand (VOD). Such RTSP may provide a trick mode to real-time streaminmg.

Further, the service control manager 209 can initialize and manage a session going through an IMC gateway using an IP multimedia subsystem (IMS) or a session initiation protocol (SIP). These protocols are only exemplary and other protocols may be used according to embodiments of the present invention.

The metadata manager 212 manages metadata relating to services and stores the metadata in the SI & metadata DB 211. The SI & metadata DB 211 stores the service information decoded by the PSI & (PSIP and/or SI) decoder 204, the metadata managed by the metadata manager 212 and the information necessary to select the service provider provided by the service discovery manager 210. Further, the SI & metadata DB 211 can store setup data of the system.

The SI & metadata DB 211 may be implemented using a nonvolatile PAM (NVRAM) or a flash memory. An IMS gateway 250 is a gateway having functions used to access an IMS-based IPTV service. For example, if the TV of the system shown in FIG. 1 is implemented as the IPTV shown in FIG. 5, the IPTV 900 is designed such that the network interface 201 receives both the EIT data transmitted from the CP and the thumbnail image data corresponding to respective events. FIG. 5 also illustrates an IMS Gateway 215 interfacing with the IPTV 900.

Figure 6:
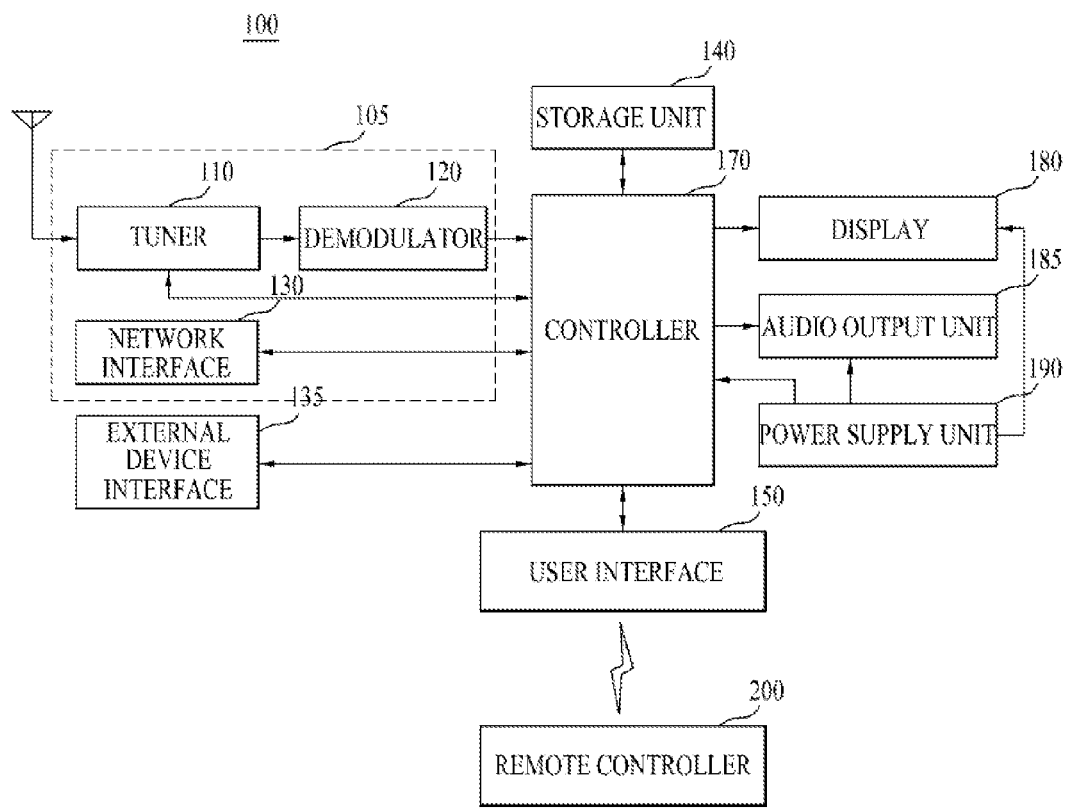
FIG. 6 is a block diagram briefly illustrating an HBBTV including an external device interface.

Next, FIG. 6 is a block diagram illustrating the HBBTV 100 including an external device interface. Although FIG. 6 illustrates the TV 100 including a display module, a network device (for example, an STB) which does not include the display module shown in FIG. 6 may be applied to the present invention.

As shown in FIG. 6, the HBBTV 100 in accordance with another embodiment of the present invention includes a broadcast receiver 105, an external device interface 135, a storage unit 140, a UI interface 150, a controller 170, a display 180, an audio output unit 185, and a power supply unit 190. A photographing unit can also be included.

The broadcast receiver 105 includes a tuner 110, a demodulator 120 and a network interface 130. The broadcast receiver 105 may be designed to include the tuner 110 and the demodulator 120 without the network inter-face 130 or include only the network interface 130 without the tuner 110 and the demodulator 120, as needed.

Further, the tuner 110 selects a radio frequency (RF) broadcast signals corresponding to a channel selected by a user or all channels stored in advance from among RD broadcast signals received through an antenna. The demodulator 120 receives a digital IF (DIF) signal converted by the tuner 110 and executes demodulation.

In addition, the demodulator 120 can output a stream signal after execution of demodulation and channel decoding. Here, the stream signal may be a signal in which a video signal, an audio signal and/or a data signal are multiplexed. For example, the steam signal may be a multiplexed MPEG-2 transport stream (TS) in which an MPEG-2 standard video signal and a Dolby AC-3 standard audio signal are multiplexed. Specifically, the MPEG-2 TS may include a header of 4 bytes and a payload of 184 bytes.

Further, the stream signal output from the demodulator 120 can be input to the controller 170. The controller 170 then outputs an image to the display 180 and outputs audio to the audio output unit 185 after execution of demultiplexing and video/audio signal processing. Also, the external device interface 135 can connect the HBBTV 100 to an external device. For this purpose, the external device interface 135 may include A/V input/output units and a wireless communication unit.

The external device interface 135 can also be connected to an external device such as a digital versatile disc (DVD), a blue-ray disc (BD) player, a game machine, a camera, a camcorder or a computer (notebook), by wire or wirelessly. Further, the external device interface 135 can receive applications or an application list in an adjacent external device and transmit the applications or the application list to the controller 170 or the storage unit 140.

The network interface 130 may include, for example, an Ethernet terminal for connection with a wired network, and use, for example, wireless LAN (WLAN) (Wi-Fi), wireless broadband (Wibro), world interoperability for microwave access (Wimax), and high speed downlink packet access (HSDPA) communication standards for connection with a wireless network. Further, the network interface 130 may selectively receive a desired application from among applications open to the public through a network.

In addition, the storage unit 140 can store programs to process and control the respective signals in the controller 170 or store the video, audio or data signal which has been processed. Further, the storage unit 140 can execute a function of temporarily storing the video, audio or data signal input from the external device interface 135 or the network interface 130. The storage unit 140 can also store the applications or the application list input from the external device interface 135 or the network interface 130.

The UI interface 150 transmits a signal input by a user to the controller 170, or transmits a signal from the controller 170 to the user. For example, the UI interface 150 may receive and process a control signal regarding power ON/OFF, channel selection or screen setting from a remote controller 200, or transmits a control signal from the controller 170 to the remote controller 200, according to various communication schemes such as a radio frequency (RF) communication scheme and an IR communication scheme.

In addition, the controller 170 can demultiplex a stream input through the tuner 110, the demodulator 120 or the external device interface 135 or process demultiplexed signals, thus generating and outputting signals to output an image or audio. The video signal processed by the controller 170 can then be input to the display 180, and the display 180 can display an image corresponding to the corresponding video signal.

Further, the video signal processed by the controller 170 can be input to an external output device through the external device interface 135. The audio signal processed by the controller 170 may be input to the audio output unit 185, and the audio output unit 185 may output audio. Also, the audio signal processed by the controller 170 can be input to the external output device through the external interface 135.

In addition, the display 180 converts the video signal, the data signal or the OSD signal, processed by the controller 170, or the video signal or the data signal, received by the external device interface unit 135, into R, G and B signals, thus generating a drive signal. The display 180 can use a PDP, an LCD, an OLED, a flexible display or a 3D display.

Further, the audio output unit 185 receives the audio signal processed by the controller 170, for example, a stereo signal, a 3.1 channel signal or a 5.1 channel signal, and then outputs audio. The audio output unit 185 may also use various types of speakers.

In addition, the power supply unit 190 supplies corresponding power to the elements of the HBBTV 100. Particularly, the power supply unit 190 can supply power to the controller 170 implemented in a system on chip (SOC) type, the display 180 to display an image, and the audio output unit 185 to output audio.

The remote controller 200 also transmits user input to the UI interface 150. For this purpose, the remote controller 200 can use a BLUETOOTH communication scheme, an radio frequency (RF) communication scheme, an IR communication scheme, an ultra wideband (UWB) communication scheme or a Zigbee communication scheme. Particularly, the remote controller 200 will be described later with reference to FIGS. 13 and 14.

Also, the tuner 110 receives AV data of broadcast programs. The tuner 110 can also be replaced by a first network interface. Further, instead of the tuner 110, the network interface 130 can be designed to receive AV data. Here, the AV data corresponds to, for example, data transmitted from an external CP or data transmitted from a broadcast station.

In addition, the network interface 130 receives information regarding at least one event provided by each channel and a thumbnail image corresponding to the event. For example, the network interface 130 may be designed as a second network interface. Therefore, the above-described first network and second network may be designed as different communication networks or as the same communication network.

Further, the UI interface 150 receives a command signal to execute the enhanced EPG, and the controller 170 detects a representative event from at least one event belonging to a designated time zone. Also, an OSD generator 340 shown in FIG. 7 generates an enhanced EPG on screen display (OSD) including a thumbnail image corresponding to the detected representative event in the designated time zone. The above OSD generator 340 will be described in detail later with reference to FIG. 7.

In addition, the term "enhanced EPG OSD" means, for example, an image of the enhanced EPG information in accordance with one embodiment of the present invention, which is displayed on a screen. Further, the above image may be designed to occupy the entirety of the screen or to be overlaid on another screen.

Also, in accordance with the embodiment of the present invention, the display 180 is designed to output the generated enhanced EPG OSD. Further, in accordance with another embodiment of the present invention, the display 180 is omitted. For example, the display 180 can be replaced by a transmission module to transmit the generated enhanced EPG OSD to an external display device. The network interface 130 shown in FIG. 6 may be designed to execute the function of such a transmission module.

The above-described enhanced EPG OSD will be described in more detail with reference to FIG. 8. Further, in accordance with another embodiment of the present invention, the controller 170 calculates time-based shares of the respective events belonging to the designated time zone, and to regard an event having the highest time-based share as a representative event based on a result of the calculation. This will be described in detail later with reference to FIG. 11.

In accordance with yet another embodiment, the controller 170 detects access histories of the respective events belonging to the designated time zone, and to regard an event having the highest access priority as a representative event. The access history includes at least one of the number of access attempts to each event and the total display time of each event.

Figure 7:
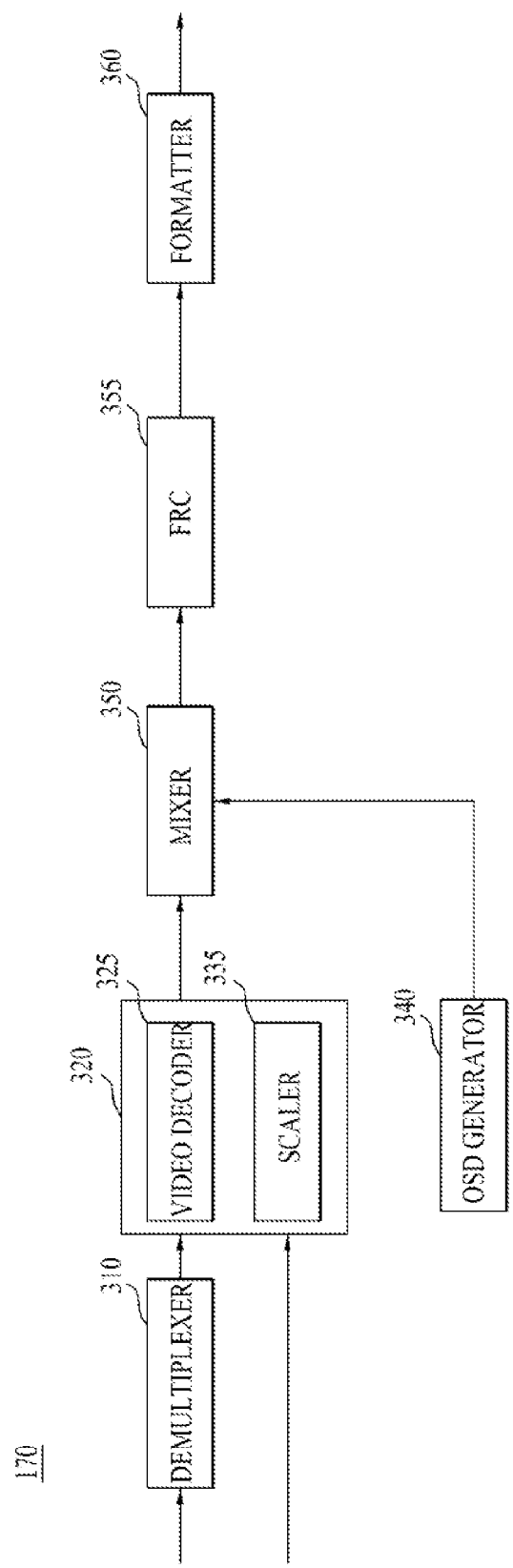
FIG. 7 is a block diagram illustrating a controller shown in FIG. 6 in detail.

Next, FIG. 7 is a block diagram illustrating the controller 170 shown in FIG. 6 in detail. The controller 170 can be designed to be used by other display apparatuses (for example, a smart TV, a Web TV, an IPTV, a network. TV, etc.) instead of the HBBTV.

As shown in FIG. 7, the controller 170 includes a demultiplexer 310, a video processor 320, the OSD generator 340, a mixer 350, a frame rate converter 355, and a formatter 360. The controller 170 may also include an audio processor and a data processor.

Further, the demultiplexer 310 demultiplexes an input stream, and the video processor 320 processes a demultiplexed video signal. Therefore, the video processor 320 includes a video decoder 325 and a scaler 335.

Also, the video decoder 325 decodes the demultiplexed video signal, and the scaler 335 executes scaling to increase resolution of the decoded video signal so as to be output through the display 180. The video signal decoded by the video processor 320 is then input to the mixer 350.

The OSD generator 340 generates an OSD signal according to user input or by itself. For example, the OSD generator 340 can generate a signal to display various pieces of information in graphic or text on the screen of the display 180, based on the control signal from the UI interface 150.

For example, the OSD generator 340 generates an OSD including a main region which displays a thumbnail image corresponding to a representative event in a specific time zone and a sub-region which guides the number of events belonging to the designated time zone. This will be described in detail later with reference to FIG. 15.

In addition, the mixer 350 mixes the OSD signal generated by the OSD) generator 340 and the decoded video signal processed by the video processor 320. The mixed signal is then provided to the formatter 360. Further, the OSD may be overlaid on a broadcast image or an external input image due to mixing of the decoded broadcast video signal or external input signal with the OSD signal.

Also, the frame rate converter (FRC) 355 can convert a frame rate of an input image. For example, the FRC 355 converts a frame rate of 60 Hz into 120 Hz or 240 Hz. If the frame rate of 60 Hz is converted into 120 Hz, another first frame or a third frame predicted from the first frame and the second frame can be interposed between a first frame and a second frame. If the frame rate of 60 Hz is converted into 240 Hz, three first frames or three predicted frames can be interposed between the first frame and the second frame. Alternatively, the input frame rate may be maintained without conversion.

The formatter 360 receives a signal output from the FRC 355, changes format of the signal so as to be suitable for the display 180, and then outputs the changed signal. For example, the formatter 360 can output R, G and B data signals, and the R, G and B data signals can be output using low voltage differential signaling (LVDS) or mini-LVDS.

Next, FIGS. 8(*a*) and 8(*b*) are views illustrating a process of switching from a first mode to a second mode while executing the enhanced EPG in accordance with an embodiment of the present invention. As shown in FIGS. 8(*a*) and 8(*b*), the enhanced EPG includes two modes. In the first mode shown in FIG. 8(*a*), event information of all channels in each time of 1 day is displayed. On the other hand, in the second mode shown in FIG. 8(*b*), all event information of a specific channel for 7 days is displayed. Particularly, as described above, the OSD displaying thumbnail images corresponding to the respective events is generated, thus providing a more enhanced EPG screen.

Further, in order to improve user convenience, a tab 801 to select each mode can be designed in a toggle type. Further, respective elements of the mode in the enhanced EPG screen shown in FIG. 8(*b*) will be described in detail later with reference to FIG. 10.

Figure 9:
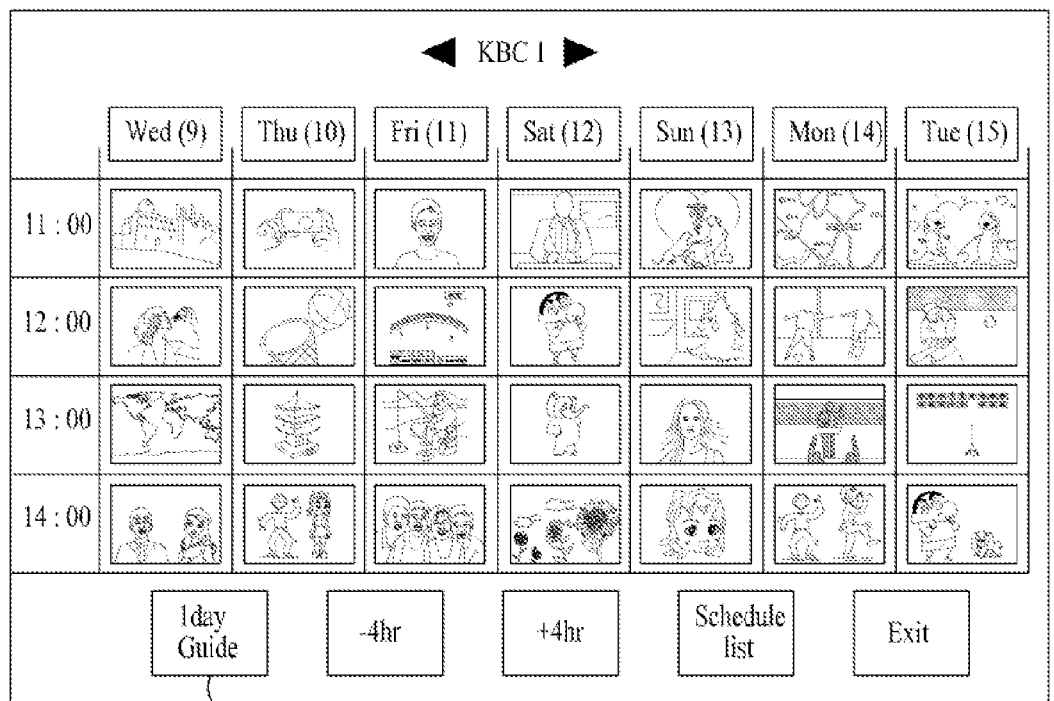
FIG. 9 is a view illustrating a process of switching from the second mode to the first mode while executing the enhanced EPG in accordance with an embodiment of the present invention.

FIGS. 9 (*a*) and 9(*b*) are views illustrating a process of switching from the second mode to the first mode while executing the enhanced EPG in accordance with an embodiment of the present invention. Differently from FIGS. 8(*a*) and 8(*b*), FIGS. 9(*a*) and 9(*b*) illustrate the process of switching from the second mode to the first mode.

For example, when a tab 901 displaying a 1 day guide is selected in the second mode of the enhanced EPG shown in FIG. 9(*a*), event information of all channels in each time of 1 day is displayed as shown in FIG. 9(*b*).

Figure 10:
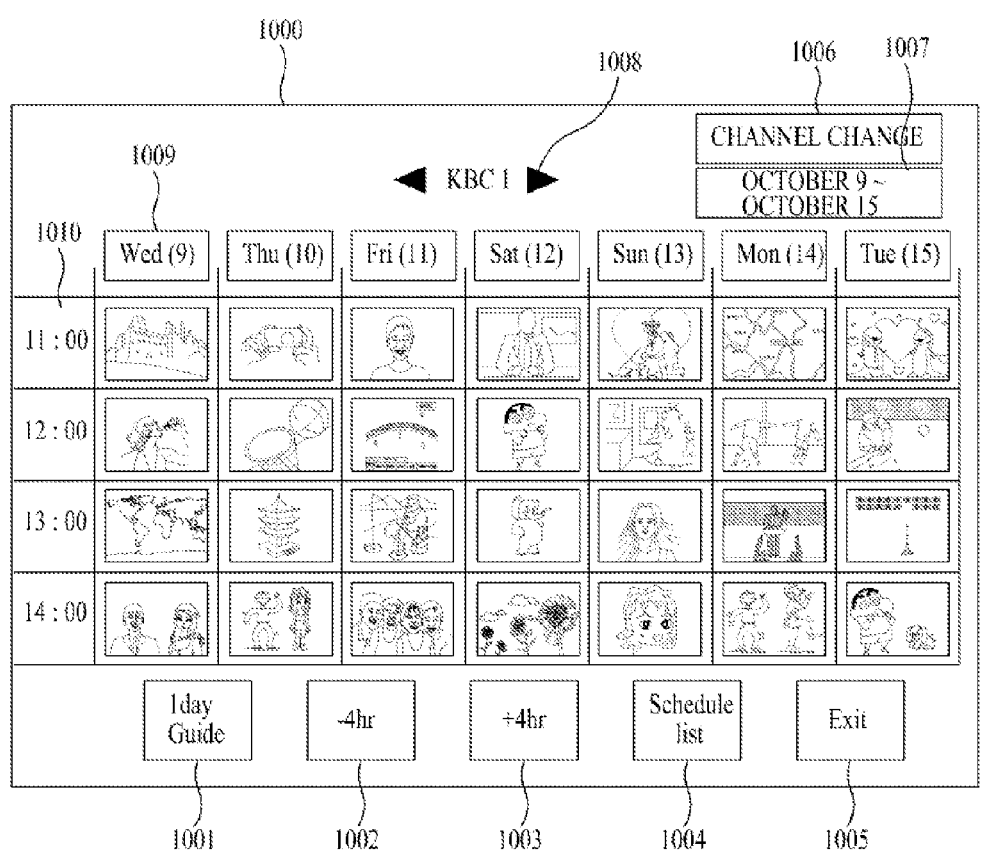
FIG. 10 is a view illustrating a specific mode during execution of the enhanced EPG in accordance with an embodiment of the present invention in detail.

Next, FIG. 10 is a view illustrating a specific mode during execution of the enhanced EPG in accordance with an embodiment of the present invention in detail. FIG. 10 is an enlarged view of FIG. 8(*b*) or 9(*a*).

As shown, a display apparatus 1000 received an executing command of the enhanced EPG and displays event information of a specific channel for 7 days. In particular, thumbnail images corresponding to respective events are displayed. If a 1 day guide tab 1001 shown in FIG. 10 is selected, the screen is switched to the screen of FIG. 8(*a*) or 9(*b*).

Further, an indicator 1008 enabling a user to easily select a desired channel is displayed. A window 1006 enabling the user to directly input a specific channel is also displayed. Differing from the related art EPG, the enhanced EPG in accordance with an embodiment of the present invention is divided by a time scale 1010 and a day scale 1009 and displays a tab 1007 enabling the user to select a desired week.

Further, in consideration of the size of the screen, for example, the EPG is configured every 4 hours, and a tab 1002 enabling the user to select a previous 4 hours and a tab 1003 enabling the user to select a next 4 hours are additionally displayed, thereby increasing user convenience. The respective events displayed on the enhanced EPG shown in FIG. 10 may also be reserved, and a schedule list tab 1004 is provided to process reservation of the events. This will be described in more detail later with reference to FIGS. 17 to 21.

Further, the enhanced EPG has a function of returning to the former screen instead of the screen shown in FIG. 10, and such a function is executed by enabling the user to select an exit tab 1005 shown in FIG. 10.

Next, FIG. 11 is a view illustrating one process of extracting a representative event used in the enhanced EPG in accordance with an embodiment of the present invention. In particular, the previous FIG. 10 illustrates one thumbnail image being displayed in each time zone (for example, every 1 hour), but at least two events may belong to each time zone. Therefore, information to decide which thumbnail image corresponding to one event is displayed in each time zone.

The left side of FIG. 11 shows a time table of actual broadcast programs (events). As shown, two events including the "9 o'clock news" and "drama" are present between 9 o'clock and 10 o'clock, and two events including "drama" and "sports news" are present between 10 o'clock and 11 o'clock. Further, two events including "learning English" and "movie" are present between 11 o'clock and 12 o'clock.

In accordance with one embodiment of the present invention, an event occupying the longest time in each time zone is designated as the top priority. Therefore, as shown in the right side of FIG. 11, a thumbnail image corresponding to an event having the top priority between 9 o'clock and 10 o'clock, i.e., "9 o'clock news", is designated as a representative thumbnail image. If there are plural events occupying the same time, the top priority is granted to an event having an earlier start time.

Such a process is performed in consideration of the general user desire not to display events (broadcast programs) having short run times on the EPG. Solutions to satisfy other users' desire to confirm the overall events will be described later with reference to FIGS. 15 and 16.

Figure 12:
FIG. 12 is a view illustrating another process of extracting a representative event used in the enhanced EPG in accordance with an embodiment of the present invention.

Next, FIG. 12 is a view illustrating another process of extracting a representative event used in the enhanced EPG in accordance with an embodiment of the present invention. The process of FIG. 12 differs from the process of FIG. 11 in that the process of FIG. 12 uses a user profile.

In particular, the user profile corresponds to, for example, the number of viewing times of a specific event or the total viewing time of the specific event. As shown in the left side of FIG. 12, two events including the "9 o'clock news" and "drama" are present between 9 o'clock and 10 o'clock. Further, information indicating that the "9 o'clock news" has been viewed three times for a total of 47 minutes is stored in the memory 140. For example, information indicating that "drama" was viewed one time for a total of 10 minutes is stored in the memory 140.

Therefore, as shown in the right side of FIG. 12, "9 o'clock news" having the largest number of viewing times and the longest total viewing time is designated as a representative event in the above-described time zone (between 9 o'clock and 10 o'clock).

In accordance with another embodiment of the present invention, a representative event may be designated using one of the number of viewing times and the total viewing time. Further, a representative event may be designated by applying different weight values to the number of viewing times and the total viewing time.

As described above with reference to FIGS. 11 and 12, there are two methods for extracting representative events used in the enhanced EPG in accordance with an embodiment of the present invention. Next, two other methods for extracting representative events in accordance with another embodiment of the present invention will be described.

A first method collects information regarding audience ratings of events belonging to each time zone (for example, every 1 hour). The information regarding audience ratings may be received from, for example, an external CP. In particular, assume three events (an event A, an event B and an event C) are present between 9 o'clock and 10 o'clock, the audience rating of the event A is 15%, the audience rating of the event B is 10% and the audience rating of the event C is 25%.

Therefore, in this method, a representative event in a specific time zone (for example, between 9 o'clock and 10 o'clock) is designated according to audience rating. That is, the event C having the audience rating of 25% is selected as the representative event and is displayed on the EPG screen.

A second method collects additional information regarding Social Network Service (SNS) of events in each time zone (for example, every 1 hour). The additional information regarding SNS may be received from, for example, a specific SNS server (for example, FACEBOOK or TWITTER). For example, assume three events (an event D, an event E and an event F) are present between 9 o'clock and 10 o'clock, and priorities are granted to the respective events according to the additional information regarding SNS.

Here, the top priority may be granted to an event having the largest number of recommendation of a specific SNS, or be granted to an event having the largest number of followers of a specific SNS. Therefore, in this method, an event having the top priority according to the additional information regarding a SNS is selected as a representative event and is displayed on the EPG screen.

Although the four methods of deciding representative events are described above, two or more methods of the four methods may be combined.

Figure 13:
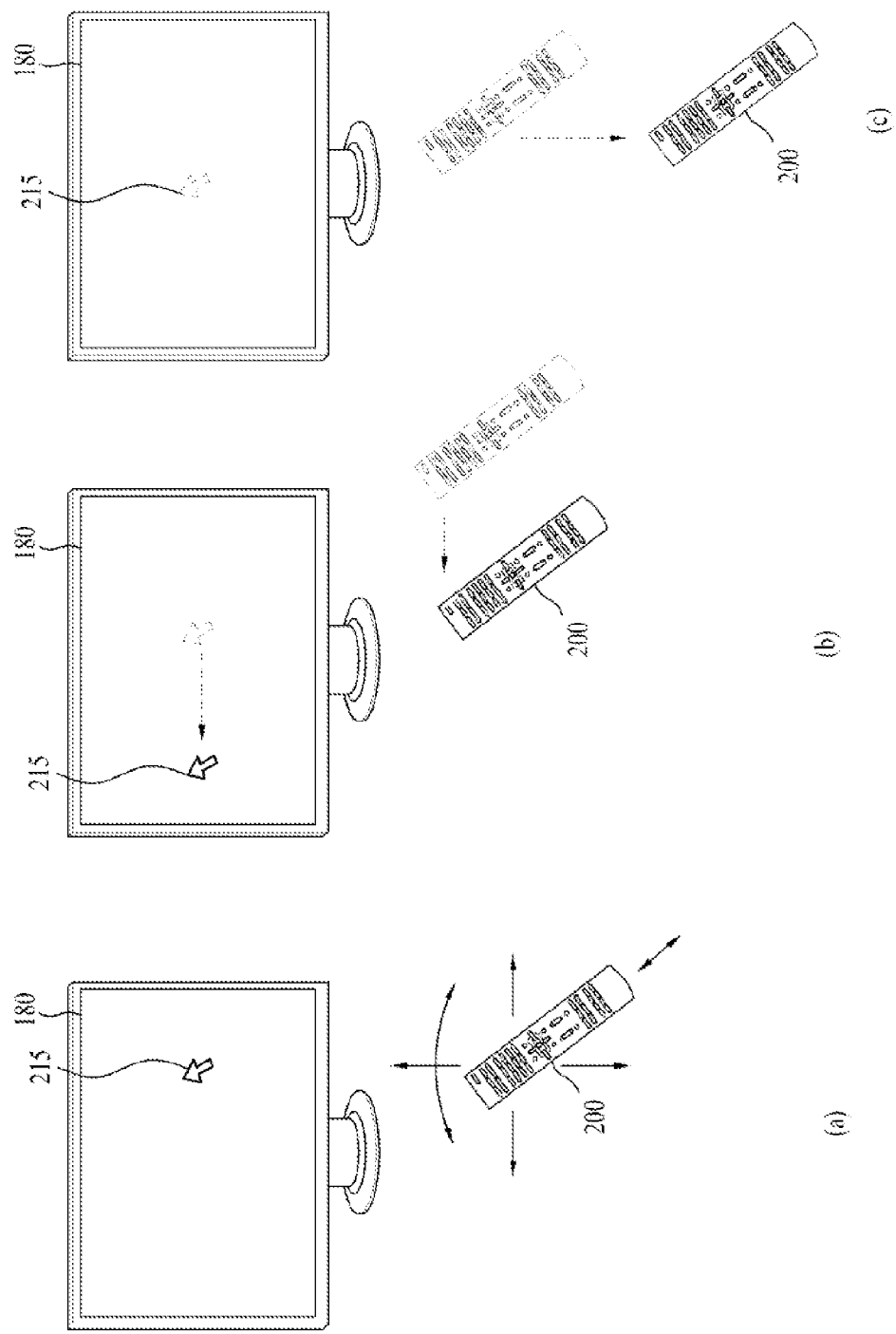
FIG. 13 is a view illustrating the external appearance of a remote controller to control a display apparatus in accordance with an embodiment of the present invention.

Next, FIGS. 13(*a*) to 13(*c*) are views illustrating an external appearance of the remote controller 200 to control the display 180 in accordance with an embodiment of the present invention. In particular, FIG. 13(*a*) illustrates a pointer 215 displayed on the display 180 corresponding to the remote controller 200. Further, the display 180 corresponds to, for example, the display modules of the devices shown in FIGS. 4 to 6.

A user can then move or rotate the remote controller 200 in the upward and downward direction and in the leftward and rightward direction as shown in FIG. 13(*b*) and in the forward and backward direction as shown in FIG. 13(*c*). That is, the movement of the pointer 215 displayed on the display 180 of the image display apparatus corresponds to movement of the remote controller 200. Such a remote controller 200 also moves in a 3D space to move the corresponding 215 as shown in FIGS. 1.3(*a*) to 13(*c*), and thus may be referred to as a space remote controller.

In addition, FIG. 13(*b*) illustrates that, when the user moves the remote controller 200 leftwards, the pointer 215 displayed on the display 180 of the image display apparatus moves leftwards corresponding to movement of the remote controller 200. Further, information regarding movement of the remote controller 200 sensed by a sensor of the remote controller 200 is transmitted to the image display apparatus. The image display apparatus can also calculate coordinates of the pointer 215 from the information regarding movement of the remote controller 200, and then display the pointer 215 so as to correspond to the calculated coordinates.

Further, FIG. 13(*c*) illustrates the user moving the remote controller 200 away from the display 180 while the user presses a specific button of the remote controller 200. Thereby, a selection region in the display 180 corresponding to the pointer 215 can be zoomed in, thus being enlarged. On the other hand, when the user moves the remote controller 200 towards the display 180, the selection region in the display 180 corresponding to the pointer 215 can be zoomed out, thus being reduced. Further, when the remote controller 200 moves away from the display 180, the selection region can be zoomed out, and when the remote controller 200 moves towards the display 180, the selection region can be zoomed in.

In addition, in order to select an event to be added to the schedule list from the enhanced EPG screen in accordance with an embodiment of the present invention, the remote controller 200 shown in FIGS. 13(*a*) to 13(*c*) can be used, and this will be described in detail later with reference to FIGS. 17 to 21.

Figure 14:
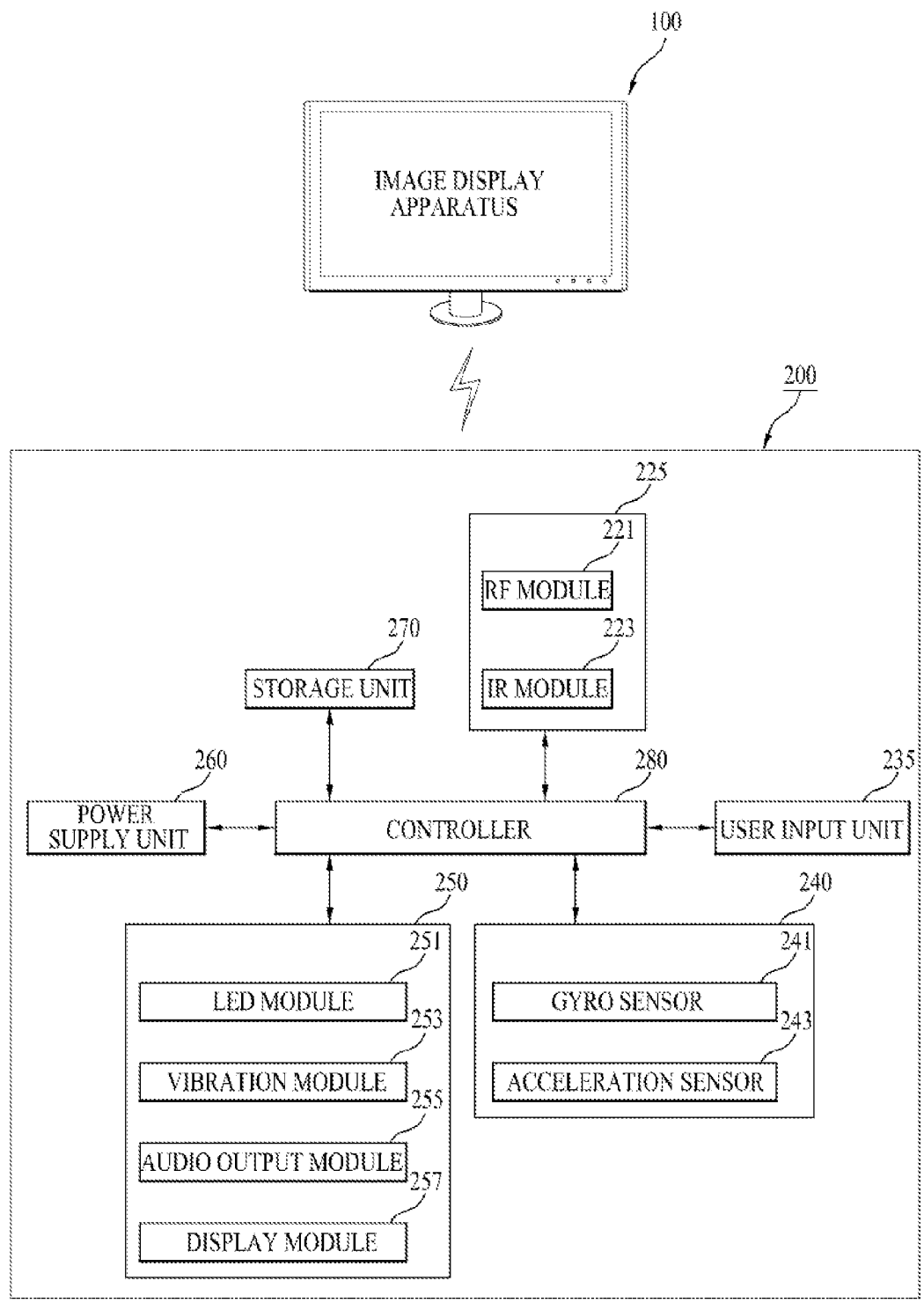
FIG. 14 is a block diagram illustrating the internal configuration of the remote controller to control the display apparatus in accordance with an embodiment of the present invention.

Next, FIG. 14 is a block diagram illustrating the internal configuration of the remote controller 200. As shown in FIG. 14, the remote controller 200 includes, for example, a wireless communication unit 225, a user input unit 235, a sensor unit 240, an output unit 250, a power supply unit 260, a storage unit 270 and a controller 280.

The wireless communication unit 225 transmits/receives a signal to/from any one of the above-described image display apparatuses in accordance with the embodiments of the present invention. Also, one image display apparatus 100 from among the image display apparatuses in accordance with the embodiments of the present invention will be described.

In this embodiment, the remote controller 200 includes an RF module 221 which can transmit/receive a signal to/from the image display apparatus 100 according to the RF communication standard. Further, the remote controller 200 includes an IR module 223 which can transmit/receive a signal to/from the image display apparatus 100 according to the IR communication, standard.

In this embodiment, the remote controller 200 transmits a signal containing information regarding movement of the remote controller 200, etc, to the image display apparatus 100 through the RF module 221. Further, the remote controller 200 can receive a signal transmitted from the image display apparatus 100 through the RF module 221. In addition, the remote controller 200 can transmit a command regarding power ON/OFF, channel change, volume change, etc. to the image display apparatus 100 through the IR module 223.

The user input unit 235 can also include a key pad, a touch pad or a touch screen. A user can then input a command regarding the image display apparatus 100 to the remote controller 200 by manipulating the user input unit 235. Further, the sensor unit 240 includes a gyro sensor 241 and an acceleration sensor 243. The gyro sensor 241 senses information regarding movement of the remote controller 200.

For example, the gyro sensor 241 can sense information regarding movement of the remote controller 200 based on x, y and z axes. The acceleration sensor 243 can also sense information regarding the moving velocity of the remote controller 200. The sensor unit 240 may also include a distance sensor for sensing a distance from the display 180.

Further, the output unit 250 can output a video or audio signal corresponding to manipulation of the user input unit 235 or the signal transmitted from the image display apparatus 100. The user can thus recognize whether or not the user input unit 235 is manipulated or whether or not the image display apparatus 100 is controlled through the output unit 250.

For example, the output unit 250 includes an LED module 251 turned on when the user input unit 235 is manipulated or the signal of the image display apparatus 100 is transmitted/received through the wireless communication unit 225, a vibration module 253 to generate vibration, an audio output module 255 to output audio, and a display module 257 to output an image.

The power supply unit 260 also supplies power to the remote controller 200. Further, the power supply unit 260 stops power supply when the remote controller 200 does not move for a designated time, thereby reducing power consumption. The power supply unit 260 can also resupply power to the remote controller 200 when a designated key provided on the remote controller 200 is manipulated.

In addition, the storage unit 270 can store various kinds of programs used to control or operate the remote controller 200 and application data. If the remote controller 200 transmits/receives a signal to/from the image display apparatus 100 through the RF module 221 wirelessly, the remote controller 200 and the image display apparatus 100 transmit/receive the signal to/from each other through a designated frequency band. The control unit 280 of the remote controller 200 can also store information regarding the frequency band through which the remote controller 200 transmits/receives the signal to/from the image display apparatus 100 paired with the remote controller 200, within the storage unit 270 and refer to the stored information.

The controller 280 also controls various factors regarding control of the remote controller 200. The controller 280 can transmit a signal corresponding to manipulation of the designated key of the user input unit 235 or a signal corresponding to movement of the remote controller 200 sensed by the sensor unit 240 to the image display apparatus 100 through the wireless communication unit 225.

Particularly, the user interface of the image display apparatus 100 shown in FIG. 14 can receive a command signal from the remote controller 200 transmitting an input signal according to motion of the user.

Figure 15:
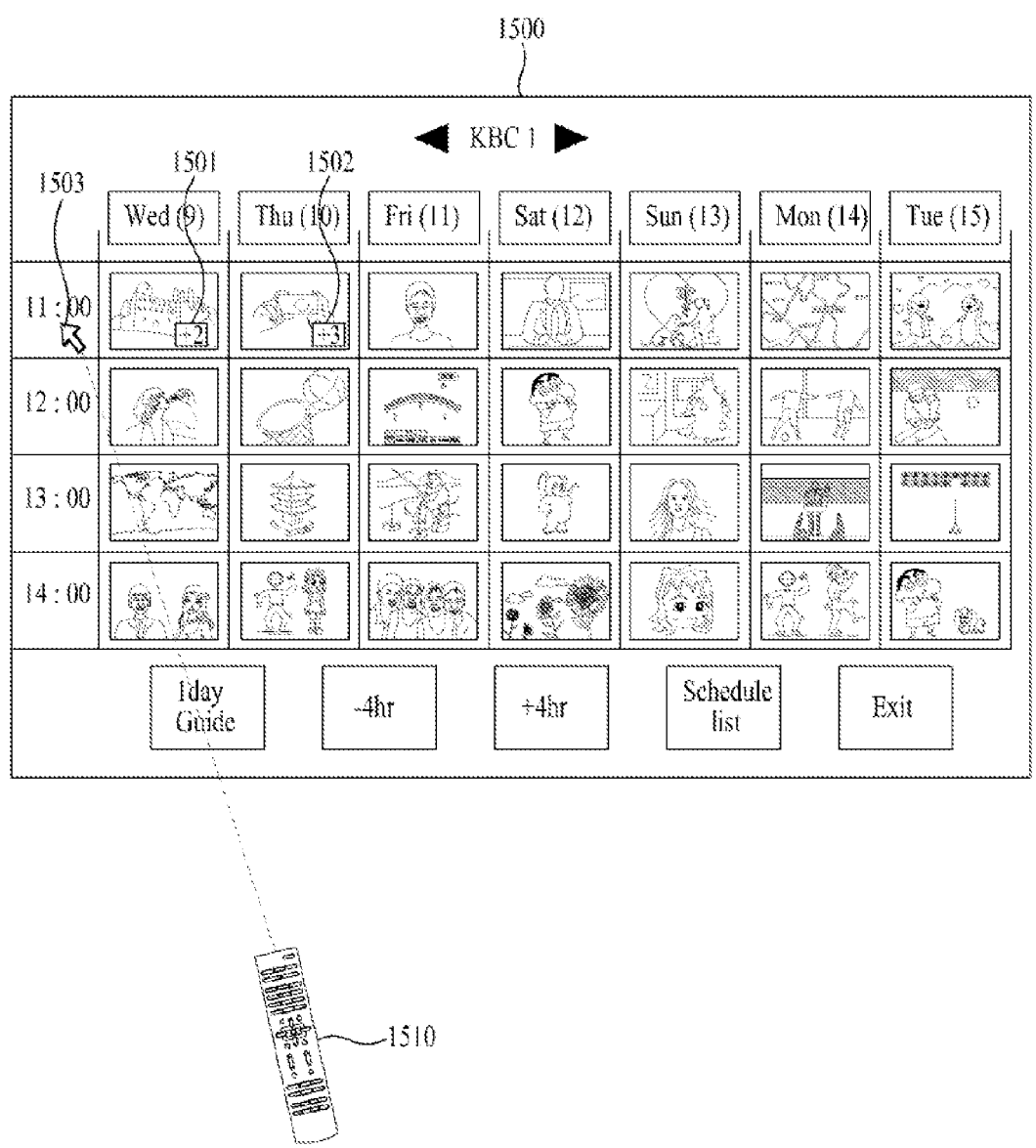
FIG. 15 is a view illustrating a first OSD screen provided by the enhanced EPG in accordance with an embodiment of the present invention.

Next, FIG. 15 is a view illustrating a first OSD screen provided by the enhanced EPG in accordance with an embodiment of the present invention. As previously shown in FIG. 11, at least two events may be present in each time zone. Therefore, a display apparatus 1500 in accordance with an embodiment of the present invention represents that other events in addition to the event corresponding to the representative thumbnail image displayed in each time zone are present using FIT information.

As shown in FIG. 15, for example, if two specific events are present in a time zone between 11 o'clock and 12 o'clock, a sub-indicator 1501 indicating "+2" is displayed. If three specific events are present in the above time zone, a sub-indicator 1502 indicating "+3" is displayed. Alternatively, numerals indicated by the sub-indicators may be numerals (N−1) except for the event corresponding to the current displayed representative thumbnail image.

Further, the remote controller described with reference to FIGS. 13 and 14 corresponds to a remote controller 1510 shown in FIG. 15. Here, if an arrow indicator 1503, the position of which is varied according to movement of the remote controller 1510 is located at a region displaying the above specific time zone, an OSD screen shown in FIG. 16 is displayed.

Figure 16:
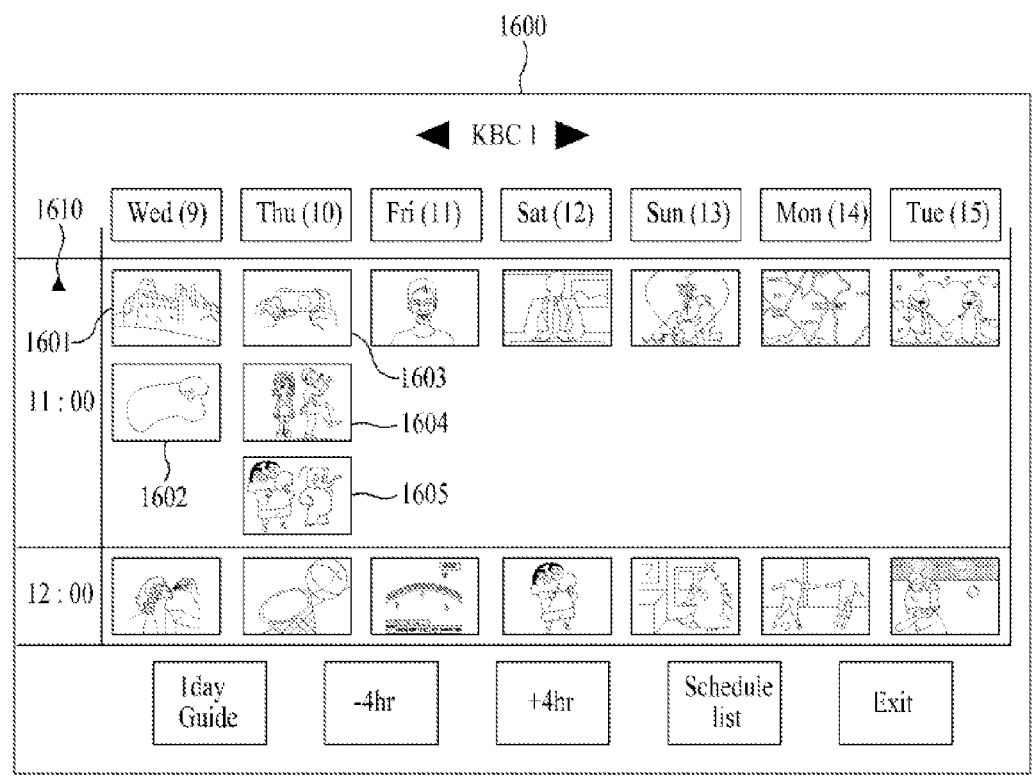
FIG. 16 is a view illustrating a second OSD screen provided by the enhanced EPG in accordance with an embodiment of the present invention.

In particular, FIG. 16 is a view illustrating a second OSD screen provided by the enhanced EPG in accordance with an embodiment of the present invention. According to control of the remote controller 1510 shown in FIG. 15, the first OSD screen shown in FIG. 15 is switched to the second OSD screen shown in FIG. 16.

A display apparatus 1600 in accordance with an embodiment of the present invention displays thumbnail images of all events in each time zone. As shown in FIG. 16, if two specific events are present in a time zone between 11 o'clock and 12 o'clock, the display apparatus 1600 displays thumbnail images 1601 and 1602 corresponding to the two specific events such that the thumbnail images 1601 and 1602 are spread in order of time. If three specific events are present in the above time zone, the display apparatus 1600 displays thumbnail images 1603, 1604 and 1605 corresponding to the three specific events such that the thumbnail images 1603, 1604 and 1605 are spread in order of time.

Further, in order to increase user convenience, the second OSD shown in FIG. 16 is switched to the first OSD shown in FIG. 15 when the arrow indicator 1503 of the remote controller 1510 shown in FIG. 15 is located at a specific tab 1610 shown in FIG. 16.

A process of switching from the EPG screen shown in FIG. 15 to the EPG screen shown in FIG. 16 will now be described in more detail. First, as shown in FIG. 15, a first enhanced EPG including a thumbnail image corresponding to the detected representative event in the designated time zone (11:00) and information (the indicator 1501 or 1502) to indicate the number of events belonging to the designated time zone is displayed.

Then, when a specific region (for example, a region displaying the time zone or the indication information) of the first enhanced EPG guide is selected through the user interface 1510, as shown in FIG. 16, a second enhanced EPG including plural thumbnail images corresponding to all events belonging to the designated time zone (if Wednesday, the images 1601 and 1602, and if Thursday, images 1603 to 1605) is displayed.

Figure 17:
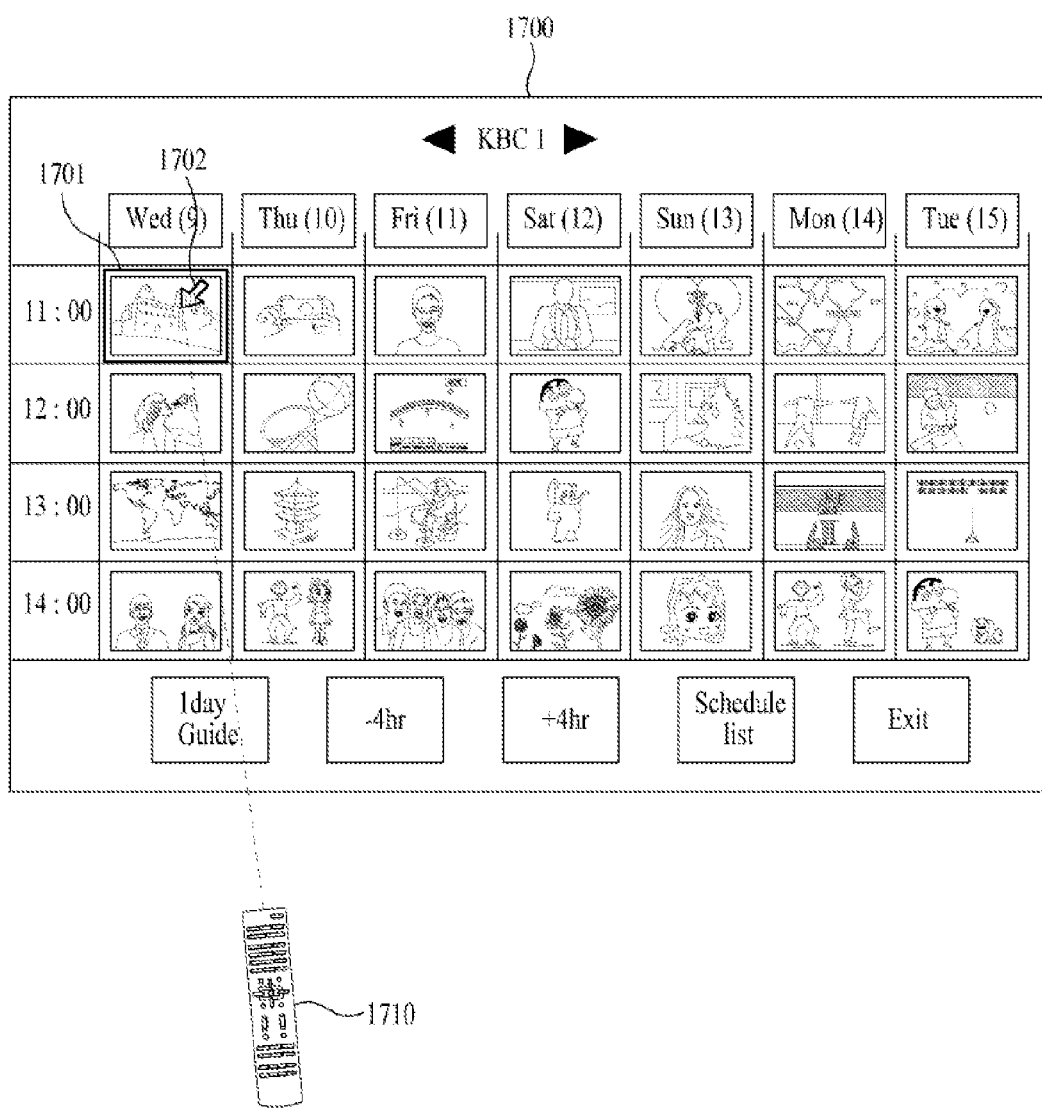
FIGS. 17 and 18 are views illustrating first user interfaces to store a specific event, displayed on the enhanced EPG in accordance with an embodiment of the present invention, within a schedule list.
Figure 18:
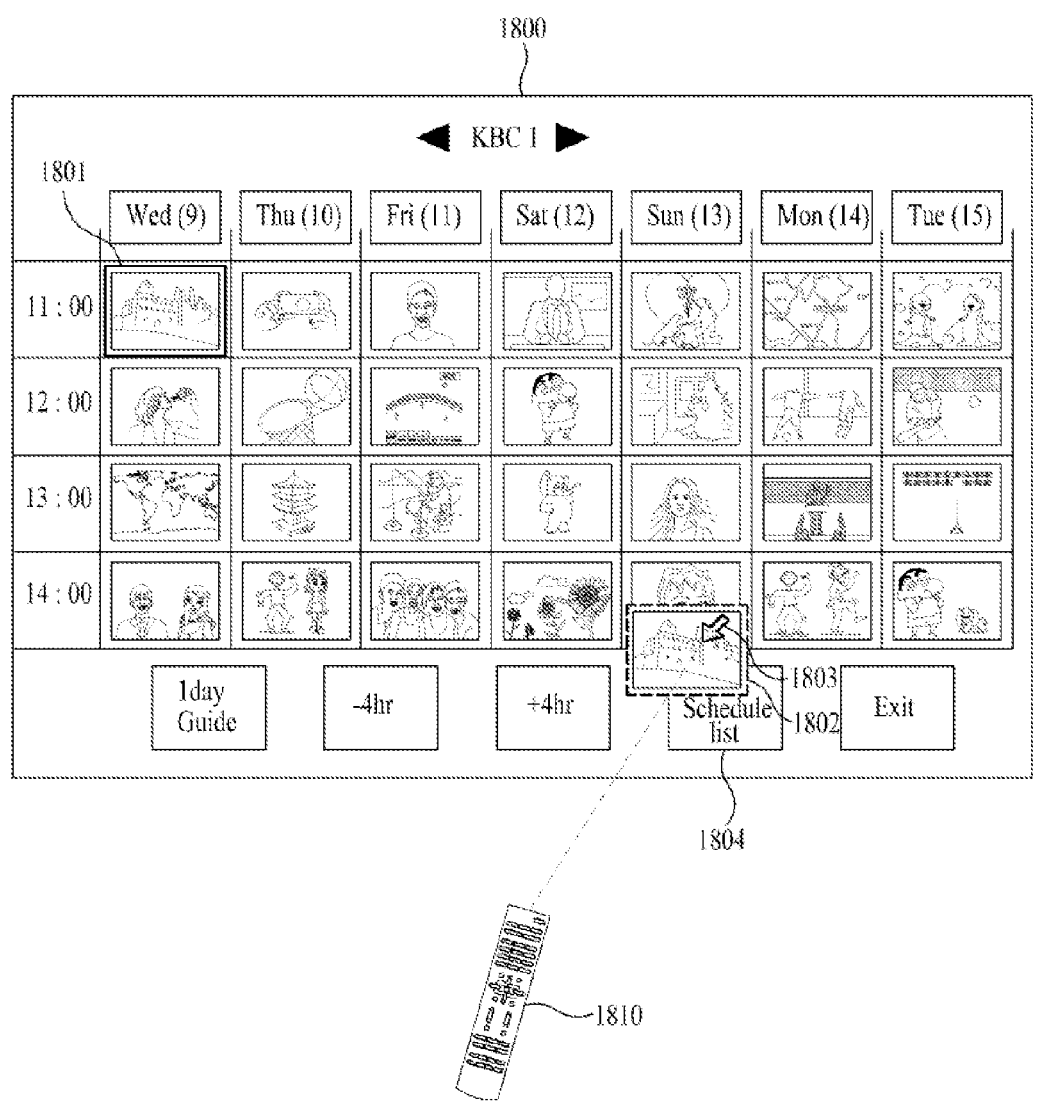

Next, FIGS. 17 and 18 are views illustrating first user interfaces to store a specific event displayed on the enhanced EPG in accordance with an embodiment of the present invention within a schedule list. As shown in FIG. 17, a display apparatus 1700 outputs an enhanced EPG screen. In addition, an arrow indicator 1702, the position of which is varied according to movement of a remote controller 1710, is located at a thumbnail image 1701 of a specific event. The remote controller 1710 corresponds to the above-described remote controller 200 shown in FIGS. 13 and 14.

Further, a user of the display apparatus 1700 wants to add an event corresponding to the thumbnail image 1701 to the schedule list. As shown in FIG. 18, when a user moves a specific thumbnail image 1801 to a schedule list tab 1804 using an arrow indicator 1803 of a remote controller 1810, a display apparatus 1800 moves the position of the specific thumbnail image 1801 to a second place 1802 and then displays the specific thumbnail image 1801.

Additional information (for example, start time) of an event corresponding to the thumbnail image moved to the schedule list tab 1804 is also stored in the memory. Therefore, when the start time of the event has come, the event may be stored or an OSD asking if the user wants to view the event may be generated and displayed.

Figure 19:
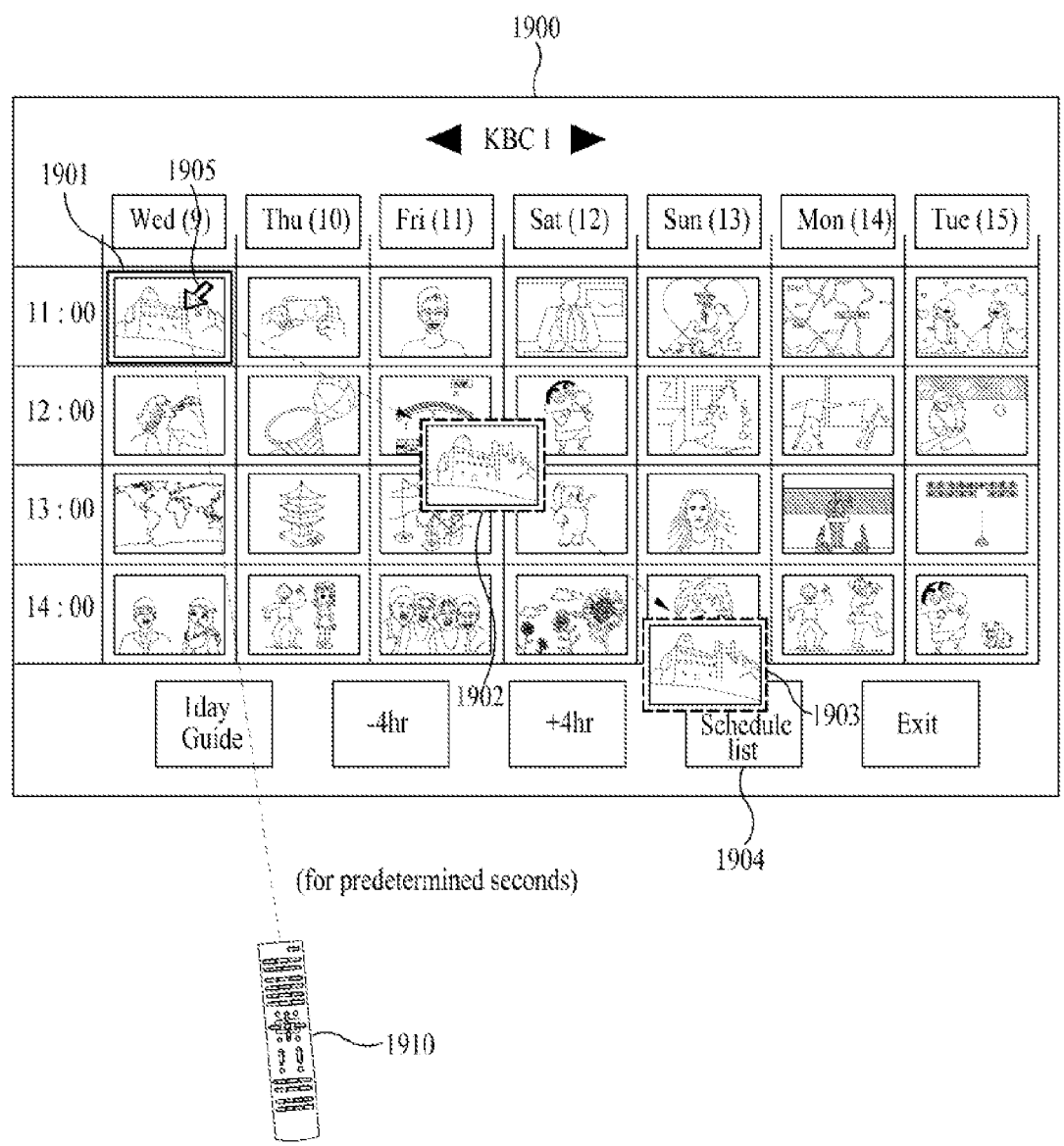
FIG. 19 is a view illustrating a second user interface to store a specific event, displayed on the enhanced EPG in accordance with an embodiment of the present invention, within a schedule list.

FIG. 19 is a view illustrating a second user interface to store a specific event displayed on the enhanced EPG in accordance with an embodiment of the present invention within a schedule list. Differing from the user interfaces shown in FIGS. 17 and 18, the user interface shown in FIG. 19 minimizes user action.

As shown in FIG. 19, an arrow indicator 1905 of a remote controller 1910 is located at the region of a thumbnail image 1901 corresponding to a specific event for a designated time or more. A display apparatus 1900 automatically moves the position of the thumbnail image 1901 to a schedule list tab 1904 when the arrow indicator 1905 is located at the region of the thumbnail image 1901 for the designated time or more. As shown in FIG. 19, the position of the thumbnail image 1901 may be changed to other positions 1902 and 1903 in a regular direction or be automatically moved in other directions.

Figure 20:
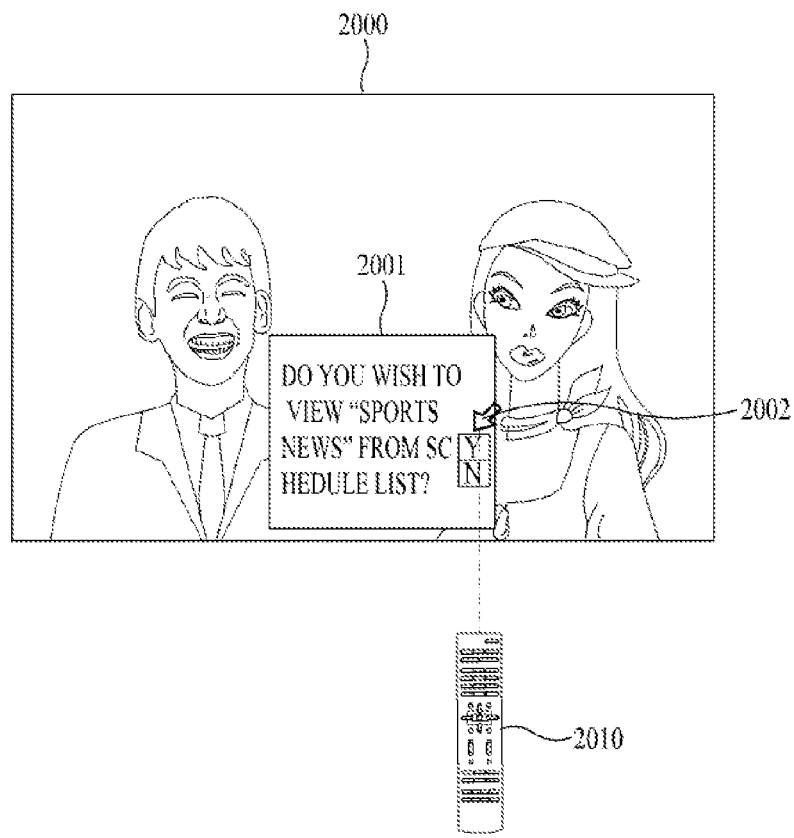
FIGS. 20 and 21 are views illustrating third user interfaces to process the specific event stored in the schedule list shown in FIGS. 17 to 19.
Figure 21:
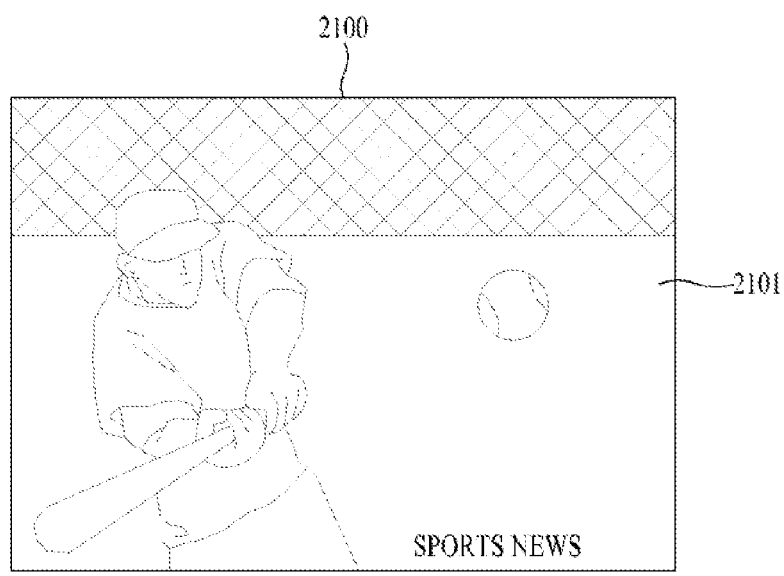

Next, FIGS. 20 and 21 are views illustrating a third user interface to process a specific event stored in the schedule list shown in FIGS. 17 to 19. Further, it is assumed that at least one event is stored in a schedule list using one of the user interfaces shown in FIGS. 17 to 19.

For example, a display apparatus 2000 in accordance with an embodiment of the present invention monitors whether the start time of each event stored in the schedule list has come while outputting a general broadcast program. When the start time of a specific event has come, an OSD generator of the display apparatus 2000 outputs a sub-OSD screen 2001 asking if the user wants to view the above specific event. Thereafter, when the user selects "YES" through an arrow indicator 2002 of a remote controller 2010, the display apparatus 2100 switches to a screen 2101 corresponding to the specific event as shown in FIG. 21.

Further, the display apparatuses 2000 and 2100 can automatically store the event, the start time of which has come, in the memory when the display apparatuses 2000 and 2100 are in a stand-by state.

Figure 22:
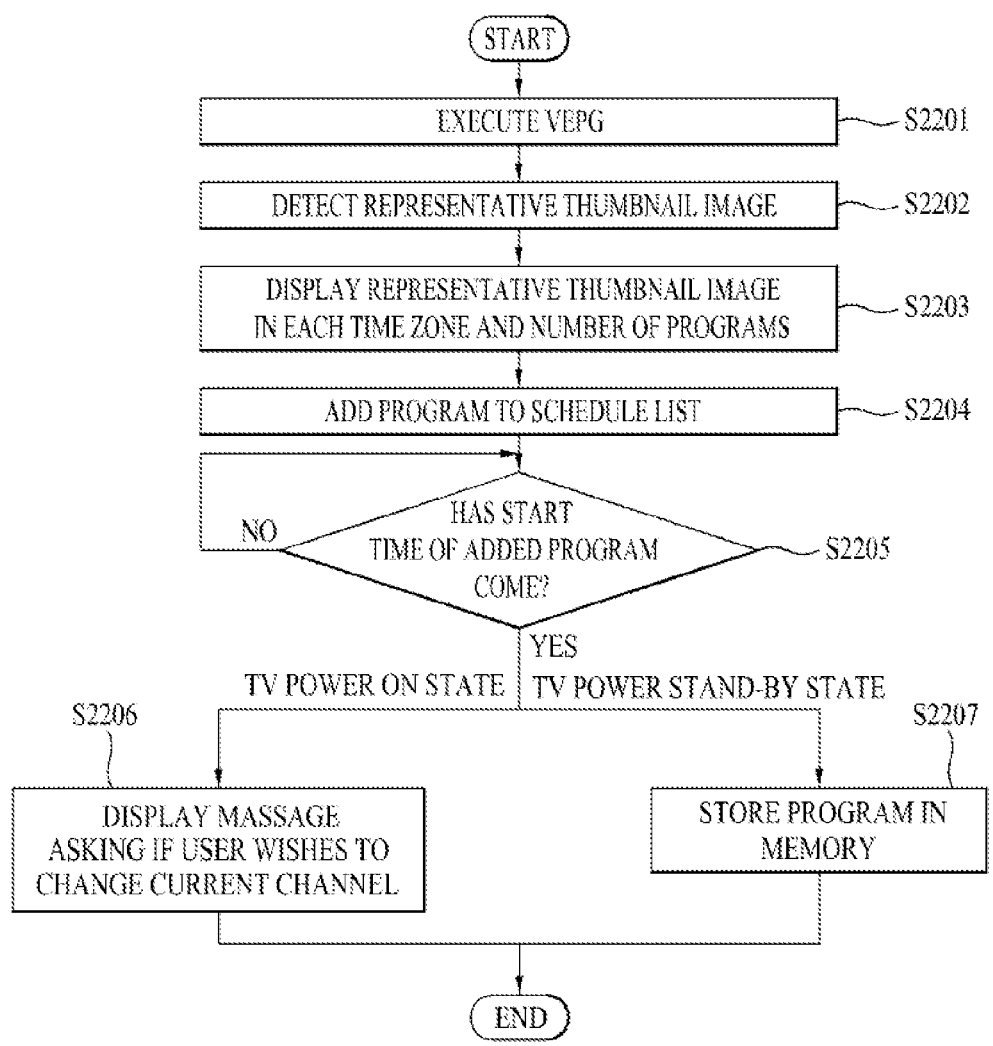
FIG. 22 is a flowchart illustrating a control method of processing an enhanced EPG in accordance with the embodiment of the present invention.

Next, FIG. 22 is a flowchart illustrating a control method of processing an enhanced EPG in accordance with an embodiment of the present invention. Further, the display apparatus for providing the enhanced EPG in accordance with an embodiment of the present invention receives AV data including audio data and video data through the path of a first network and receives information regarding at least one event provided from each channel and a thumbnail image corresponding to the event through the path of a second network.

In accordance with one embodiment of the present invention, the first network and the second network are IP networks. Further, in accordance with another embodiment of the present invention, the first network corresponds to a broadcast network and the second network corresponds to an IP network. Also, the display apparatus can receive a broadcast signal through the broadcast network or through the IP network.

When the display apparatus receives a command signal to execute the enhanced EPG through the user interface, the display apparatus executes a VEPG operation (S2201). That is, the VEPG is a term corresponding to the above-described enhanced EPG.

Thereafter, the display apparatus detects a representative event from at least one event belonging to a designated time zone (S2202). The display apparatus also generates an enhanced EPG OSD including the thumbnail image corresponding to the detected representative event in the designated time zone, and displays the generated enhanced EPG OSD on a screen.

In more detail, the display apparatus displays the representative thumbnail image in each time zone and the number of programs (events) belonging to each time zone in an overlaid form (S2203). See also FIGS. 15 and 16.

In accordance with another embodiment, operation S2202 includes calculating time-based shares of the respective events belonging to the designated time zone, and regarding an event having the highest time-based share as a representative event based, on a result of the calculation. In accordance with yet another embodiment, operation S2202 includes detecting access histories of the respective events belonging to the designated time zone, and regarding an event having the highest access priority as a representative event based on the detected access histories. The access history includes, for example, at least one of the number of access attempts to each event and the total display time of each event.

In accordance with still another embodiment, in operation S2203, the display apparatus displays an OSD including a main region which displays the thumbnail image corresponding to the representative event and a sub-region which guides the number of events belonging to the designated time zone.

Further, in order to execute reserved viewing or reserved recording, the display apparatus selects at least one thumbnail image with reference to the enhanced EPG OSD displayed on the screen and adds an event corresponding to the selected thumbnail image to the schedule list (2204). Also, additional information of the event corresponding to the selected thumbnail image is stored in the memory. The additional information of the event includes, for example, information regarding a start time of the event defined by the event information table (EIT).

Thereafter, the display apparatus judges whether or not the start time of the event added to the schedule list has come (S205). Upon judging that the start time of the event has come (Yes in S2205), two modes are selectively executed according to power states of the display apparatus (for example, a TV).

When the power of the TV is turned on, the display apparatus displays an OSD screen asking if the user if they want to change the current channel of the TV to a channel with the event, the start time of which has come (S2206). On the other hand, when the power of the TV is in the stand-by state, the event, the start time of which has come, is directly stored in the memory (S2207).

Thus, the user can freely select a channel based EPG screen or a day based EPG screen according to desired standards. Further, only the thumbnail image of a representative event having the top priority is preferably displayed on a restricted EPG screen, or all events in each time zone can be displayed on the EPG screen such that thumbnail images corresponding to all the events are spread in order of time. Further, indicators indicating the number of hidden events in respective time zones can be added to the enhanced EPG screen, thereby increasing user recognition.

Further, a user interface enabling the user to more rapidly select events, reserve viewing and reserve recording of programs is provided.

As described above, FIGS. 1 to 22 illustrate the contents are received from one source device (for example, a broadcast station). However, a TV which is connectable to a network may receive many contents from plural source devices. Therefore, FIGS. 23 to 40 implement an EPG if contents are received from plural different kinds of source devices.

Figure 23:
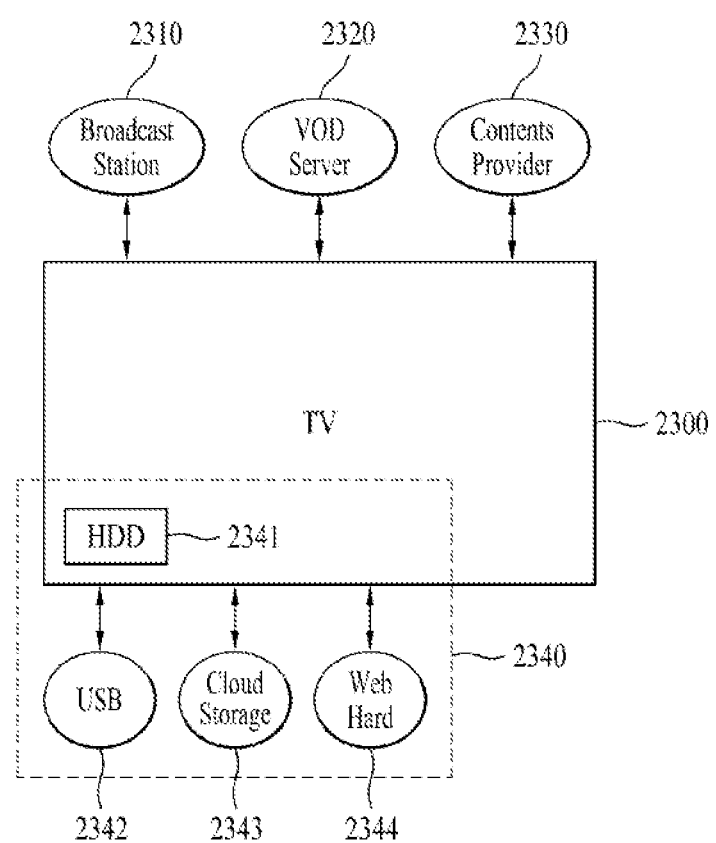
FIG. 23 is a view illustrating plural source devices connected to a TV processing an enhanced EPG in accordance with another embodiment of the present invention.

In particular, FIG. 23 is a view illustrating plural source devices connected to a TV processing an enhanced EPG in accordance with another embodiment of the present invention. The plural source devices connected to the TV processing the enhanced EPG will now be described. Further, a TV 2300 shown in FIG. 23 includes, for example, the elements shown in FIGS. 4 to 6.

The display apparatus or TV 2300 shown in FIG. 23 includes a network interface module to receive first metadata (for example, title information, genre information or actor information) corresponding to each of contents respectively provided by the plural source devices. The network interface module corresponds to, for example, the network interface 130 shown in FIG. 6. The contents further include, for example, second metadata.

If the first metadata corresponds to title information, the second metadata corresponds to at least one of genre information, actor information, information indicating an image quality level of each of the contents and information indicating whether or not each of the contents includes an advertisement.

The plural source devices correspond to, for example, a broadcast station 2310, a VOD server 2320, a CP 2330, and a my media device group 2340. The my media device group 2340 includes at least one of an HDD 2341 within the TV 2300, a USB memory 2342, a cloud storage 2343, and a Web hard 2344. The cloud storage 2343 is interpreted as having a meaning widely used by those skilled in the art. For example, the cloud storage 2343 correspond to a memory which a cloud server accesses or the cloud server itself.

The TV 2300 includes a user interface module to select first content transmitted through a network, and a collecting module to collect the first metadata corresponding to metadata of the first content as a first group using the group of the received metadata. The user interface module and the collecting module correspond to, for example, the user interface 150 and the controller 170 shown in FIG. 6.

Further, the first metadata corresponding to the metadata of the first content can be completely identical metadata or metadata being within a predetermined range. For example, if a title of the first content is "love song", a title of content provided from the external source device which is "love songs" can be regarded as corresponding to the title of the first content.

The TV 2300 further includes an OSD generator to generate graphic data in which at least one piece of metadata belonging to the first group is arranged in a predetermined order, and a controller to control display of the generated graphic data or a network module to transmit the generated graphic data to an external device. The OSD generator corresponds to, for example, the controller 170 shown in FIG. 6 or the OSD generator 340 shown in FIG. 7. Further, the controller corresponds to, for example, the controller 170 or the display 180 shown in FIG. 6.

Although FIG. 23 illustrates the TV 2300, an STB may be applied to the present invention instead of the TV 2300. Here, the STB does not include the display 180. However, the STB further includes a transmission module to transmit an enhanced EPG based on the generated graphic data to an external display device.

Further, the above-described enhanced EPG additionally displays an indicator to receive OST information relating to a specific event. Here, the enhanced EPG is designed to access a CP or a Web site providing the OST information, when the indicator is selected.

In accordance with another embodiment of the present invention, if the metadata belonging to the first group within the above-described enhanced EPG is arranged in order of episode number, the controller of the TV 2300 controls the display module so as to display thumbnail images of contents belonging to the first group in a first region and to display indicators indicating kinds of source devices providing the respective contents in a second region. This will be described in more detail later with reference to FIG. 28.

In accordance with yet another embodiment of the present invention, if plural contents corresponding to a specific episode number are present, the controller of the TV 2300 calculates priorities of the respective contents corresponding to the specific episode number, and adjusts sizes of thumbnail images of the respective contents according to the calculated priorities. This will be described in more detail later with reference to FIGS. 29 to 31.

Figure 24:
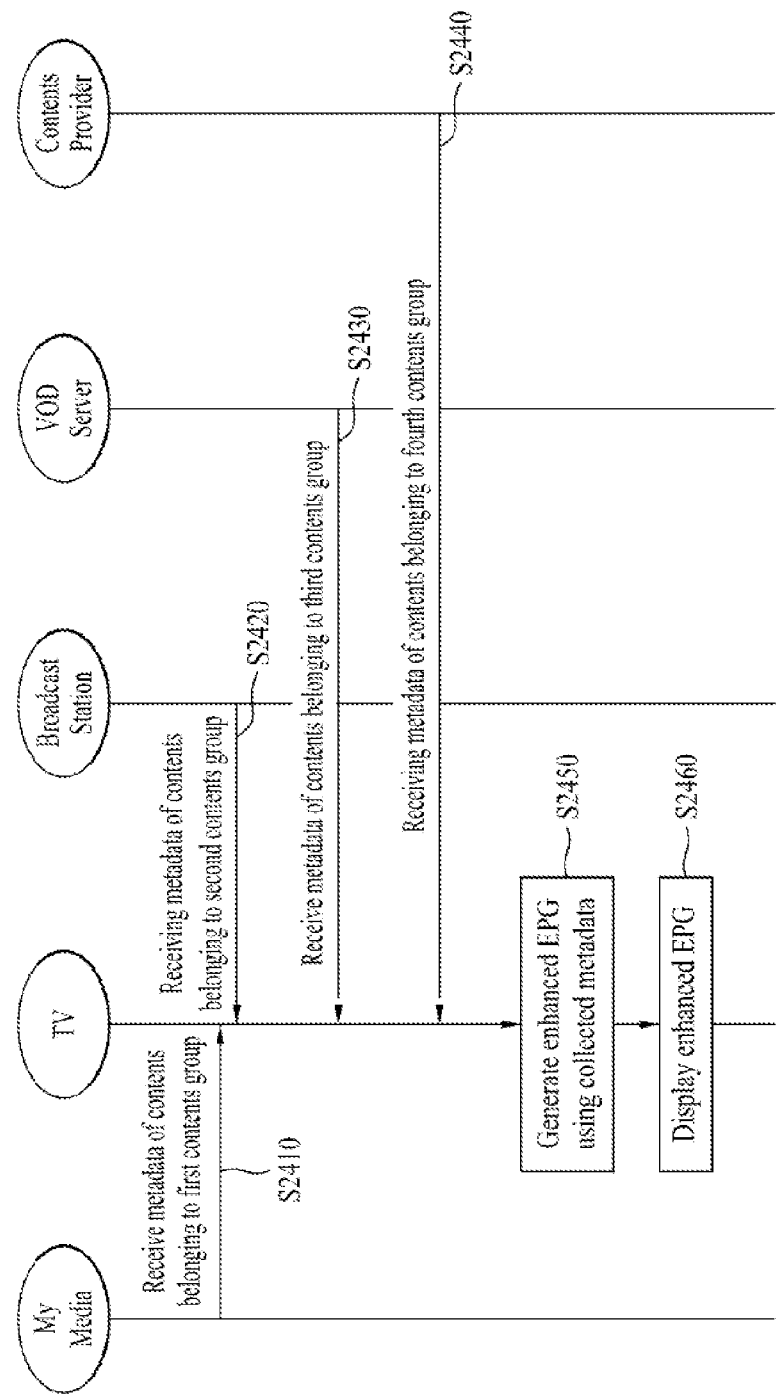
FIG. 24 is a flowchart defining a data transmission protocol between the TV and the plural source devices shown in FIG. 23.

Next, FIG. 24 is a flowchart defining a data transmission protocol between the TV and the plural source devices shown in FIG. 23. As shown in FIG. 24, the TV receives metadata of contents belonging to a first contents group from my media (S2410). My media shown in FIG. 24 corresponds to the my media device group 2340 shown in FIG. 23. Therefore, the metadata of the contents belonging to the first contents group corresponds to metadata of contents stored in the HDD, the USB memory, the cloud storage, the Web hard, etc.

Further, the TV receives metadata of contents belonging to a second contents group from the broadcast station (S2420). The metadata of the contents belonging to the second contents group corresponds to metadata of contents transmitted from the broadcast station in real time.

The TV also receives metadata of contents belonging to a third contents group from the VOD server (S2430). The metadata of the contents belonging to the third contents group means, for example, metadata of contents provided by the VOD server with a fee.

Further, the TV receives metadata of contents belonging to a fourth contents group from the CP (S2440). Both the metadata transmitted in operation S2420 and the metadata transmitted in operation 2430 may be transmitted from the CP. In addition, all the metadata used in operations S2410-S2440 includes, for example, at least one of title information, genre information, actor information, channel information and fee information of the respective contents.

Further, the TV generates an enhanced EPG using the metadata collected in operations S2410-S2440 (S2450), and displays the enhanced EPG on a screen (S2460). The enhanced EPG in accordance with this embodiment of the present invention will be described with reference to FIG. 25.

Particularly, the features shown in FIGS. 23 and 24 are advantageous in that information regarding different episodes of specific content or information regarding different works of a specific actor may be classified according to the respective source devices.

Figure 25:
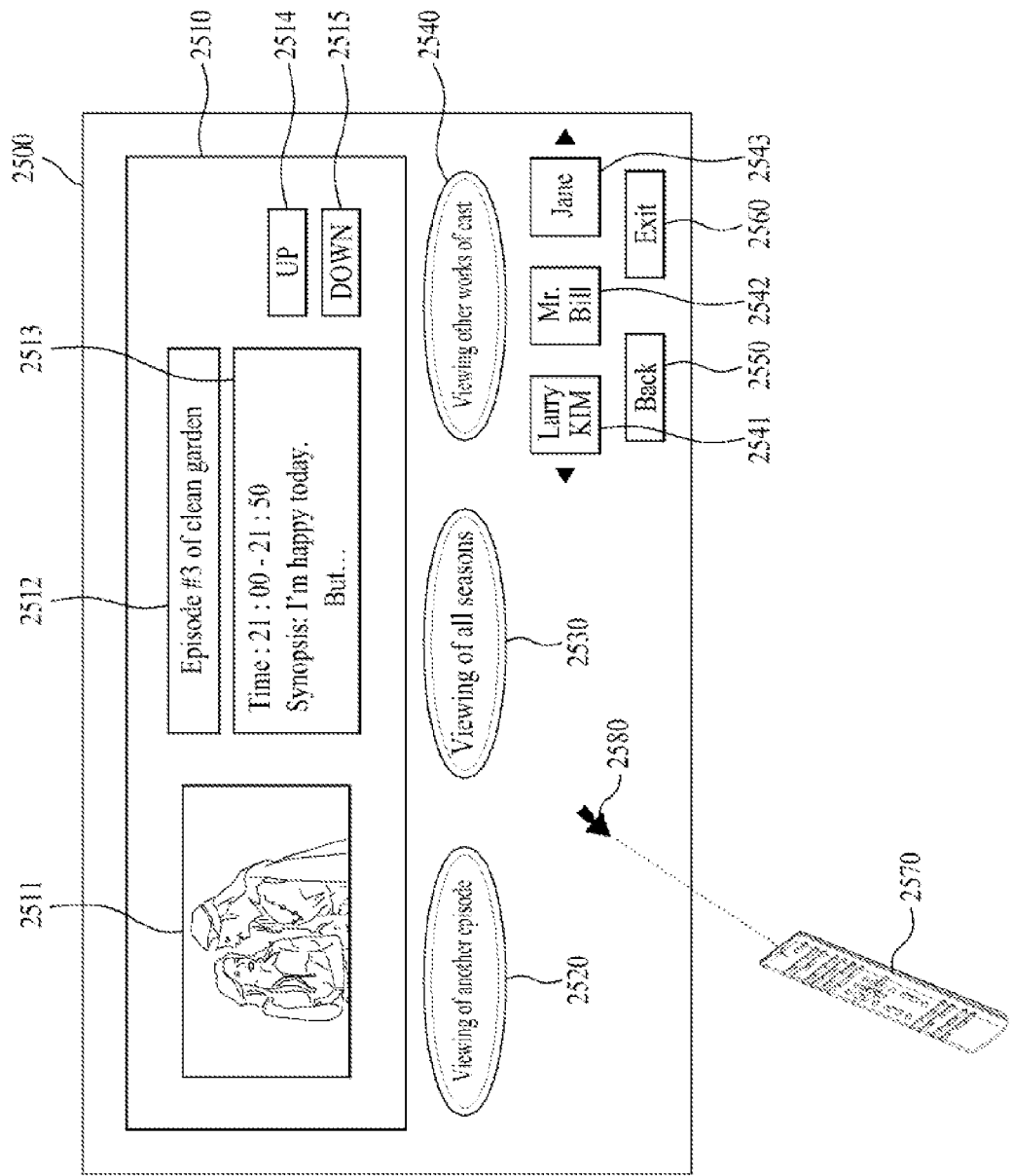
FIG. 25 is a view illustrating a main screen of the enhanced EPG in accordance with an embodiment of the present invention.

FIG. 25 is a view illustrating a main screen of the enhanced EPG in accordance with an embodiment of the present invention. As shown, a display apparatus 2500 provides various options, which is advantageous compared to the related art display apparatus that only provides basic broadcast program information.

As shown in FIG. 25, when specific content is selected by a user, the TV 2500 displays an OSD region 2510 including basic information of the selected content. The OSD region 2510 includes, for example, a representative thumbnail image 2511, a title and episode number 2512, and timetable and synopsis information 2513 of the selected specific content. Further, the OSD region 2510 further includes up/down buttons 2514 and 2515 in consideration of a restricted space of the OSD region 2510.

If the selected specific content includes plural episodes, the TV 2500 displays a first option 2520 to select another episode. Further, if the selected specific content belongs to a random season from among plural seasons, the TV 2500 displays a second option 2530 to select another season. Moreover, if the selected specific content includes metadata regarding actors appearing in the content, the TV 2500 displays a third option 2540 to select contents relating to a specific actor. FIG. 25 identifies the actors appearing relating to the selected specific content as, for example, Larry KIM 2541, Mr. Bill 2542 and Jane 2543.

Further, the TV 2500 can display an option 2550 to return to a previous screen other than the main screen shown in FIG. 25 and an option 2560 to exit the enhanced EPG screen so as to increase user convenience.

The above-described options 2520, 2530, 2540, 2550 and 2560 can also be randomly selected through a remote controller 2570 and an indicator 2580 moving according to motion of the remote controller 2570. The remote controller 2570 is similar as the remote controller which has been described in detail above with reference to FIGS. 13 and 14, and thus a detailed description thereof is omitted.

The first option 2520 will be described in more detail with reference to FIGS. 26 to 31, the second option 2530 will be described in more detail with reference to FIGS. 32 and 33, and the third option 2540 will be described in more detail with reference to FIGS. 34 and 35.

In particular, FIG. 26 is a view illustrating one example of a table to store data used to implement the enhanced EPG in accordance with an embodiment of the present invention. As described above, the display apparatus (for example, the TV) can collect metadata of all episodes of specific content (for example, episode number 1 of drama A, episode number 2 of drama A, episode number 3 of drama A, etc.) provided by each of the source devices (for example, the broadcast station, the VOD server and the my media device group). The collected metadata is processed into a table format shown in FIG. 26.

As shown in FIG. 26, for example, the broadcast station (ON TV) provides episode number 1 of specific content through a channel 7 (Mar. 11, 2011) and a channel 11 (Mar. 14, 2011). Further, the broadcast station (ON TV) provides an episode number 2 of the specific content through a channel 8 (Mar. 9, 2011) and the channel 7 (Mar. 18, 2011). In addition, the broadcast station (ON TV) provides episode number 3 of specific content through a channel 5 (Mar. 20, 2011).

As shown in FIG. 26, for example, the VOD server provides episode number 1 of the specific content as a paid service at a fee of 3 dollars, and provides episode number 2 of the specific content as a paid service at a fee of 5 dollars. However, the above-described VOD server does not provide episode number 3.

As shown in FIG. 26, for example, the my media device group provides only episode number 1 of the above-described specific content, but does not provide the episode numbers 2 and 3 of the specific content. The data format shown in FIG. 26 is stored in the memory of the display apparatus in accordance with an embodiment of the present invention.

Next, user interfaces implementing the enhanced EPG in accordance with the embodiment of the present invention using the data format shown in FIG. 26 will be described in detail with reference to FIGS. 27 and 28.

Figure 27:
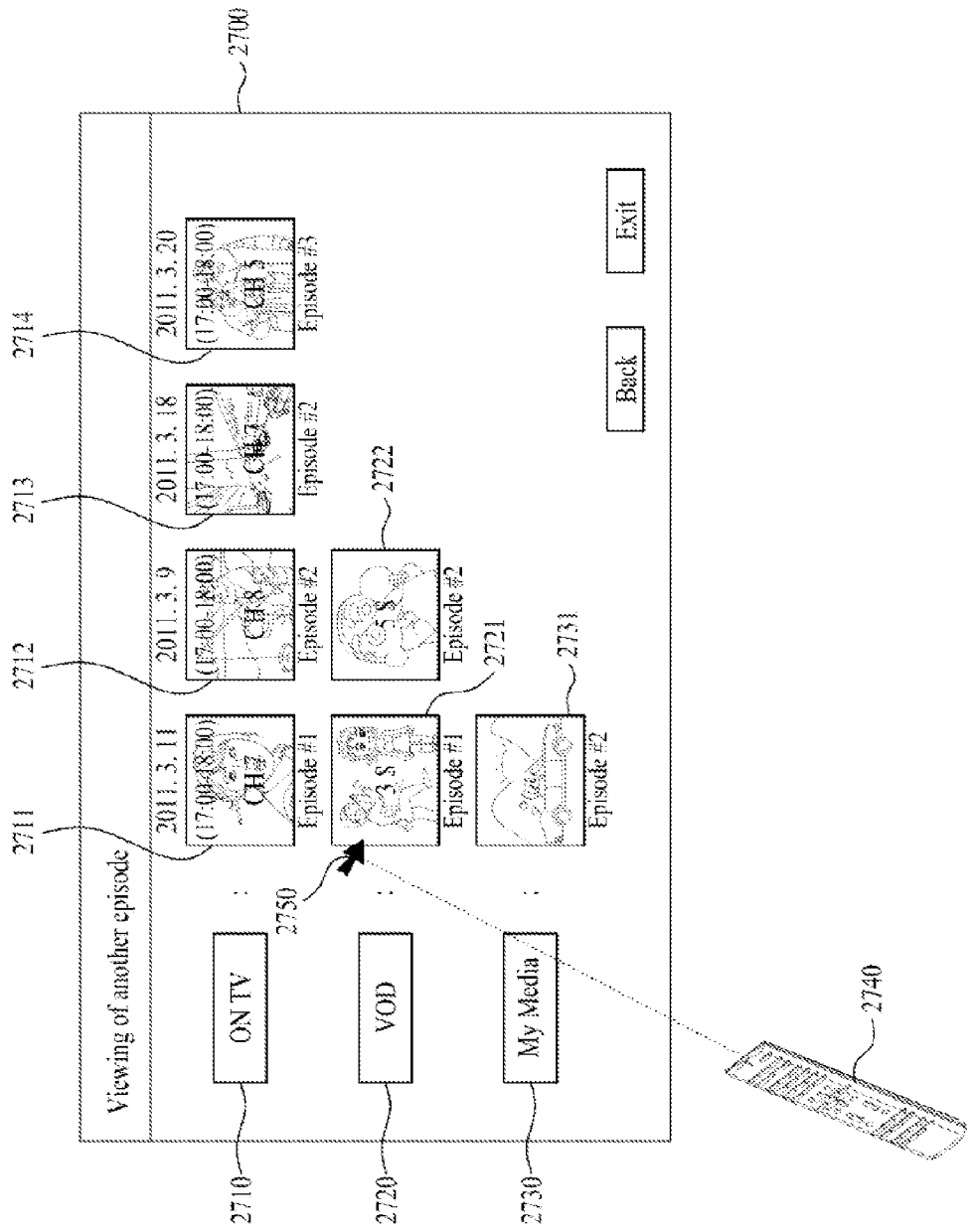
FIG. 27 is a view illustrating a user interface relating to a first function from among functions provided by the enhanced EPG in accordance with an embodiment of the present invention.

In particular, FIG. 27 is a view illustrating one example of a user interface relating to a first function from among functions provided by the enhanced. EPG in accordance with an embodiment of the present invention. That is, if the user selects the first option 2520 to select another episode in FIG. 25, the user interface shown in FIG. 27 is displayed. Further, in order to implement the user interface shown in FIG. 27, a memory of a display apparatus 2700 stores the data format shown in FIG. 26.

As shown in FIG. 27, the display apparatus 2700 in accordance with the embodiment of the invention is designed to output episodes of specific content under the condition that the episodes are classified according to source devices 2710, 2720 and 2730. As described above, it is assumed that metadata of the specific content is collected from the respective source devices 2710, 2720 and 2730.

First, from among the plural sources devices 2710, 2720 and 2730, a broadcast station (ON TV) 2710 provides episode number 1 through a channel 7 2711, and provides episode number 2 through a channel 8 2712 and a channel. Further, the broadcast station (ON TV) 2710 provides episode number 3 through a channel 5 2714. As shown in FIG. 27, day and time when each episode of the specific content provided by the broadcast station is concretely broadcasted, thereby enabling a user to confirm a stand-by time. Although FIG. 27 illustrates the episodes as being arranged based on episode number, the episodes may be arranged based on time.

Further, from among the plural source devices 2710, 2720 and 2730, the VOD server 2720 provides episode number 1 of the specific content as a paid service 2721 at a fee of 3 dollars, and provides episode number 2 of the specific content as a paid service 2722 at a fee of 5 dollars. Moreover, from among the plural source devices, 2710, 2720 and 2730, the my media device group 2730 provides only episode number 2 2731 of the specific content.

The episodes provided by the broadcast station 2710 are advantageous in that they are mostly free, but are disadvantageous in that a user should wait for the episodes to start. Further, the episodes provided by the VOD server 2720 are disadvantageous in that they are mostly paid, but are advantageous in that a user may view the corresponding episodes without waiting. Moreover, the episodes provided by the my media device group 2730 have both the advantages of the episodes provided by the broadcast station 2710 and the VOD server 2720, but there is a strong possibility that the number of the episodes provided by the my media device group 2730 is relatively small.

A user confirmed the episodes according to source device shown in FIG. 27 may more rapidly select a specific episode, which is most preferred by the user, in consideration of the above advantages and disadvantages of the respective source devices. Further, as described above (with reference to FIGS. 13 and 14), an indicator 2750 is designed to be moved according to movement of a remote controller 2740 in accordance with the embodiment of the present invention. Therefore, the user may easily select a specific episode 2721 provided by the VOD server 2720.

Figure 28:
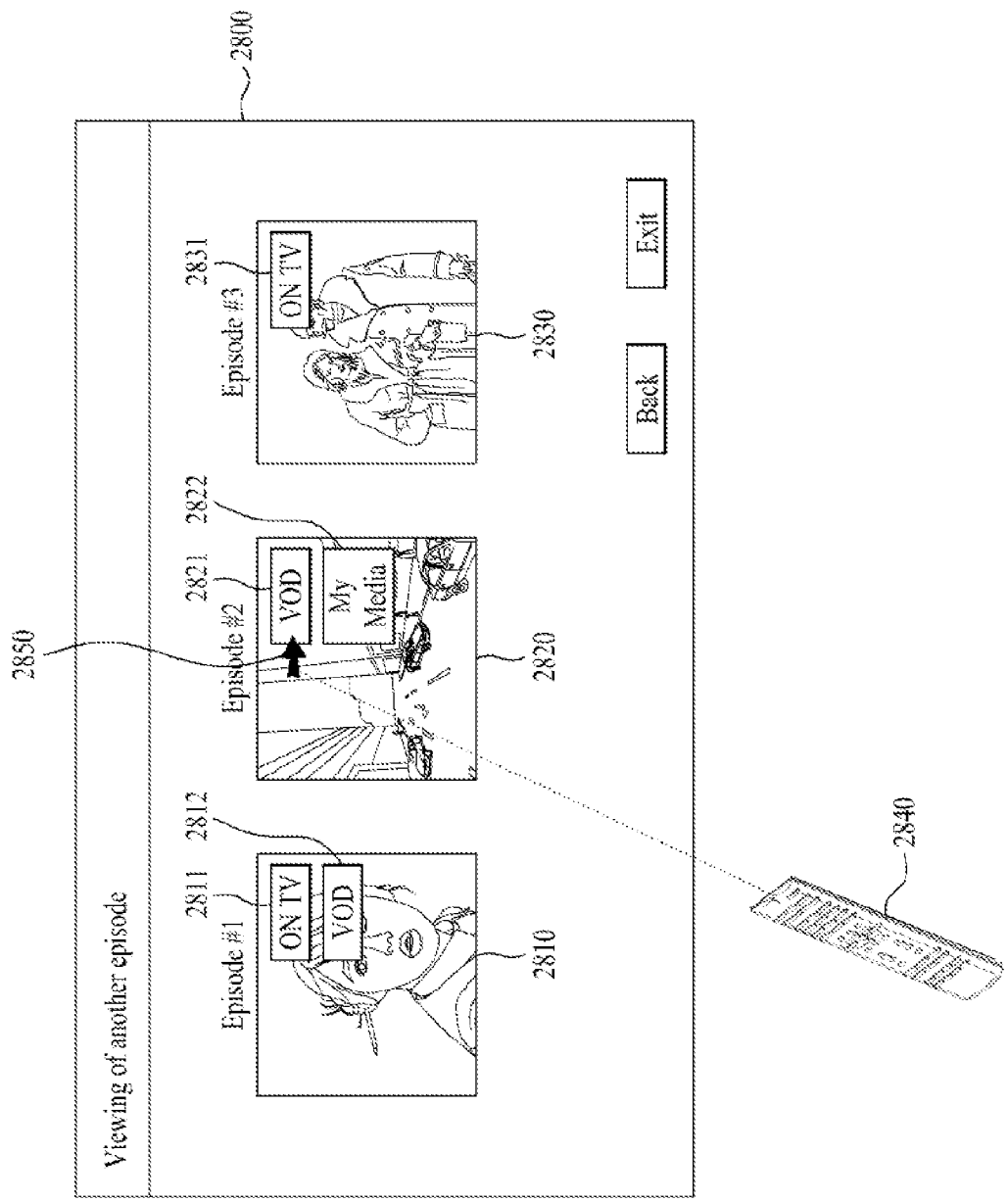
FIG. 28 is a view illustrating the user interface relating to the first function provided by the enhanced EPG in accordance with the embodiment of the present invention.

FIG. 28 is a view illustrating another example of the user interface relating to the first function from among the functions provided by the enhanced EPG in accordance with the embodiment of the present invention. Hereinafter, with reference to FIG. 28, another example of the user interface relating to the first function from among the functions provided by the enhanced EPG in accordance with the embodiment of the present invention will be described, as follows.

If the first option 2520 to select another episode is selected from among the options 2520, 2530 and 2540 shown in FIG. 25, the user interface shown in FIG. 28 is displayed. Further, in order to implement the user interface shown in FIG. 28, a memory of a display apparatus 2800 is designed to store the data format shown in FIG. 26, and this is within, the spirit and scope of the invention.

While the user interface shown in FIG. 27 is designed to arrange the episodes according to source device, the user interface shown in FIG. 28 is designed to display only corresponding source devices according to episode number.

As shown in FIG. 28, the display apparatus 2800 in accordance with the embodiment of the present invention displays a representative thumbnail image of episode number 1 of specific content in a first main region 2810. Further, the display apparatus 2800 is designed to display items to identify source devices providing episode number 1. For example, if the source devices providing episode number 1 correspond to the broadcast station and the VOD server, an item indicating the broadcast station is displayed in a first sub-region 2811 and an item indicating the VOD server is displayed in a second sub-region 2812.

Further, the display apparatus 2800 displays a representative thumbnail image of episode number 2 of the above-described specific content in a second main region 2820. Further, the display apparatus 2800 is designed to display items to identify source devices providing episode number 2. For example, when the source devices providing episode number 2 correspond to the VOD server and the my media device group, an item indicating the VOD server is displayed in a third sub-region 2821 and an item indicating the my media device group is displayed in a fourth sub-region 2822.

Moreover, the display apparatus 2800 displays a representative thumbnail image of episode number 3 of the above-described specific content in a third main region 2830. Further, the display apparatus 2800 is designed to display items to identify source devices providing episode number 3. For example, when the source devices providing episode number 3 correspond to the broadcast station, an item indicating the broadcast station is displayed in a fifth sub-region 2831.

Therefore, a user of the display apparatus 2800 may more rapidly select a desired episode and a desired source device using an indicator 2850, the position of which is automatically varied according to movement of a remote controller 2840 in accordance with the embodiment of the present invention.

FIG. 29 is a view illustrating another example of the table to store the data necessary to implement the enhanced EPG in accordance with the embodiment of the present invention. Hereinafter, with reference to FIG. 29, the table to store priority data necessary to implement the enhanced EPG in accordance with the embodiment of the present invention according will be described, as follows.

As described above, the display apparatus (for example, the TV) in accordance with the embodiment of the present invention is designed to collect metadata of all episodes of specific content (for example, episode number 1 of drama A, episode number 2 of drama A, episode number 3 of drama A, etc.) provided by each of the source devices (for example the broadcast station, the VOD server and the my media device group). Further differing from FIG. 26, priorities are granted to source devices providing each episode in FIG. 29.

It is assumed that there is one source device or plural sources devices providing each episode of specific content. For example, as shown in FIG. 29, among source devices providing episode number 1 of the specific content, priority 1 is granted to the VOID server and priority 2 is granted to a channel 11 of the broadcast station. Further, among source devices providing episode number 2 of the specific content, priority 1 is granted to the my media group, priority 2 is granted to a channel 13 of the broadcast station, and priority 3 is granted to the VOD server. If there is only a channel 7 of the broadcast station providing episode number 3 of the specific content, priority 1, i.e., top priority, is granted to the channel 7 of the broadcast station.

Now, solutions to grant priorities to the source devices, as shown in FIG. 29, will be described, as follows.

First, a first solution to grant priorities to the source devices is exemplarily described. In the first solution, top priority is granted to a source device which provides an episode as a free service and enables a user to promptly view the episode. Middle priority is granted to a source device which enables the user to promptly view the episode but provides the episode as a paid service. Further, bottom priority is granted to a source device which provides the episode as a free service but requires a standby time for viewing. That is, the above first solution is designed to employ "stand-by time" as the most important factor.

Next, a second solution to grant priorities to the source devices is exemplarily described. In the second solution, top priority is granted to a source device which provides an episode as a free service and enables a user to promptly view the episode. Middle priority is granted to a source device which provides the episode as a free service but requires a stand-by time for viewing. Further, bottom priority is granted to a source device which enables the user to promptly view the episode but provides the episode as a paid service. That is, the above second solution is designed to employ "money" as the most important factor.

Finally, a third solution, to grant priorities to the source devices is a combination of the above-described first solution and second solution, and considers both "stand-by time" and "money". In the third solution, top priority may be granted to a source device which provides an episode as a free service or a source device which provides the episode as a paid service, according to a predetermined reference stand-by time value.

For example, if a source device A provides an episode as a free service but requires a stand-by time of 1 hour or more to view the specific episode, top priority is granted to the VOD server providing the same episode as a paid service and enabling a user to promptly view the episode. On the other hand, if a source device B provides an episode as a free service and requires a stand-by time of less than 1 hour to view the specific episode, top priority is granted to the source device B rather than the VOD server providing the content as a paid service.

The data format shown in FIG. 29 is stored in the memory of the display apparatus in accordance with the embodiment of the present invention. User interfaces to implement the enhanced EPG in accordance with the embodiment of the present invention using the data format shown in FIG. 29 will be described in detail with reference to FIGS. 30 and 31.

Figure 30:
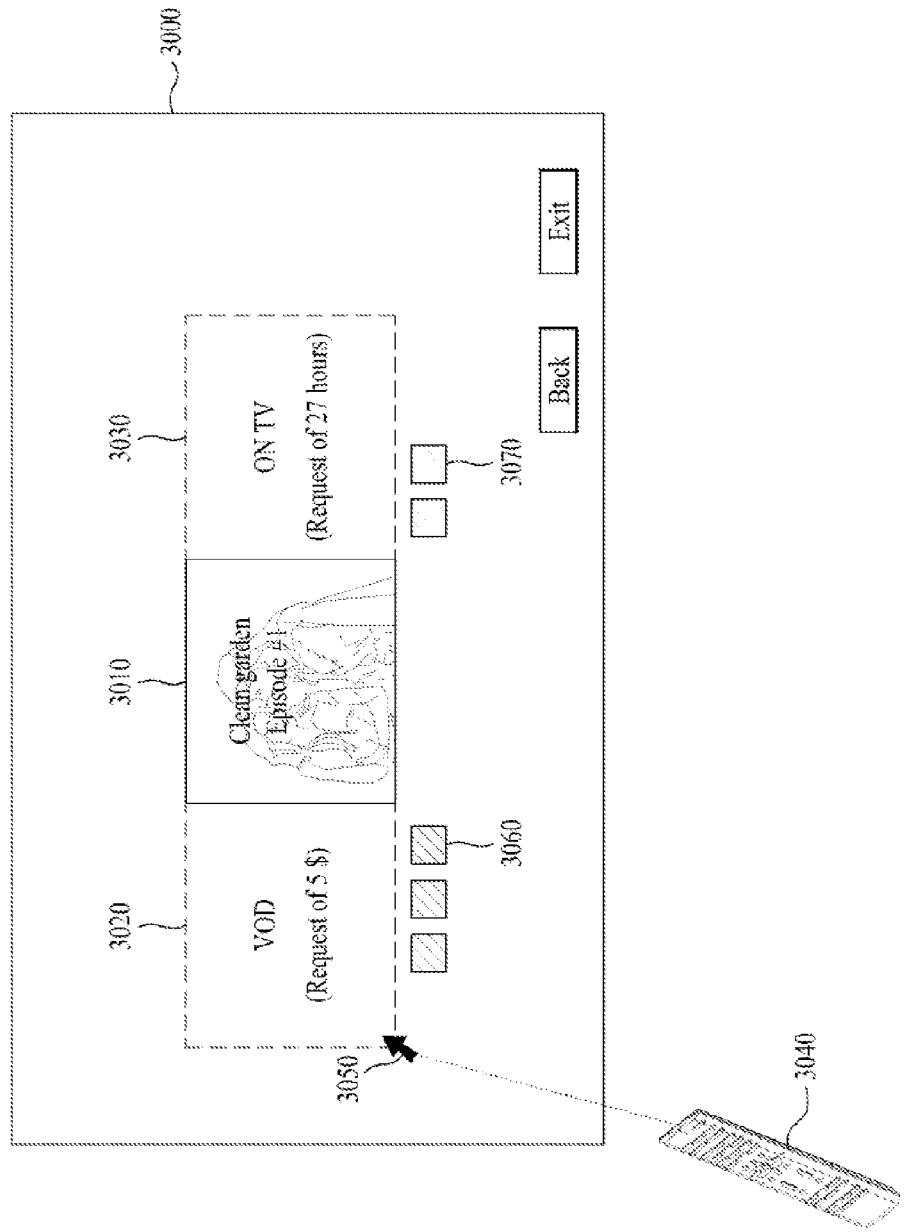
FIG. 30 is a view illustrating yet another user interface relating to the first function provided by the enhanced EPG in accordance with an embodiment of the present invention.

FIG. 30 is a view illustrating yet another example of the user interface relating to the first function from among the functions provided by the enhanced EPG in accordance with the embodiment of the present invention. For example, it is assumed that the user interface shown in FIG. 30 is displayed when a specific episode is selected from among the episodes shown in FIG. 28. Further, it is assumed that a display apparatus 3000 shown in FIG. 30 stores the data format regarding priorities shown in FIG. 29.

As shown in FIG. 30, the display apparatus 3000 in accordance with the embodiment of the present invention displays a representative thumbnail image indicating a specific episode of specific content in a first region 3010.

Further, the display apparatus 3000 is designed to output options respectively indicating plural source devices providing the specific episode of the specific content. For example, a first option 3020 to select the VOD server providing the specific episode of the specific content and a second option 3030 to select the broadcast station providing the specific episode of the specific content are displayed.

Further, as shown in FIG. 30, if the first option 3020 is selected, a fee of 5 dollars is required, and if the second option 3030 is selected, a stand-by time of 27 hours is required to view the corresponding episode.

Based on the third solution providing priorities described above with reference to FIG. 29, since a time (27 hours) exceeding 24 hours is required to execute the second option 3030, higher priority is granted to the first option. 3020 rather than the second option 3030.

Here, in order to enable a user to more easily recognize and select a source device having higher priority, addition of a graphic indicating information regarding priorities is within the spirit and scope of the invention. For example, as shown in FIG. 30, first sub-regions 3060 indicating relatively higher priority are located around the first option 3020, and second sub-regions 3070 indicating relatively lower priority are located around the second option 3030.

Therefore, an indicator 3050, the position of which is varied according to movement of a remote controller 3040 in accordance with the embodiment of the present invention, may be more promptly located in the first option 3020 having the higher priority. Of course, a user of the display apparatus 3000 may select the second option 3030 regardless of priority.

Figure 31:
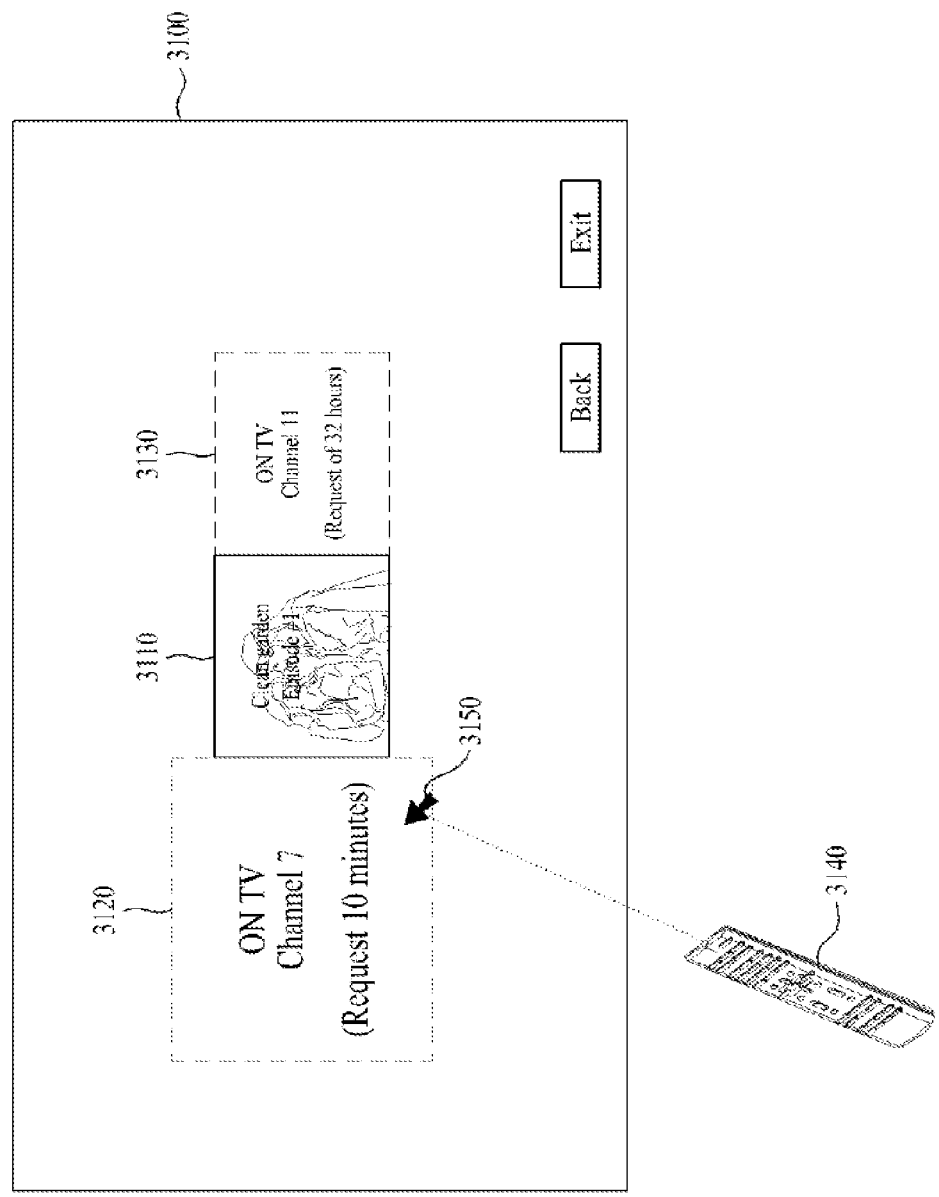
FIG. 31 is a view illustrating a further user interface relating to the first function from among the functions provided by the enhanced EPG in accordance with an embodiment of the present invention.

FIG. 31 is a view illustrating a further example of the user interface relating to the first function from among the functions provided by the enhanced EPG in accordance with the embodiment of the present invention. For example, it is assumed that the user interface shown in FIG. 31 is displayed when a specific episode is selected from among the episodes shown in FIG. 28. Further, it is assumed that a display apparatus 3100 shown in FIG. 31 stores the data format regarding priorities shown in FIG. 29.

Differing from FIG. 30, the display apparatus 3100 shown in FIG. 31 is designed to allow an option having higher priority to have a relatively large size, thereby increasing a probability that a remote controller selects an option having top priority.

As shown in FIG. 31, the display apparatus 3100 in accordance with the embodiment of the present invention displays a representative thumbnail image of a specific episode of specific content in a first region 3110.

Further, the display apparatus 3100 is designed to output options respectively indicating plural source devices providing the specific episode of the specific content. For example, a first option 3120 to select a channel 7 providing the specific episode of the specific content and a second option 3130 to select a channel 11 providing the specific episode of the specific content are displayed.

Further, as shown in FIG. 31, if the first option 3120 is selected, a stand-by time of 10 minutes is required, and if the second option 3130 is selected, a stand-by time of 32 hours is required to view the corresponding episode. Under the same conditions, a source device having a shorter stand-by time has higher priority.

Therefore, the first option 3120 having higher priority has a relatively larger size, and the second option 3230 having lower priority has a relatively smaller size. In this case, a probability that an indicator 3150, the position of which is varied according to movement of a remote controller 3140 in accordance with the embodiment of the present invention, is located in the first option 3120 having the higher priority is increased.

Figure 32:
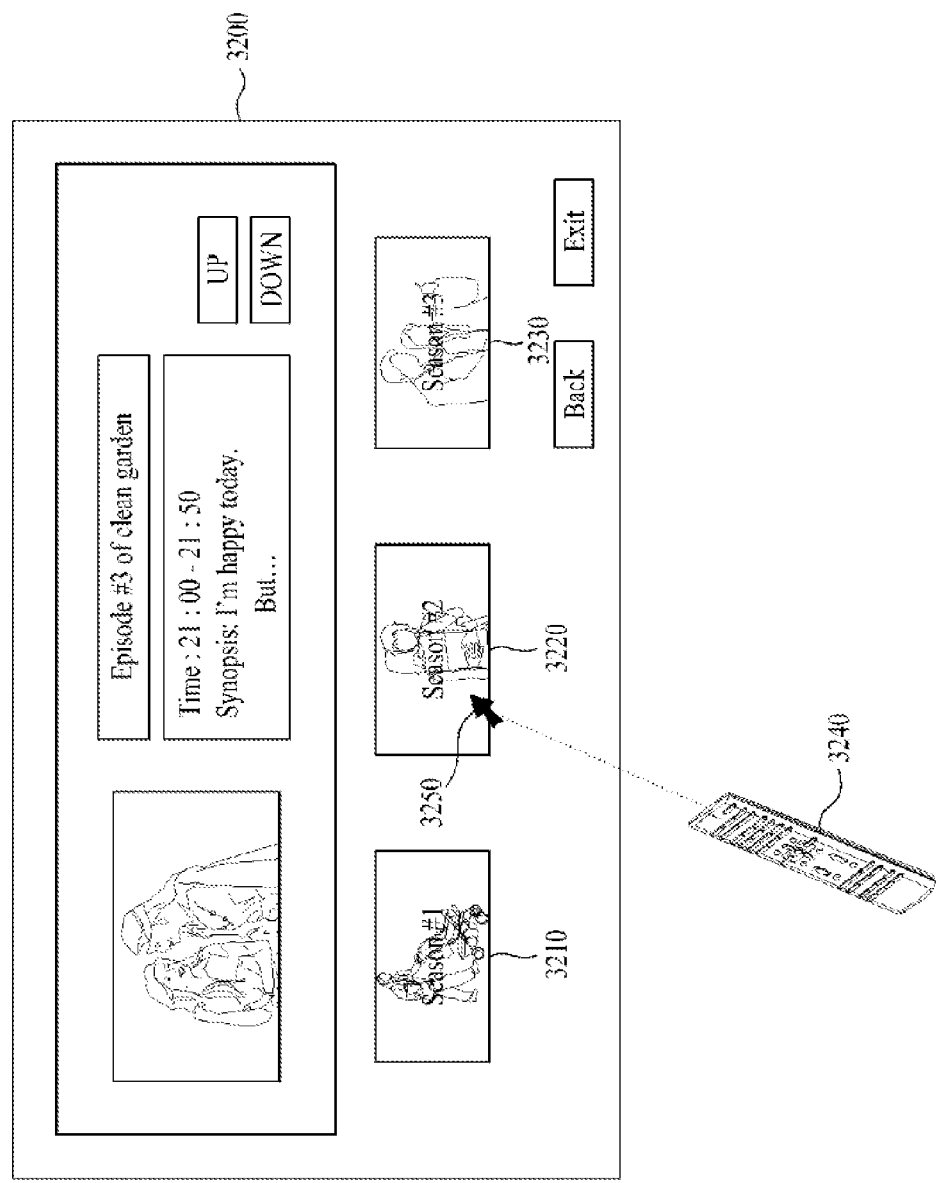
FIG. 32 is a view illustrating a user interface relating to a second function from among the functions provided by the enhanced EPG in accordance with an embodiment of the present invention.

FIG. 32 is a view illustrating one example of a user interface relating to a second function from among the functions provided by the enhanced EPG in accordance with the embodiment of the present invention. Hereinafter, with reference to FIG. 32, one example of the user interface relating to the second function from among the functions provided by the enhanced EPG in accordance with the embodiment of the present invention will be described, as follows.

If the second option 2530 to select another season is selected from among the options 2520, 2530 and 2540 shown in FIG. 25, the user interface shown in FIG. 32 is displayed. It is assumed that metadata of specific content selected by a user has a series code. The series code is, for example, data to judge whether or not the specific content belongs to season 1, season 2 or season 3.

As shown in FIG. 32, a display apparatus 3200 in accordance with the embodiment of the present invention is designed to output all season data 3210, 3220 and 3230 of specific content on a screen. Therefore, the display apparatus 3200 shown in FIG. 32 provides a solution to search episodes of not only the currently selected season of the specific content but also other seasons of the specific content.

When an indicator 3250 of a remote controller 3240 in accordance with the embodiment of the present invention is located in a season 2 region 3220, options indicating episodes belonging to the season 2 are displayed. For example, arrangement of the positions of the episodes belonging to the corresponding season according to source device, as shown in FIGS. 27 and 28, is within the spirit and scope of the invention.

Figure 33:
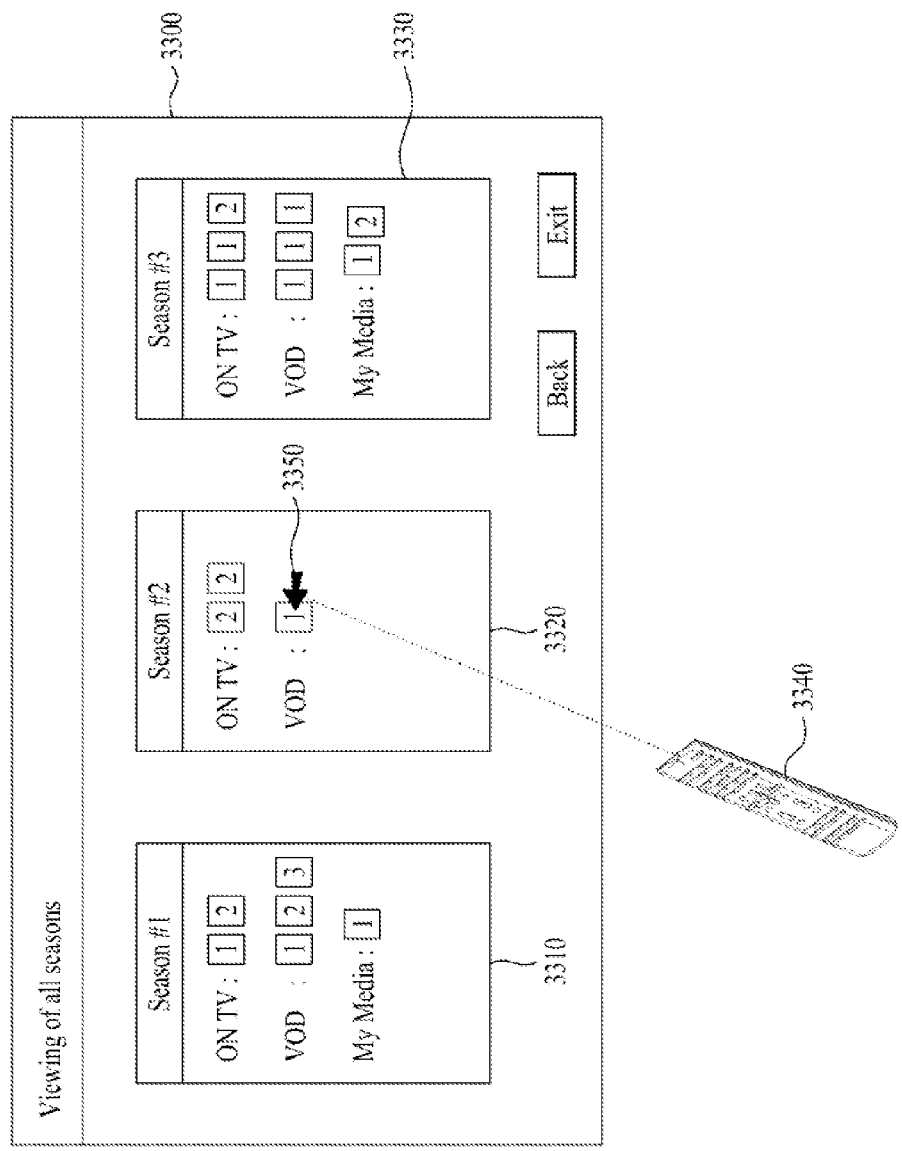
FIG. 33 is a view illustrating another user interface relating to the second function provided by the enhanced EPG in accordance with an embodiment of the present invention.

FIG. 33 is a view illustrating another example of the user interface relating to the second function from among the functions provided by the enhanced EPG in accordance with the embodiment of the present invention. Hereinafter, with reference to FIG. 33, another example of the user interface relating to the second function from among the functions provided by the enhanced EPG in accordance with the embodiment of the present invention will be described, as follows.

If the second option 2530 to select another season is selected from among the options 2520, 2530 and 2540 shown in FIG. 25, the user interface shown in FIG. 33 is displayed. Differing from FIG. 32, FIG. 33 displays episodes belonging to respective seasons such that episodes belonging to each season are spread in one screen.

A display apparatus 3300 in accordance with the embodiment of the present invention collects metadata and classifies the respective episodes according to season, as described above. Further, as shown in FIG. 33, the display apparatus 3300 is designed to display episodes belonging to a first season in a first main region 3100, to display episodes belonging to a second season in a second main region 3320, and to display episodes belonging to a third season in a third main region 3330.

Further, the first main region 3310 includes first graphic data to re-classify the episodes belonging to the first season according to source devices. The second main region 3320 includes second graphic data to re-classify the episodes belonging to the second season according to source devices. The third main region 3330 includes third graphic data to re-classify the episodes belonging to the third season according to source devices.

Therefore, the user interface shown in FIG. 33 is advantageous in that a user of the display apparatus 3300 may rapidly access a region indicating a specific season, a specific source device and a specific episode using an indicator 3350, the position of which is automatically varied according to movement of a remote controller 3340.

Figure 34:
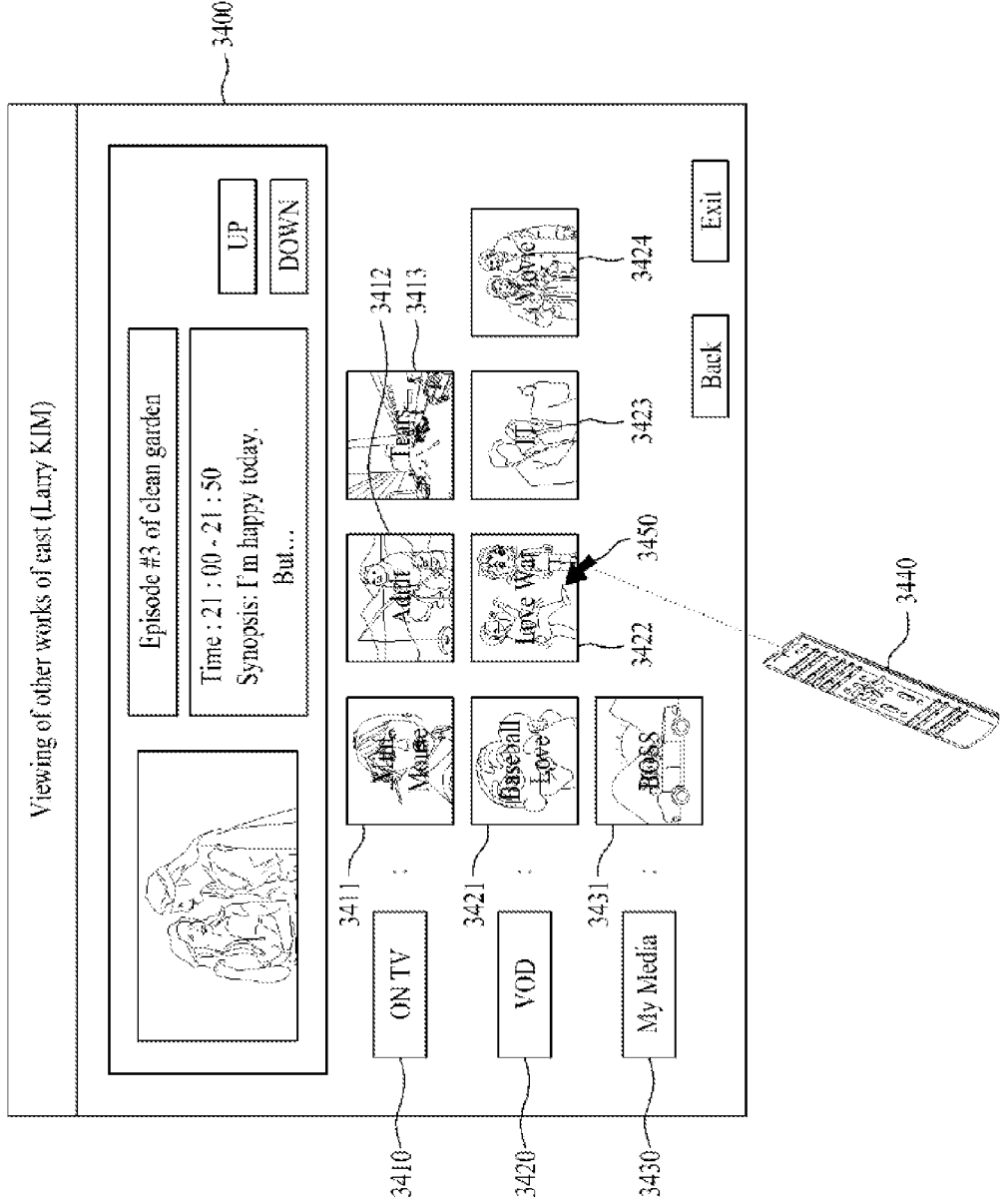
FIG. 34 is a view illustrating a user interface relating to a third function from among the functions provided by the enhanced EPG in accordance with an embodiment of the present invention.

FIG. 34 is a view illustrating one example of a user inter-face relating to a third function from among the functions provided by the enhanced EPG in accordance with the embodiment of the present invention. Hereinafter, with reference to FIG. 34, one example of the user interface relating to the third function from among the functions provided by the enhanced EPG in accordance with the embodiment of the present invention will be described, as follows.

If the third option 2540 to select content relating to a specific actor is selected from among the options 2520, 2530 and 2540 shown in FIG. 25, the user interface shown in FIG. 34. It is assumed that metadata of specific content selected by a user has actor-related information (for example, information regarding actors, etc).

A display apparatus 3400 in accordance with the embodiment of the present invention is designed to output contents regarding a specific actor among actors relating to the currently selected specific content. Therefore, the above user interface is advantageous in that separate search of works in which the specific actor appears is not required.

As shown in FIG. 34, other contents in which an actor Larry KIM appears are displayed under the condition that the contents are classified according to source device. For example, a broadcast station 3410 provides three contents 3411, 3412 and 3413 on the air or expects to provide the three contents 3411, 3412 and 3413. A. VOD server 3420 provides four contents 3421, 3422, 3423 and 3424 as a paid service. Further, my media device group 2430 stores one content 3431.

Particularly, the user interface shown in FIG. 34 displays contents relating to the specific actor under the condition that the contents are classified according to source device, thus enabling a user to more rapidly select a desired content in consideration of both money and stand-by time.

For example, if the same content is provided by both the VOD server 3420 and the broadcast station 3410 and there is a long time till the start of the content, a user does not need to select the content of the VOD server 3420 provided as the paid service. Here, a remote controller 3440 and an indicator 3450 may be interpreted with reference to the above description.

Figure 35:
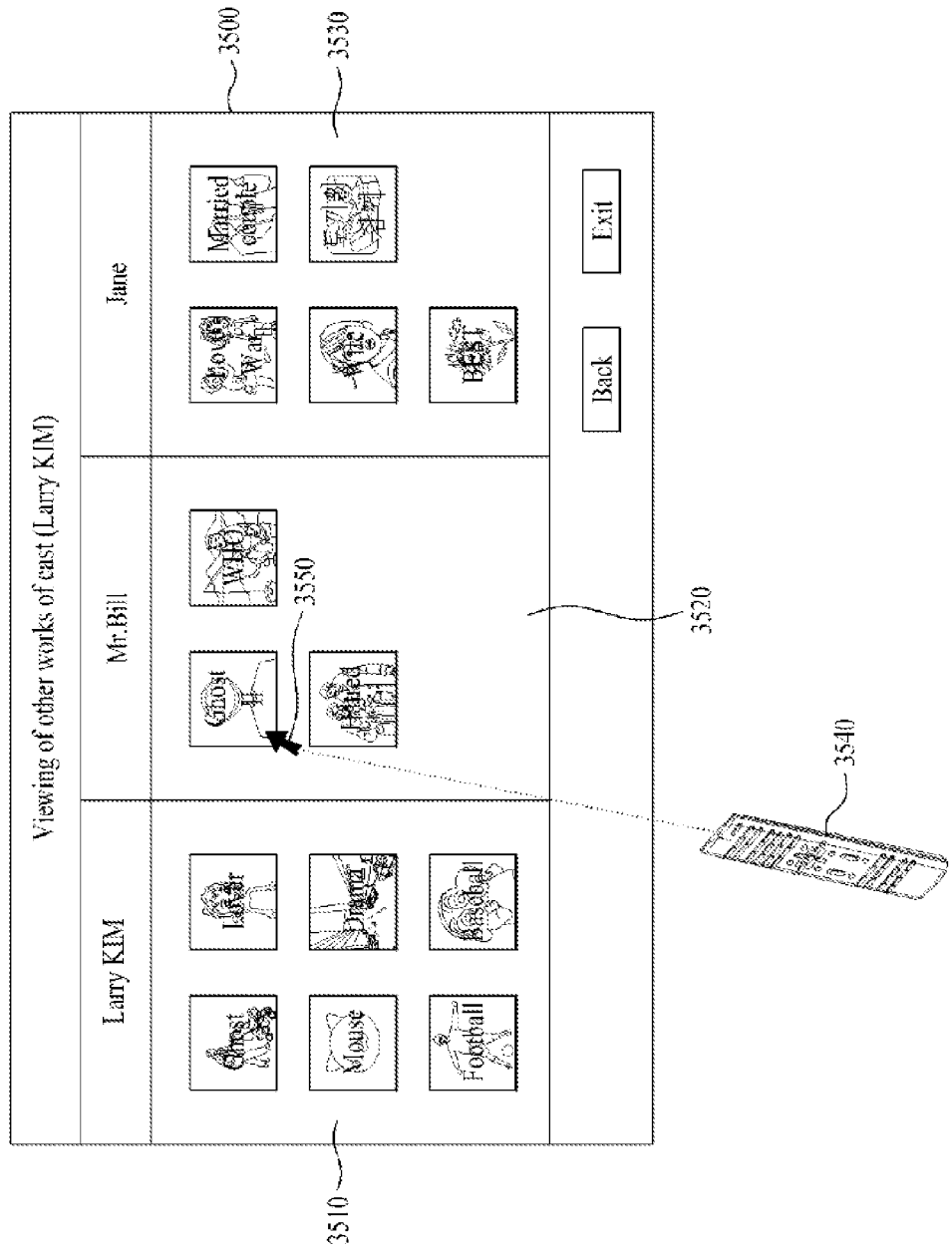
FIG. 35 is a view illustrating another user interface relating to the third function from provided by the enhanced EPG in accordance with an embodiment of the present invention.
Figure 36:
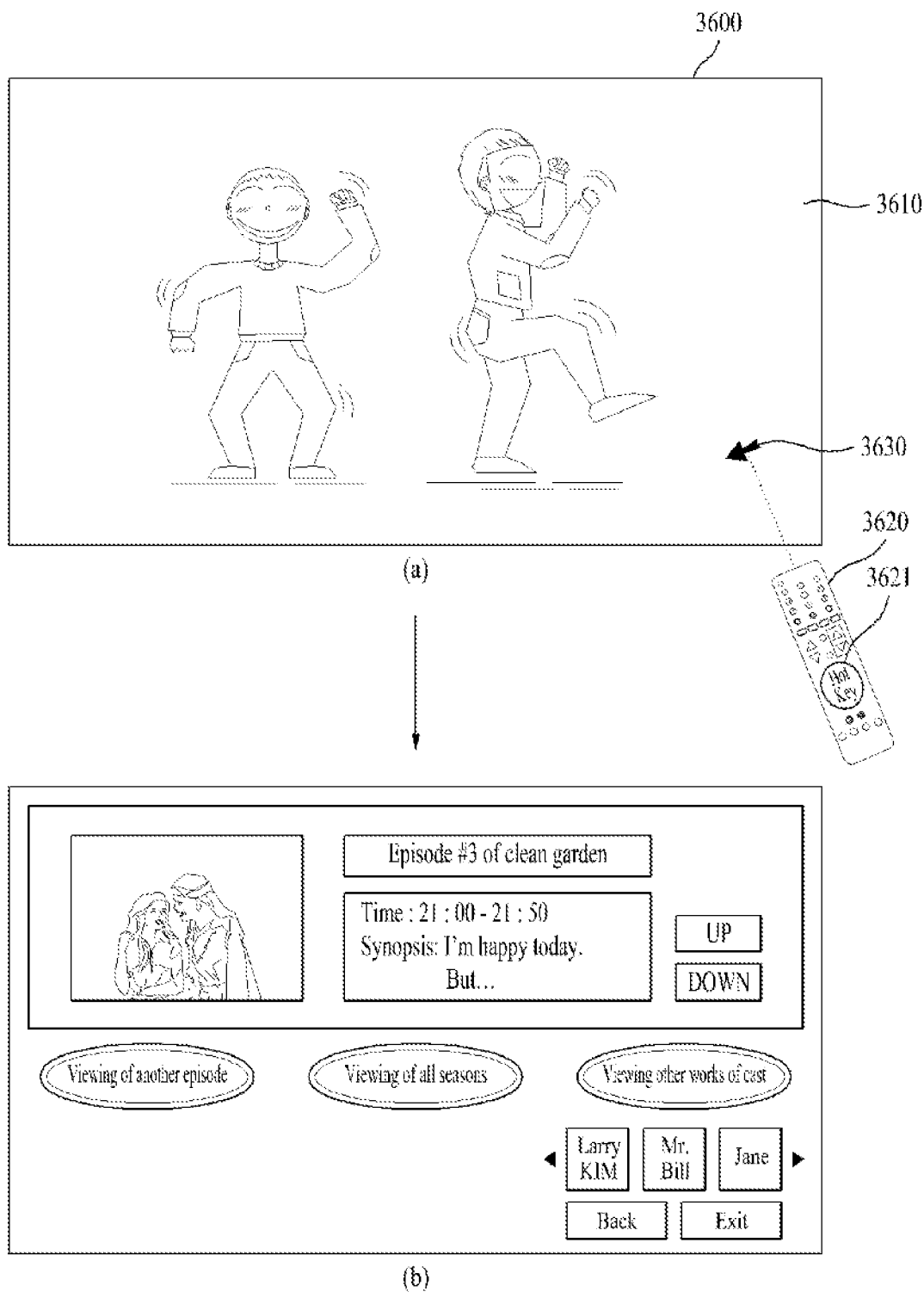
FIG. 36 is a view illustrating a first mode to enter the enhanced EPG in accordance with the embodiment of the present invention.
Figure 39:
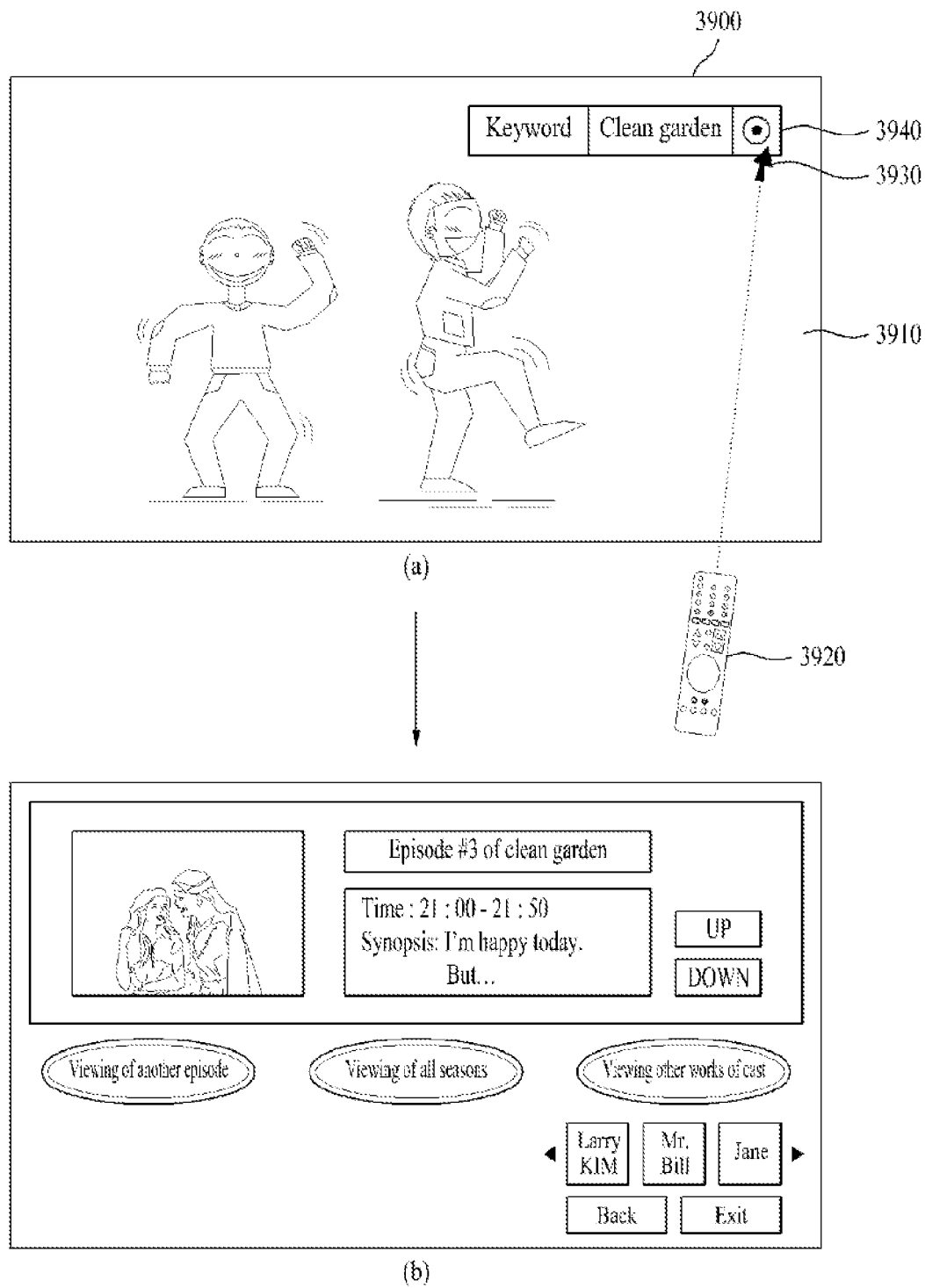
FIG. 39 is a view illustrating a fourth mode to enter the enhanced EPG in accordance with an embodiment of the present invention.

FIG. 35 is a view illustrating another example of the user interface relating to the third function from among the functions provided by the enhanced EPG in accordance with the embodiment of the present invention. Hereinafter, with reference to FIG. 35, another example of the user interface relating to the third function from among the functions provided by the enhanced EPG in accordance with the embodiment of the present invention will be described, as follows.

If the third option 2540 to select content relating to a specific actor is selected from among the options 2520, 2530 and 2540 shown in FIG. 25, the user interface shown in FIG. 35 is displayed. In FIG. 34, it is assumed that a specific actor is selected from plural actors relating to a currently selected specific content. On the other hand, in FIG. 35, graphic data relating plural actors relating to a currently selected specific content are generated and displayed-simultaneously.

Here, it is assumed that the currently selected specific content is a drama and actors appearing in the drama are three. Here, a display apparatus 3500 collects information regarding contents in which the respective actors appear or to which the respective actors relate using metadata.

Therefore, as shown in FIG. 35, a graphic to list contents relating to an actor Larry KIM, is displayed in a first main region 3510, a graphic to list contents relating to an actor Mr. Bill is displayed in a second main region 3520, and a graphic to list contents relating to an actor Jane is displayed in a third main region 3530.

Although FIG. 35 does not illustrate classification of the contents according to source devices, re-arrangement of the contents according to plural source devices is within the spirit and scope of the invention. Further, a remote controller 3540 and an indicator 3550 may be interpreted with reference to the above description.

FIGS. 36(a) and 36(b) are views illustrating a first mode to enter the enhanced EPG in accordance with the embodiment of the present invention. Hereinafter, with reference to FIGS. 36(a) and 36(b), the first mode to enter the enhanced EPG main screen shown in FIG. 25 will be described, as follows.

As shown in FIG. 36(a), a display apparatus 3600 in accordance with the embodiment of the present invention displays random content 3610. The random content 3610 may be, for example, a broadcast program transmitted from a broadcast station or content transmitted through an Internet network.

Here, when an indicator 3630 is located in a region displaying the content 3610 using a hot key 3621 of a remote controller 3620, the above-described main screen of FIG. 25 is displayed, as shown in FIG. 36(b). Therefore, options shown in FIG. 36(b) relate to the content shown in FIG. 36(a) (for example, episode number 3 of 'Clean garden').

FIGS. 37(a) and 37(b) are views illustrating a second mode to enter the enhanced EPG in accordance with the embodiment of the present invention. Hereinafter, with reference to FIGS. 37(a) and 37(b), the second mode to enter the enhanced EPG main screen show in FIG. 25 will be described, as follows.

As shown in FIG. 37(a), a display apparatus 3700 in accordance with the embodiment of the present invention displays an EPG 3710 of broadcast programs transmitted from a broadcast station. Such an EPG 3710 displays the broadcast programs, for example, under the condition that the broadcast programs of each channel are divided in order of time.

Here, when an indicator 3730 is located in the region of a specific broadcast program using a remote controller 3720, the above-described main screen of FIG. 25 is displayed, as shown in FIG. 37(b). Therefore, options shown in FIG. 37(b) relate to the specific broadcast program shown in FIG. 37(a) (for example, episode number 3 of 'Clean garden').

FIGS. 38(a) and 38(b) are views illustrating a third mode to enter the enhanced EPG in accordance with the embodiment of the present invention. Hereinafter, with reference to FIGS. 38(a) and 38(b), the third mode to enter the enhanced EPG main screen shown in FIG. 25 will be described, as follows.

As shown in FIG. 38(a), a display apparatus 3800 in accordance with the embodiment of the present invention displays representative thumbnail image data 3810 of broadcast programs currently transmitted through respective channels. Such thumbnail image data 3810 may be referred to as a channel browsing screen or a channel browser. While FIGS. 37(a) and 37(b) illustrate previous, current and next broadcast programs, FIGS. 38(a) and 38(b) illustrate only current broadcast programs.

Here, when an indicator 3830 is located in a specific channel region in which a specific broadcast program is broadcasted using a remote controller 3820, the above-described main screen of FIG. 25 is displayed, as shown in FIG. 38(b). Therefore, options shown in FIG. 38(b) relate to the broadcast program transmitted through the specific channel, i.e., a channel 11, shown, in FIG. 38(a).

FIGS. 39(a) and 39(b) are views illustrating a fourth mode to enter the enhanced EPG in accordance with the embodiment of the present invention. Hereinafter, with reference to FIGS. 39(a) and 39(b), the fourth mode to enter the enhanced EPG main screen shown in FIG. 25 will be described, as follows.

As shown in FIG. 39(a), a display apparatus 3900 in accordance with the embodiment of the present outputs a general broadcast screen 3910. However, differing from FIG. 36(a), the display apparatus 3900 shown in FIG. 39(a) simultaneously displays a window 3940 to input a keyword.

The conventional display apparatus is designed to output only a Web search result, when a keyword is input. However, in the case of the display apparatus 3900 in accordance with the embodiment of the present invention, when a title of specific content is input to the window 3940 by a user, the above-described main screen of FIG. 25, as shown in FIG. 39(b). At this time, a remote controller 3920 and an indicator 3930 are used.

Therefore, options shown in FIG. 39(b) relate to a broadcast program corresponding to the specific keyword input to the window 3940 shown in FIG. 39(a). While FIG. 36(a) illustrates the enhanced EPG regarding the current displayed broadcast program, FIG. 39(a) illustrates the enhanced EPG based on the keyword input by the user regardless of the current broadcast program.

Figure 40:
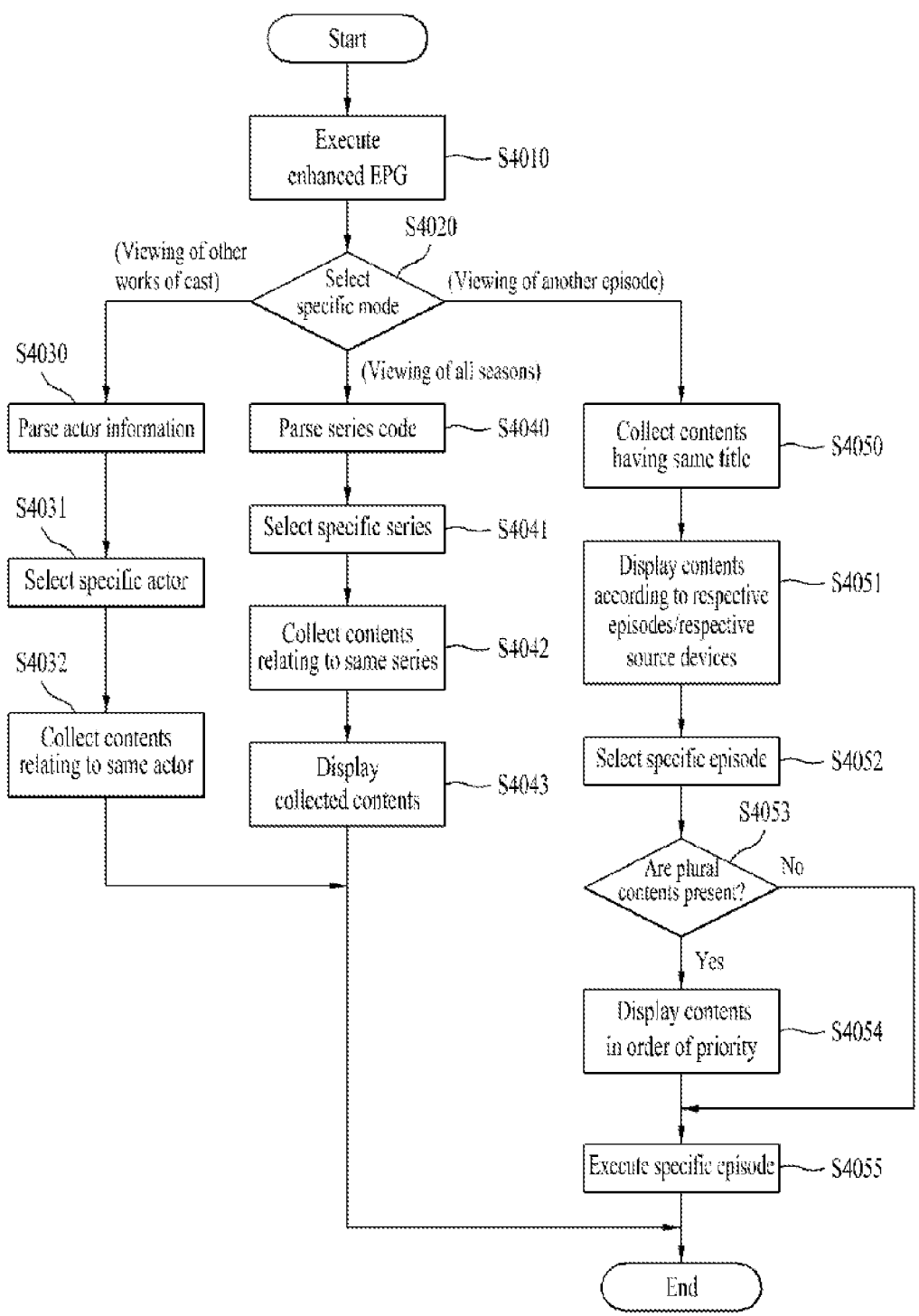
FIG. 40 is a flowchart illustrating a method of controlling a. TV processing the enhanced EPG in accordance with an embodiment of the present invention.

FIG. 40 is a flowchart illustrating a method of controlling a TV processing the enhanced EPG in accordance with the embodiment of the present invention. Hereinafter, with reference to FIG. 40, the method of controlling the TV processing the enhanced EPG in accordance with the embodiment of the present invention will be described, as follows. FIG. 40 exemplarily illustrates one embodiment, and this will be understood that the spirit and scope of the present invention should be defined by the scope of the appended claims and their equivalents.

The display apparatus (for example, a TV) of the present invention executes the enhanced EPG in accordance with the embodiment (Operation S4010). Operation S4010 is executed based one of the above-described modes of FIGS. 36(a) and 36(b) to FIGS. 39(a) and 39(b).

Further, the display apparatus selects one of the three options shown in FIG. 25 (Operation S4020).

When the first option 2520 shown in FIG. 25 to select another episode is selected, the display apparatus collects contents having metadata of the same title (Operation S4050). Further, the display apparatus displays a graphic to list the contents according to respective episodes or respective source devices (Operation S4051). This is described above with reference to FIGS. 27 and 28.

When a specific episode is selected (Operation S4052), the display apparatus judges whether or not plural contents having the same episode number are present (Operation S4053). Upon judging that plural source devices providing the same content are present (yes in S4054), the display apparatus displays a graphic to list the source devices in order of priority (Operation S4054). Such Operation S4054 may be understood with reference to FIGS. 29 to 31. Therefore, the display apparatus outputs the specific episode transmittable from a specific source device on a screen (Operation S4055).

When the second option 2530 shown in FIG. 25 to select another season is selected, the display apparatus parses series code information (Operation S4040). When a specific series (for example, season 1 of drama A, season 2 of drama B or season 3 of drama C) is selected (Operation S4041), the display apparatus collects contents belonging to the same series (Operation S4042). Then, the display apparatus displays a graphic to classify episodes collected from the respective source devices according to season (Operation S4043). The above Operation S4040 to Operation 4043 may be understood with reference to FIGS. 32 and 33.

When the third option 2540 shown in FIG. 25 to select a specific actor is selected, the display apparatus parses metadata relating to actors (for example, actor names) (Operation S4030). When a specific actor is selected by a user (Operation S4031), the display apparatus collects contents having the same metadata as metadata corresponding to the selected specific actor (Operation S4032). Here, re-arrangement of the collected contents according to respective source devices is within the spirit and scope of the invention. The above Operation S4030 to Operation 4043 may be understood with reference to FIGS. 34 and 35.

With reference to FIGS. 23 to 40 collectively, the method of controlling the display apparatus connected to the plural source devices will be described, as follows.

A display apparatus in accordance with one embodiment of the present invention receives first metadata (for example, title information) corresponding to each of contents respectively provided by the plural source devices. Further, the contents include, for example, second metadata (for example, information indicating an image quality level of each of the contents and information indicating whether or not each of the contents includes an advertisement).

The display apparatus outputs AV data of first content transmitted through a network, and collets a first group having the same metadata as metadata of the first content using the received first metadata.

The display apparatus controls generation of an enhanced EPG in which the contents of the collected first group are arranged in predetermined order, and display of the generated enhanced EPG.

The above-described enhanced EPG additionally displays an indicator to receive OST information relating to a specific event. Here, the display apparatus is designed to access a CP or a Web site providing the OST information, when the indicator is selected.

If the contents belonging to the first group in the enhanced EPG are arranged in order of episode number, a display apparatus in accordance with another embodiment of the present invention displays thumbnail images of the contents belonging to the first group in a first region and displays indicators indicating kinds of source devices providing the respective contents in a second region. This will be understood by those skilled in the art with reference to FIG. 28.

If plural contents corresponding to a specific episode number are present, a display apparatus in accordance with another embodiment of the present invention calculates priorities of the respective contents corresponding to the specific episode number and differentially displays thumbnail images of the respective contents according to the calculated priorities. This will be understood by those skilled in the art with reference to FIGS. 29 to 31.

Further, a display apparatus in accordance with another embodiment of the present invention collects a second group having the same metadata as metadata indicating actors relating to the first content, and generates an enhanced EPG including a thumbnail image corresponding to at least one content belonging to the collected second group. This will be understood by those skilled in the art with reference to FIGS. 34 and 35.

Further, a display apparatus in accordance with yet another embodiment of the present invention, if the first content has metadata corresponding to a series code, collects a third group belonging to a season differing from the season of the first content, and generates an enhanced EPG including a thumbnail image corresponding to at least one content belonging to the collected third group. This will be understood by those skilled in the art with reference to FIGS. 32 and 33.

In summary, in accordance with one embodiment of the present invention, metadata corresponding to first metadata (for example, title, genre and actor information) of specific content is firstly collected. Further, metadata corresponding to second metadata (for example, random metadata other than the set first metadata) is secondarily filtered from among the firstly collected metadata, and this is within the spirit and scope of the invention. According to other embodiment of the present invention, the first metadata can be same as the second metadata, or different from the second metadata. The enhanced EPG or enhanced program guide described in specification may be named as a program guide.

According to other embodiment of the present invention, when a user is a premium member of the first source, the predetermined order includes arranging a position of graphic data indicating first content corresponding to the first metadata from the first source first in the displayed program guide. Moreover, when the first metadata includes a price associated with viewing the content, the predetermined order includes arranging a position of the graphic data indicating the contents corresponding to at least one of the first and second metadata in order of the price.

According to another embodiment of the present invention, the predetermined order includes arranging a position of the graphic data indicating the contents corresponding to at least one of the first and second metadata that is scheduled to be displayed first. Moreover, the predetermined order includes arranging a position of the graphic data indicating the contents corresponding to at least one of the first and second metadata that corresponds to recommendation information from via a social network service. For example, the recommendation information includes a number of recommendations included in the social network service.

According to yet another embodiment of the present invention, the method comprises a step of displaying a messaging window for communicating on the social network service, and a step of scanning the messaging window for data included in at least one of the first and second metadata. Furthermore, the predetermined order includes arranging a position of the graphic data indicating the contents corresponding to at least one of the first and second metadata first that is included in the scanned instant messaging window.

According to still another embodiment of the present invention, at least one of the first and second metadata includes at least one of 1) advertisement information indicating whether or not first or second contents includes advertisements and 2) quality information indicating a quality of the first or second contents. Furthermore, the predetermined order includes arranging a position of the graphic data indicating the contents corresponding to at least one of the first and second metadata in order of episode number. Moreover, the first metadata further includes thumbnail image representing the contents to be displayed on the display apparatus, and the program guide includes the thumbnail image.

Thus, another user using the social network service such as FACEBOOK can tell user to watch the program CSI and give a time/channel/first or second sources. This information can then be used when generating the program guide.

Finally, the term "network" used herein corresponds to, for example, a broadcast network or an IP network. Therefore, the above-described network interface module is designed to receive at least one of data transmitted through the broadcast network and data transmitted through the IP network.

The display apparatus corresponds to, for example, a network TV, a smart TV, a hybrid broadcast broadband television (HBBTV), an Internet TV, a Web TV, an Internet protocol television (IPTV), and the network device corresponds to, for example, a set top box (STB).

Although the respective drawings have been divisionally illustrated for convenience of illustration, the embodiments described in the respective drawings may be combined to implement new embodiments. Further, design of a recording medium readable by a computer, in which a program to execute the above-described embodiments is recorded, as needed by those skilled in the art is within the spirit and scope of the invention.

The configurations and methods of the above-described embodiments are not limitedly applied to the display apparatus and the operating method thereof in accordance with the present invention, and some or all of the respective embodiments may be selectively combined so as to achieve various modifications of the embodiments.

Further, the operating method of the display apparatus in accordance with the present invention may be implemented as a code readable by a processor of the display apparatus in a recording medium readable by the processor. Recording media readable by the processor may include all kinds of recording devices in which data readable by the processor can be stored. The recording media readable by the processor may include a ROM, a RAM, a CD-ROM, a magnetic tape, a floppy disc and an optical data storage device, or may be implemented in a carrier wave form, such as transmission through Internet. Further, the recording media readable by the processor may be distributed to computer systems connected by a network, and a code readable by the processor in a distributed manner may be stored and executed in the recording media.

As is apparent from the above description, one embodiment of the present invention newly defines a data transmission protocol to generate an enhanced EPG.

Another embodiment of the present invention provides a solution to automatically classify episodes according to plural source devices.

Yet another embodiment of the present invention designs a user interface enabling a user to easily select a specific episode of specific content preferred by the user.

It will be apparent to those skilled in the art that various modifications and variations can be made in the present invention without departing from the spirit and scope of the invention. Thus, it is intended that the present invention covers the modifications and variations of this invention provided they come within the scope of the appended claims and their equivalents.

Further, although both the product-invention and the process-invention are described herein, description thereof may be complementarily applied to each other.

What is claimed is:

1. A television controlled by a remote controller, the television comprising:
   an infrared (IR) module to receive an IR signal from the remote controller;
   a radio frequency (RF) module to receive an RF signal from the remote controller;
   a network interface to receive metadata corresponding to a content to be displayed on a screen, the metadata including thumbnail image information, title information, actor information, genre information and synopsis information corresponding to the content; and
   a controller configured to change a power-off state of the television into a power-on state of the television based on the received IR signal and control a display to display a thumbnail image corresponding to the content based on the received, metadata on the screen,
   wherein the controller is further configured to:
   control the display to move a pointer on the screen based on the received RF signal containing information regarding movement of the remote controller,
   control the RF module to receive an RF signal corresponding to a designated key of the remote controller for selecting a thumbnail image corresponding to a specific content when the pointer is on the thumbnail image corresponding to the specific content, from the remote controller,
   control the display to display title information, actor information, genre information and synopsis information corresponding to the specific content according to the received RF signal corresponding to the designated key of the remote controller, and
   control the display to display related content information, the related content information relates to another content corresponding to the specific content based on the received metadata,
   wherein when the related content information is selected by the pointer, the controller further controls the display to display a thumbnail image corresponding to the another content, a first item to identify a first source providing the another content and the second item to identify a second source providing the another content, the second source being different from the first source.

2. The television of claim 1, wherein when the actor information corresponding to the specific content is selected by the pointer, the controller controls the display to display graphic data regarding plural actors relating to the specific content based on the received metadata.

3. The television of claim 1, wherein when a specific actor is selected by the pointer based on the displayed actor information corresponding to the specific content, the controller controls the display to display information regarding another content in which the specific actor appears, based on the received metadata.

4. The television of claim 1, wherein the controller controls the display to display an indicator for displaying invisible portion of the related content information corresponding to the specific content on the screen.

5. The television of claim 1, wherein the remote controller includes a gyro sensor for sensing information regarding movement of the remote controller based on x, y and z axes.

6. The television of claim 1, wherein the controller controls the RF module to receive an RF signal corresponding to a touchpad of the remote controller.

7. A television controlled by a remote controller, the television comprising:
- an infrared (IR) module to receive an IR signal from the remote controller;
- a radio frequency (RF) module to receive an RF signal from the remote controller;
- a network interface to receive metadata corresponding to a content to be displayed on a screen, the metadata including thumbnail image information, title information, actor information, genre information and synopsis information corresponding to the content; and
- a controller configured to change a power-off state of the television into a power-on state of the television based on the received IR signal and control a display to display a thumbnail image corresponding to the content based on the received metadata on the screen, wherein the controller is further configured to:
- control the display to move a pointer on the screen based on the received RF signal containing information regarding movement of the remote controller,
- control the RF module to receive an RF signal corresponding to a designated key of the remote controller for selecting a thumbnail image corresponding to specific content when the pointer is on the thumbnail image corresponding to specific content, from the remote controller, and
- control the display to display title information, actor information, genre information, synopsis information and related content information according to the received RF signal corresponding to the designated key of the remote controller,
- wherein if the specific content includes plural episodes, the related content information relates to an option to select one of the plural episodes, and when the related content information is selected by the pointer, the controller further controls the display to display a list of the plural episodes based on the received metadata, and
- wherein the controller further controls the display to display a thumbnail image corresponding to a specific episode of the plural episodes, a first item to identify a first source providing the specific episode of the plural episodes and a second item to identify a second source providing the specific episode of the plural episodes, the second source being different from the first source.

8. The television of claim 7, wherein if the specific content includes plural seasons, the related content information relates to an option to select one of the plural seasons, and
- wherein when any one of the plural seasons is selected by the pointer, the controller controls the display to display a list of the plural episodes related to the selected season based on the received metadata.

9. The television of claim 7, wherein when the actor information corresponding to the specific content is selected by the pointer, the controller controls the display to display graphic data regarding plural actors relating to the specific content based on the received metadata.

10. The television of claim 7, wherein when a specific actor is selected by the pointer based on the displayed actor information corresponding to the specific content, the controller controls the display to display information regarding another content in which the specific actor appears based on the received metadata.

11. The television of claim 7, the controller controls the display to display at least one of an up button and a down button for displaying invisible portion of the list of the plural episodes corresponding to the specific content on the screen.

12. The television of claim 7, wherein the remote controller includes a gyro sensor for sensing information regarding movement of the remote controller based on x, y and z axes.

13. The television of claim 7, wherein the controller controls the RF module to receive an RF signal corresponding to a touchpad of the remote controller.

14. A television controlled by a remote controller, the television comprising:
- an infrared (IR) module to receive an IR signal from the remote controller;
- a radio frequency (RF) module to receive an RF signal from the remote controller;
- a network interface to receive metadata corresponding to contents to be displayed on a screen, the metadata including at least one of thumbnail image information, title information, actor information, genre information and synopsis information corresponding to each content; and
- a controller configured to change a power-off state of the television into a power-on state of the television based on the received IR signal and control a display to display a thumbnail image corresponding to the each content based on the received thumbnail image information on the screen,
- wherein the controller is further configured to:
  - control the display to move a pointer on the screen based on the received signal containing information regarding movement of the remote controller,
  - control the RF module to receive a first RF signal corresponding to a designated key of the remote controller for selecting a thumbnail image corresponding to a specific content when the pointer is on the thumbnail image corresponding to the specific content, from the remote controller,
  - control the display to display title information, actor information, genre information and synopsis information corresponding to the specific content according to the received first RF signal, and
  - control the display to display content information corresponding to a first content and a second content related to the specific content based on the received metadata,
  - control the RF module to receive a second RF signal for selecting the content information corresponding to the first content, and
  - control the display to display a thumbnail image corresponding to the first content, a first menu to view die first content and a second menu to view the first content according to the received second RF signal, and
  - wherein when the first menu is selected by the remote controller, the controller controls the network interface to provide the first content through a first source, and when the second menu is selected by the remote controller, the controller controls the network interface to provide the first content through a second source, and
  - wherein the first source and the second source are different content providers from each other providing the first content.

* * * * *